United States Patent [19]
Van de Lavoir et al.

[11] Patent Number: 5,408,603
[45] Date of Patent: Apr. 18, 1995

[54] GLOBAL PROCESS CONTROL INFORMATION SYSTEM AND METHOD

[75] Inventors: Ronny Van de Lavoir, AS Sint Jansteen, Netherlands; Marinus Follon, Neerpelt, Belgium; Ian Ravenscroft, Wiltshire Cty., Great Britain

[73] Assignee: Dow Benelux N.V., Netherlands

[21] Appl. No.: 861,371

[22] Filed: Mar. 31, 1992

[51] Int. Cl.⁶ .................................... G06F 15/46
[52] U.S. Cl. ........................................ 395/161
[58] Field of Search .......... 395/160, 161, 140, 155; 364/419.01, 419.08; 345/115, 116, 131

[56] References Cited

U.S. PATENT DOCUMENTS

| | | | |
|---|---|---|---|
| 4,181,954 | 1/1980 | Rosenthal et al. | 364/520 |
| 4,217,658 | 8/1980 | Henry et al. | 364/900 |
| 4,315,315 | 2/1982 | Kossiakoff | 364/300 |
| 4,396,977 | 8/1983 | Slater et al. | 364/188 |
| 4,413,314 | 11/1983 | Slater et al. | 364/188 |
| 4,432,047 | 2/1984 | Okayama | 364/147 |
| 4,488,258 | 12/1984 | Struger et al. | 364/900 |
| 4,616,307 | 10/1986 | Kusumi et al. | 364/147 |
| 4,638,452 | 1/1987 | Schultz et al. | 364/900 |
| 4,648,028 | 3/1987 | DeKlotz et al. | 364/188 |
| 4,663,704 | 5/1987 | Jones et al. | 364/188 |
| 4,675,147 | 6/1987 | Schaefer et al. | 376/245 |
| 4,683,549 | 7/1987 | Takaki | 364/900 |
| 4,816,988 | 3/1989 | Yamanaka | 364/188 |
| 4,833,592 | 5/1989 | Yamanaka | 364/138 |
| 4,965,745 | 10/1990 | Economy et al. | 364/518 |
| 4,994,957 | 2/1991 | Komiya et al. | 364/147 |
| 5,055,996 | 10/1991 | Keslowitz | 364/188 |

OTHER PUBLICATIONS

Aho, Alfred V.; Sethi, Ravi; and Ullman, Jeffrey D., *Compilers Principles, Techniques, and Tools*, Addison-Wesley Publishing Co., 1988, pp. 83-88.
Cooling, J. E. and Hughes, T. S. "Animation Prototyping of Real-Time Systems Specifications" Proceedings from 5th Annual European Computer Conference, Bologna, May 1991, *Advanced Computer Technology, Reliable Systems and Applications*, pp. 562-566 IEEE.
Morin, D. et al., "Vitamin Toolkit: A UIMS for CIM Applications," IEEE Workshop on Languages for Automation, Maryland, Aug. 1988, Computer Society Press, pp. 80-89.
Heinecke, A. M., "Visualisation and Graphical Interaction in Process Control Systems," Proceedings of the IFIP TC 8/WG 8.1 Working Conference on Human Factors in Information Systems Analysis and Design, Sharding, Austria, Jun. 1990, *Human Factors in Analysis and Design of Information Systems*, pp. 81-92, North-Holland 1990.
"Control Flow Layout Algorithm for Higher Level Language Programs," IBM Technical Disclosure Bulletin, vol. 32, No. 5A, Oct. 1989, 211-213, IBM Corp.
Alfred V. Aho, et al., *Compilers Principles, Techniques, and Tools*, Addison-Wesley Publishing Co., 1988, Sec. 3.1, "The Role of Lexical Analyzer," pp. 84-88.
Alfred V. Aho, et al., *Compilers Principles, Techniques, and Tools*, Addison-Wesley Publishing Co., 1988, Sec. 4.1, "The Role of the Parser," Sec. 4.2, Context-Free Grammers, pp. 160-171.
Allen I. Holub, *Compiler Design In C*, Prentice-Hall, Inc., 1990, Chap. 3.3, "Parse Trees and Semantic Difficulties," pp. 170-173.
Allen I. Holub, *Compiler Design In C*, Prentice-Hall, Inc., 1990, Chap. 5.1, "How Bottom-Up Parsing Works," Chap. 5.2 Recursion in Bottom-Up Parsing, pp. 337-343.
Donnelly and Stallman, *BISON The YACC-Compatible Parser Generator*, Dec. 1990, Bison Version 1.12, pp. 1-96.

*Primary Examiner*—Phu K. Nguyen
*Attorney, Agent, or Firm*—Harness, Dickey & Pierce

[57] ABSTRACT

The process control display program receives input in the form of an alphanumeric process control statement. The alphanumeric statement is parsed into its constituent lexical units and graphical icons corresponding to those lexical units are arranged on the display screen in an interconnected network or pattern which corresponds to the syntactic relationship of the lexical units which make up the statement being displayed. The change or flow of live data is depicted by changing the visual quality or color of the icons and their interconnecting network to provide a graphical representation of the alphanumeric statement which is readily understood by users worldwide.

36 Claims, 27 Drawing Sheets

Object 1

The XOR Object

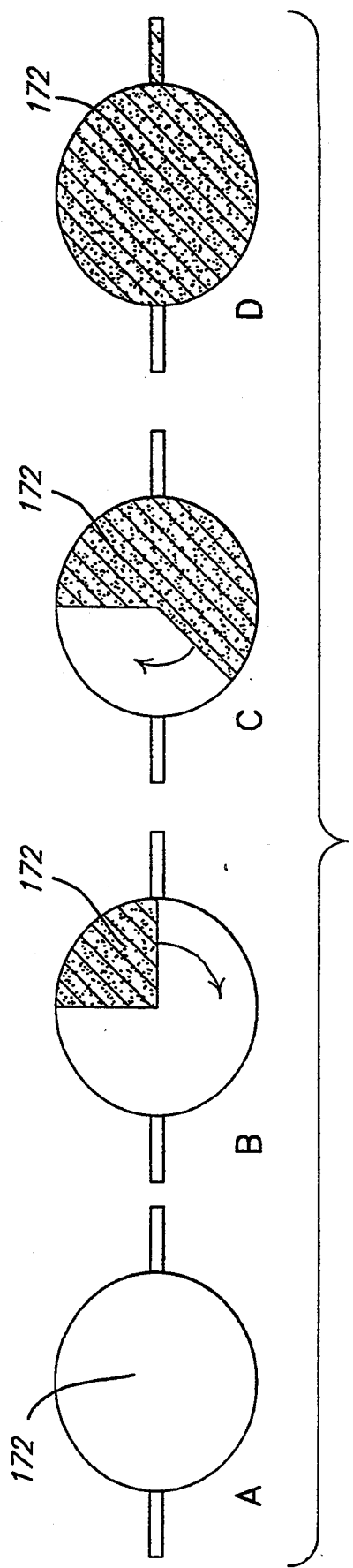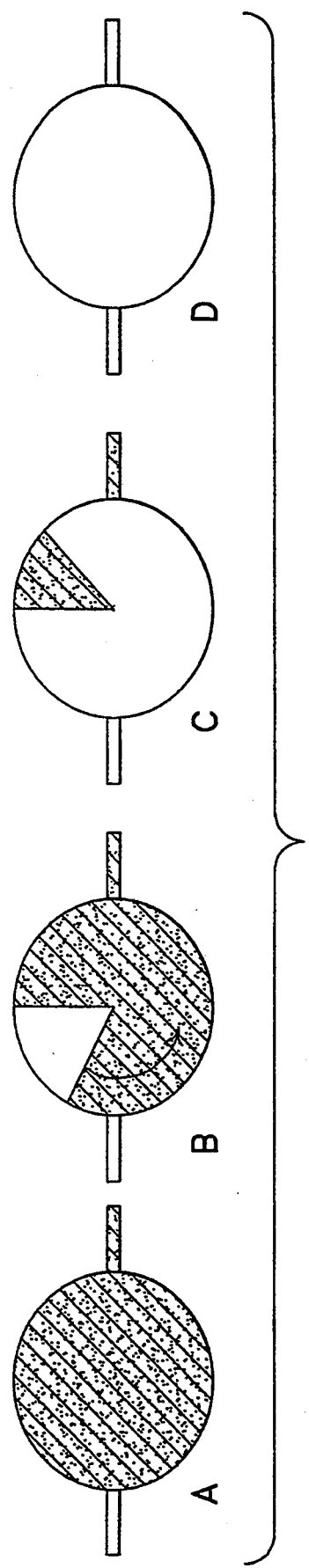
Fig. 13a
Fig. 13b

GLOBAL PROCESS CONTROL INFORMATION SYSTEM AND METHOD

BACKGROUND OF THE INVENTION

The present invention generally relates to process control computer systems and particularly to a system and method for graphically displaying the flow of process control information in a way which is readily understood by users worldwide.

In recent years, computers have been increasingly employed to automate and control the production of chemicals, plastics and other industrial resources. In this regard, it should be appreciated that each process will typically present a unique set of operational constraints, /Input parameters and output devices to be controlled. Thus, the design of process control systems tends to be driven by the specific considerations of the process at hand. Accordingly, the interaction between the process control equipment and the technicians responsible for running the process will generally be quite different from one process to another.

Additionally, it should be appreciated that computer technology has developed and continues to develop at a rapid pace. Thus, it is possible that a variety of different computer hardware platforms and software packages may be employed for process control systems at one or more sites, even when the processes involved are the similar or the same. Accordingly, the way in which a technician interacts with the process control equipment will depend not only upon the process itself, but the generation and type of equipment being employed to control the process. In this regard, substantial time and effort may be devoted to developing the software for displaying the complex information being gathered and manipulated by any particular computer-based control system, and there may be little if any consistency in how this information is communicated from one control system to the next. This results in a loss of productivity due the time invested by system designers and the time required to train the personnel who are ultimately charged with the responsibility to run and maintain the equipment used to control the process.

Accordingly, it is an objective of the present invention to provide a process control information system and method which may be readily applied in a wide variety of processes.

It is another objective of the present invention to provide a process control information system and method which is capable of quickly communicating the flow of live or real-time information in a way recognizable by users worldwide.

It is a further objective of the present invention to provide a process control information system and method which is capable of being adapted for use with future generations of computer-based process control technology.

It is an additional objective of the present invention to provide a process control information system and method which is capable of rapidly interpreting complex process control statements and permitting fast switching between different process control statements.

It is yet another objective of the present invention to provide a process control information system and method which will simplify troubleshooting and speed up control decision-making in response to anomalous process conditions.

SUMMARY OF THE INVENTION

To achieve the foregoing objectives, the present invention provides a process control display program which provides a set of predetermined graphical symbols through which the lexical and syntactic relationship of a process control statement or expression and the value or status of process parameters may be conveyed. In this regard, each of the graphical symbols have a variable graphic characteristic or variable visual quality which is employed to illustrate the value or state of a process parameter and the flow of datalogical quality in a program statement or expression. Importantly, these graphical symbols and their variable graphic characteristics are designed to achieve essentially instantaneous recognition of the information sought to be conveyed with minimal use of alphanumerical text to identify any of the parameter values.

Accordingly, the information system according to the present invention provides the necessary software implemented instructions to correlate parameter data from individual process sensors with specific graphical symbols. The information system also includes a program for combining selected graphical symbols into an arrangement which is representative of a control logic sequence for a specific process being controlled. The information system further includes a program for causing the arrangement of graphical symbols to be displayed, such that the variable graphic characteristic of each of the graphical symbols corresponds to the parameter values received by the sensors in real time.

In one form of the present invention, the variable graphic characteristic or visual quality of the graphical symbols includes the use of colors which may be recognized by people who otherwise have difficulty perceiving certain colors. Thus, for example, the color blue is used to indicate a TRUE condition, whereas the color orange is used to indicate a FALSE condition. By employing a consistent set of graphical symbols and applying a consistent set of rules for arranging these graphical symbols, the status of any process may be quickly conveyed to any qualified user, regardless of computer hardware platform employed and regardless of the native language of the user.

Although well-adapted for displaying process control information, the invention in its broader aspects may be applied to the display of a wide variety of different computer program statements or expressions. For the most part, the process control display program of the invention is computer language independent. It may be adapted to work with a wide variety of different computer languages. In general, the process control display program and method of the invention is adapted for displaying a program expression of the type capable of representing a change in datalogical quality.

As used herein the term "datalogical" is used to denote one form of data modeling which focuses on the computer representation of data. The datalogical realm thus refers to a mapping of information into its corresponding computer representation, which is concerned with computer memory, data types and so forth. The datalogical realm can be contrasted with the infological realm, which is a user-oriented data modeling which is concerned, in a formal sense, with representing the structure of data as they exist in the real world. As used herein "datalogical quality" is any quality or attribute of or having to do with the datalogical realm. The change in state of a data value from TRUE to FALSE is one example of a change in datalogical quality. The change in datalogical quality may have infological implications. For example, the change in datalogical quality of a digital variable, say from TRUE to FALSE, may in a given instance map to a physical device, say a switch changing from closed to open. The change in state of the switch might, for example, have an infological meaning that the shipping container has moved onto position in the loading platform, for example.

The process control display program and method includes a means or step for parsing the expression into lexical units and for creating a structure for storing the lexical units, and the syntactic relationship among the lexical units. The data structure is preferably built recursively, based on an exclusive and exhaustive mathematical description of the program language. Some implementations may be created without use of recursion, depending on the nature of the source language. The program and method further includes a means or step for drawing symbols which correspond to the lexical units in a spatial arrangement or interconnected network which reflects the syntactic relationship. The process control display program and method also employs a means or step in communication with the symbol drawing means or step for displaying the change of datalogical quality.

In the preferred embodiment the change of datalogical quality is displayed by altering the visual quality or color of at least some of the symbols. In this way, the visual appearance of a datalogical flow or logic flow is depicted. The presently preferred embodiment allows the visual quality or color of the symbols and the interconnecting network to change in accordance with live data received from the plant or process being controlled.

More specifically, the process control display program is adapted for producing a graphical display of alphanumeric process control statements. The process control statements comprise a set of lexical units grouped in a syntactic relationship defined by a predetermined grammar, with at least a subset of the lexical units being capable of representing data. The process control display program comprises a means for supplying a process control statement to be displayed. This statement may be an expression or portion of a complete statement, a complete statement or an entire program comprising multiple statements.

A statement analyzer generates a parse tree corresponding to the process control statement to be displayed, which is stored as a data structure in computer memory. The process control display program includes a means for producing a graphical display window and for establishing a predefined set of graphical icons to represent at least a portion of the set of lexical units. A display generation means is in communication with the parse tree data structure and places selected ones of the predefined set of graphical icons in the display window in a spatial relationship corresponding to the syntactic relationship of the lexical units which make up the process control statement to be displayed. The program also includes a means for supplying data corresponding to at least one of the lexical units of the process control statement to be displayed. In addition, the program includes an evaluation means which is responsive to the syntactic relationship defined by the process control statement to be displayed, for establishing a visual quality of selected graphical icons in the display window, based on the supplied data. In this way a first condition may be visually distinguished from a second condition on the basis of visual quality.

While a graphical-based embodiment is presently preferred, aspects of the process control display program can be implemented in a character-based system in which a pictorial presentation of the alphanumeric process control statements are generated using selected characters from a provided alphanumeric character set. Such an embodiment would thus provide a process control display program for producing a pictorial presentation of alphanumeric process control statements. The process control statements would comprise a set of lexical units grouped in a syntactic relationship defined by a predetermined grammar, with at least a subset of the lexical units being capable of representing data. The process control display program of such an embodiment would include a means for supplying a process control statement to be displayed and a statement analyzer for generating a symbol table, parse tree or other data structure corresponding to the process control statement to be displayed. The program would further include a means for writing to display device and a means for establishing a predefined set of pictorial symbols for representing at least a portion of the lexical units.

The display generation means of such an embodiment would be in communication with the symbol table, parse tree or other data structure for writing selected ones of the predefined set of pictorial symbols to the display device, in a spatial relationship corresponding to the lexical or syntactic relationship of the lexical units which make up the process control statement to be displayed. The program may further include a means for supplying data, corresponding to at least one of the lexical units of the process control statement to be displayed. An automatic evaluation means, responsive to the lexical or syntactic relationship defined by the process control statement to be displayed is provided for selectively controlling selected pictorial symbols on the display device. This selective control would be based on the supplied data, whereby at least a first condition may be visually distinguished from a second condition on the selection of pictorial symbols being displayed.

The process control display program may also include a means for establishing a predefined set of pictorial symbols which defines first and second subsets of pictorial symbols. The automatic evaluation means would selectively substitute selected pictorial symbols of the first subset for selected pictorial symbols of the second subset to visually distinguish a first condition from a second condition. The display generation means of the process control display program may write pictorial symbols in an interconnected network and may further comprise a means responsive to the supplied data for depicting a datalogical flow through the interconnected network. The supplied data may be dynamically changing data and the process control statements may be synchronized (or loosely synchronized) to a clock, in which case the automatic evaluation means may also be synchronized (or loosely synchronized) to the clock.

BRIEF DESCRIPTION OF THE DRAWINGS

FIG. 13a illustrates the presently preferred graphical depiction of a delay timer, showing the OFF time delay (delay in changing from TRUE to FALSE);

FIG. 13b illustrates the presently preferred graphical depiction of a delay timer, showing the ON time delay (delay in changing from FALSE to TRUE);

DESCRIPTION OF THE PREFERRED EMBODIMENT

Table of Contents

An Overview of a Process Control Computer System ... 14
Computer Language Fundamentals ... 21
The Nature of Dynamically Changing Processes ... 26
Some Useful Special Purpose Tokens ... 31
The Delay Timer ... 31
The STEP Token ... 35
The Deviation Function ... 37
The Termination Function ... 38
The Simulation Functions ... 38
The Graphical User Interface ... 38
The Menu Bar ... 39
The Dynamically Changing Icons ... 40
Layout of Preferred Graphical Display ... 50
The Menu Bar Buttons ... 51
Example of Program In Use ... 58
Detailed Description of The Software ... 61
An Overview ... 61
Parser Basic Concepts ... 65
The Lexical Analyzer and Parser Module ... 66
The Display Calculation Modules ... 70
Pass 1 of Display Calculation Module ... 72
The Hidden Pipe Algorithm ... 77
Pass 2 of Display Calculation Module ... 78
The Live Data Module ... 81
The Real Time Evaluation Module ... 82

An Overview of a Process Control Computer System

Figure 1:
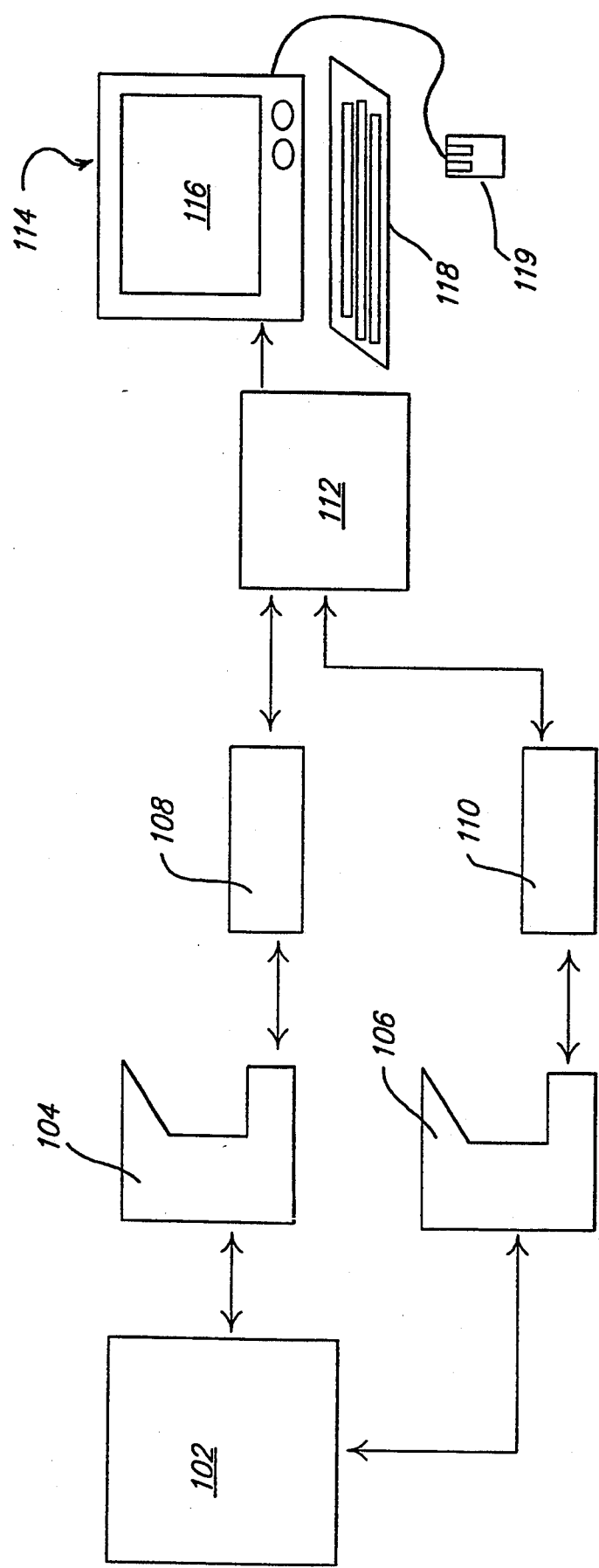
FIG. 1 is schematic block diagram of a system with which the invention may be used.

FIG. 1 illustrates an exemplary process control computer system with which the process control display program of the invention may be used. The system illustrated depicts the process at 102 which is controlled by at least one and often a plurality of process control computers, such as computers 104 and 106. Conventionally, computers 104 and 106 are connected with process 102 via an assortment of various sensors, actuators, valves, motors, heaters and other controllers by which the computers 104 and 106 control and monitor the process being controlled at 102. If desired, the process control computers 104 and 106 can each be dedicated to a different portion of the overall process 102, or they may be used in tandem to provide redundancy for fail-safe operation.

The process control computers are in turn connected through communication interface subsystems 108 and 110 to a supervisory computer 112. The supervisory computer may include a workstation 114 by which the human operator may interact with the supervisory computer. Interaction may be limited to viewing information collected by the supervisory computer and displayed on a display device such as monitor 116. Alternatively, the human operator may interact through an input device such as keyboard 118 or mouse 119 to supply information to the supervisory computer, which may in turn be communicated to the process control computers via the appropriate communication interface subsystem. Although physically separate supervisory computer 112 and workstation 114 have been shown, the function of the supervisory computer could be performed by a suitably programmed workstation.

Figure 2:
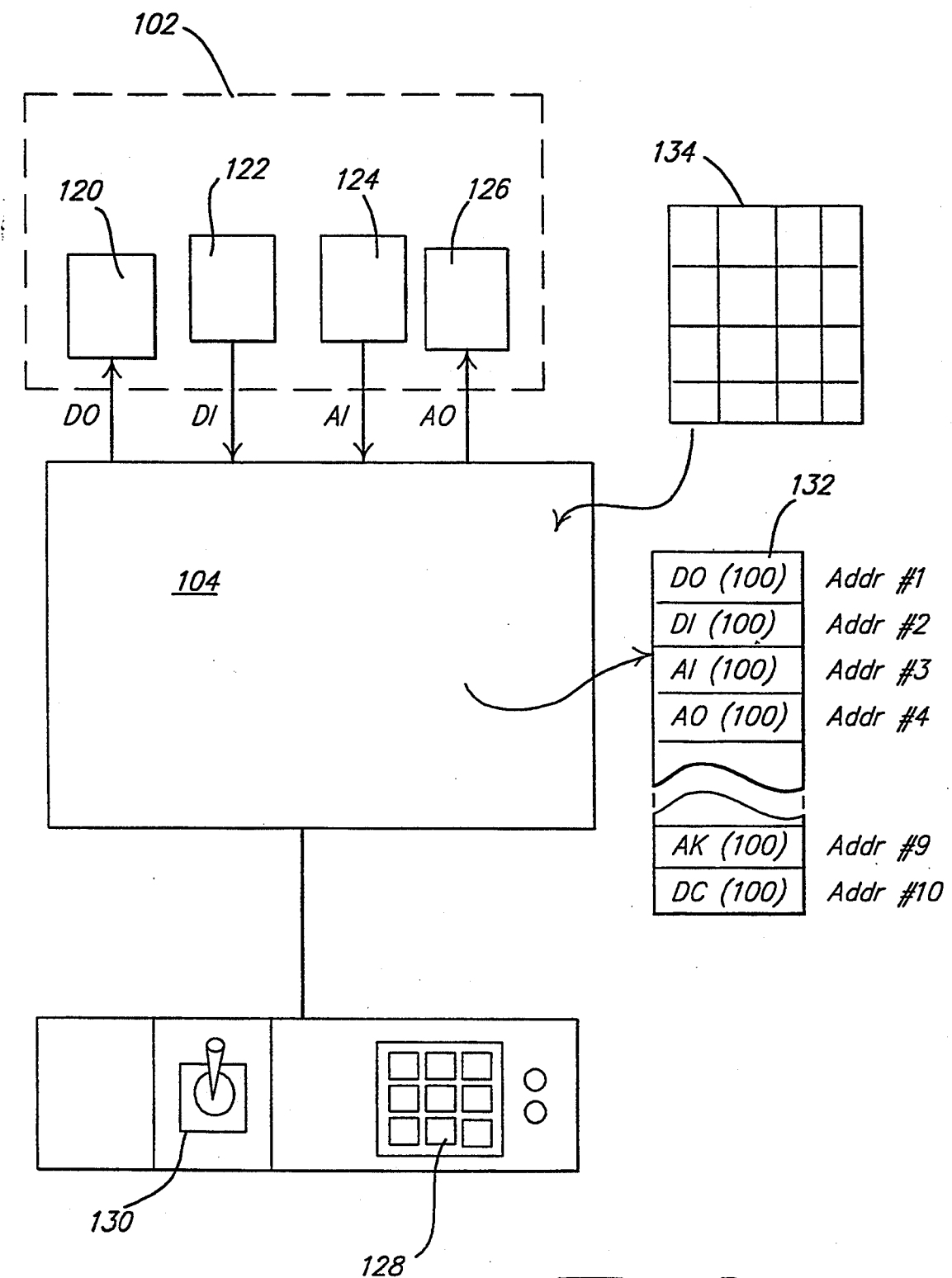
FIG. 2 is a block diagram illustrating an exemplary process control computer configuration.

Providing an intuitive means for the human technician to interact with the supervisory computer and with the process control computers is not easy to achieve. The assortment of various sensors, actuators, valves, motors, heaters and other controllers which control and monitor the process are physical devices. These physical devices are controlled by or produce electrical currents and voltages, which are in turn modeled or abstracted as analog or digital values suitable for processing as data by the process control computers. Often complex computer programs are run by the process control computers to process these analog and digital data. Because the physical devices are ultimately modeled as abstract computer data, it can often be difficult for a human technician in a plant to look at computer generated displays of data and comprehend what is actually occurring in the decision logic and arithmetic relationships associated with the physical devices which are controlling and monitoring the process. This difficulty is compounded by the fact that process control programs may re-evaluate process control program statements on a periodic basis, e.g., once each second. Thus the resulting values from the statements may change on the same periodic basis, making it difficult for the human technician to comprehend the status of the process. FIG. 2 further illustrates the nature of abstract modeling.

In FIG. 2 process 102 is controlled and monitored by an assortment of various physical devices. Although a wide variety of physical devices are used in industry, for purposes of computer modeling, the physical devices can be generalized as providing a data input or receiving a data output, or both. In general, data inputs and outputs can supply either analog or digital values. By way of example, process 102 may employ a digital device 120 which receives digital control instructions in the form of a digital output DO from process control computer 104. The digital device 120 could be an on/off valve responsive to a digital on/off signal, for example. The process 102 may also include a digital device 122 which supplies a digital TRUE/FALSE value as a digital input DI to process control computer 104. By way of example, the digital device 122 could be a microswitch which senses whether a door is open or closed.

Because many processes involve analog as well as digital values, process 102 may also include analog device 124 which provides an analog value as an analog input AI to the process control computer 104. Analog device 124 may be, for example, a temperature sensor which supplies an electrical signal of a voltage which varies according to a measured temperature. The process 102 may also include an analog device 126 which responds to an analog signal supplied as an analog output AO from the process control computer 104. Analog device 126 could be, for example, a temperature control device for a heater which regulates the temperature of a bath based on the analog control signal provided.

The foregoing digital and analog devices are merely examples of the types of devices used to control and monitor processes. For purposes of illustrating the invention, devices responding to computer output signals and devices supplying values to the computer as input signals have been separately modeled in FIG. 2. Also, digital devices have been modeled separately from analog devices. In practice, some devices may employ both input and output capabilities and some devices may involve both analog and digital properties. Thus the illustration of FIG. 2 and the accompanying description is intended merely to be exemplary of the way in which information about a process may be communicated between the process and the process control computer.

If the human technician is to be given the ability to supply information to the process control computer, then a data input device may be coupled to the process control computer. The data input device may be as simple as a push button switch, although frequently a keypad or keyboard 128 will be provided. In some systems a pointing device such as a trackball, mouse or joystick 130 may also be provided. In most instances input devices of this type supply digital signals to the process control computer although analog signals may also be used.

The process control computer will typically include data storage capability, often in the form of random access memory. This memory may be used to store the digital and analog input and output values by suitably encoding the values into a form capable of being stored as binary digits in the computer memory. Most computer memory is configured to store integer values up to a predetermined size (dictated by the number of binary digits architecturally reserved for each memory location). Digital values are often expressed by associating one integer value with the Boolean TRUE state and another integer value with the Boolean FALSE state. In a fixed point system analog values can be stored directly as integer values and are interpreted by applying a scale factor. The scaled value and the scale factor would both be stored as integer values. Alternatively, in a floating point system analog values can be stored as floating point numbers, in which case the number is represented in a fashion similar to scientific notation employing a mantissa and a power of ten exponent. The examples in this description will use a fixed point representation.

In terms of physical storage, each value is stored at a memory location to which an address has been assigned to allow the value to be accessed by reference to its address. By way of illustration, FIG. 2 diagrammatically depicts a series of sequential memory locations 132 in which these digital and analog values might be stored. The memory location designated Addr #1 might, for example, contain a digital output value designated by the name DO(100). The name DO(100) reflects the notion that the DO can be thought of as a virtual one-dimensional array having DO(100) as the 100th element in that DO array. In this regard, the name DO(100) should not be confused with the actual state of that value, which could be either TRUE or FALSE. Similarly, the state of the value TRUE or FALSE should not be confused with the binary digits used to represent the state. For example, the Boolean state TRUE might be physically represented by the binary number 00000001 and the Boolean state FALSE might be represented by the binary number 11111110. Alternatively, the Boolean states could be represented by the state of a single predetermined bit, in which case the other bits of the binary number could be used for storing other pieces of information such as attributes.

In a similar fashion Addr #2 might contain the digital input variable DI(100), Addr #3 might contain the analog input variable AI(100) and Addr #4 might contain the analog output variable AO(100). It will be appreciated that by storing the above digital and analog values at known memory locations or memory addresses, the values can be accessed or involved in data processing steps by the process control computer.

In addition to the input and output values which are earmarked for communication with the outside world (process 102 or the human technician) the process control computer may also need to use other values in performing data processing or process control steps. By convention, values which are initially assigned (by a human technician) and are thereafter unchanged (by the computer) are called "constants." Values which may change after initial assignment are called "variables." Like input and output values, constants and variables can be either digital or analog. This description adopts a naming convention in which digital and analog variables are named with a prefix DC and AC, respectively. Digital and analog constants are named with a prefix DK and AK, respectively. Variables and constants are stored in the same manner as input and output values. To illustrate, the sequential memory locations 132 include analog constant AK(100) at Addr #9 and a digital variable DC(100) at Addr #10. By way of example, analog constant AK(100) might store a scaled, rounded value of $\pi$ whereas the digital constant DC(100) might store the result of a Boolean calculation needed to determine when a valve should be opened.

Although the physical random access memory storage device of a typical computer resembles a sequential arrangement of storage locations, some processes are easier to perform by arranging the data into a matrix or multidimensional array. For example, a chemical process might require a recipe of different proportions of components depending on the size or some other desired property of a batch. A two-dimensional array or lookup table, such as array 134 may be well suited for this purpose. The array comprises a predefined arrangement of rows and columns in which the required value for a given process is located by identifying its row or column. Like other digital and analog constants and variables, the values which comprise an array are stored in memory locations at predefined addresses. This description adopts a naming convention to allow the reader to distinguish array values from nonarray values. Digital array values are assigned a prefix DR and analog array values are assigned the prefix AR.

By convention adopted in this written description, variable names may include a parenthetical ID number to allow variables of the same prefix to be distinguished from one another, e.g., DI(100), DI(101), etc. When a constant is first used or defined, the programmer may want to initialize it or set it equal to a predefined value. In a fixed point system, a predefined value is assigned by giving both the value and the scale factor. By convention adopted in this description, the value, and scale factor where applicable, to which a constant is initialized may be parenthetically included along with the ID number. Thus AK(1,200,1000) assigns the variable name and ID number AK(1) to an analog constant and initializes its value to be 200 with a scale factor of 1000. After having been declared and initialized in this fashion, the shorthand notation AK(1) would be used to refer to this constant thereafter.

Computer Language Fundamentals

In order to better understand the process control display program of the invention, a fundamental understanding of the structure of a generic computer language may be helpful. There are a number of general purpose computer languages in popular use today which can be used for process control. Examples include FORTRAN, BASIC, FORTH, C, PASCAL and so forth. There are also special purpose computer languages for process control. Most are modeled after a general purpose language and often comprise a subset or extension of a general purpose language. The process control display program of the invention can be adapted to work with most general purpose and special purpose languages. Accordingly, the following description of the makeup of a generic computer language, adapted for process control, is intended merely as an example and should not be viewed as a limitation of the scope of the invention as set forth in the claims which follow.

Typically, in a general purpose computer language, data is processed and process control procedures are performed in accordance with one or more "program statements" or "expressions" which have been written in conformity with the grammar and syntax rules of the computer language. Each program statement or expression typically consists of a string of alphanumeric characters in one or more lines. The alphanumeric characters are usually grouped together into words or "lexical units" (also called "symbols"). In many languages these lexical units are separated from one another by spaces (sometimes called whitespace), in much the same way as words are separated by spaces in the printed text of books.

Most computer languages allow one to construct composite lexical units or syntactic groupings from a collection of elemental lexical units. The elemental lexical units, called "tokens," are indivisible lexical units such as keywords, identifiers, punctuators, constants, variables and operators, operands and resultants. The syntactic groupings are divisible lexical units such as program statements, expressions, declarations, function definitions and other language constructs.

Commonly, a predefined set of useful tokens are created by the initial language definition. The "PRINT" token in the BASIC languages, for example, is a keyword which causes certain data to be displayed on the computer display or monitor. The ";" token is used, for example, in the C language as punctuation to denote the end of a program statement or expression. Similarly, the token "GT" in the FORTRAN language, or the token ">" is used to denote the comparison operator "greater than." Other tokens, such as constants and variables are defined by the programmer.

The predefined set of tokens, such as keywords, operators and punctuation and the user defined tokens are collectively called "terminal symbols." The computer language grammar rules define the manner in which relationships among these terminal symbols may be established to build syntactic groupings called "nonterminal symbols." The nonterminal symbols thus defined may then be used to define further nonterminal symbols. Sometimes symbols are grouped together or said to be "nested." Commonly, nested symbols are set off by being enclosed in parentheses or brackets. The present description uses brackets to set off nested symbols.

Figure 3:
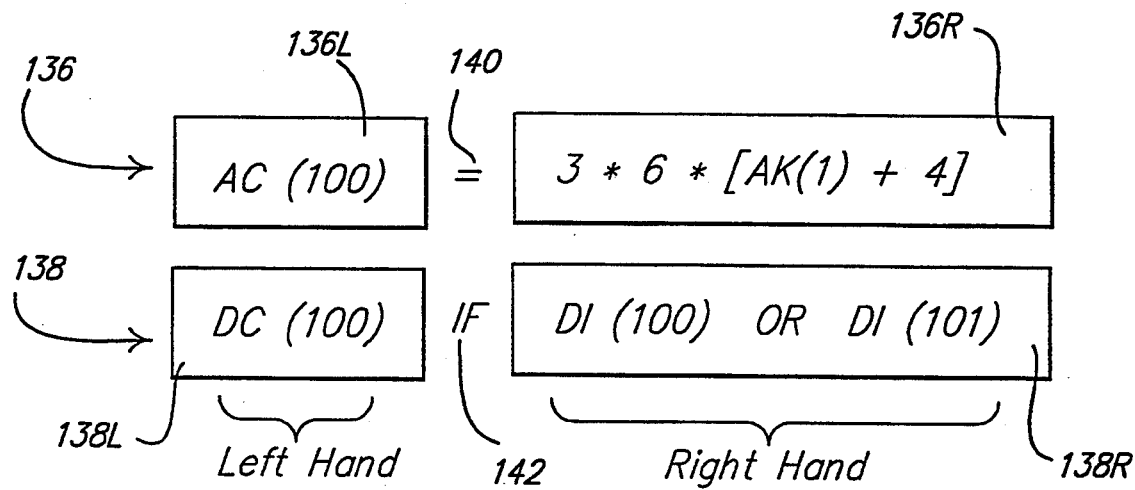
FIG. 3 is a depiction of exemplary program statements of the type useful for process control.

Conventionally a computer language program statement or expression itself may be broken down into a left-hand side (sometimes called the L value or LVAL) and a right-hand side (sometimes called the R value or RVAL), with an "equivalence token" separating the two. The left-hand side represents the "resultant" of the program statement. The right-hand side may contain operators (such as +, −, OR, AND, XOR, >, <, etc.) and operands (such as variables or constants) which determine the state of the resultant. FIG. 3 depicts this relationship. In FIG. 3 two expressions are illustrated, an arithmetic expression 136 and a logical expression 138. Separating the left-hand and right-hand sides 136L and 136R of the arithmetic expression is the "is defined as" or "goes to" equal sign ("=") equivalence token 140. Similarly, separating the left-hand and right-hand sides 138L and 138R of the logical expression is the conditional "goes to," IF equivalence token. Also shown in FIG. 3 are two actual expressions written in alphanumeric characters. Specifically, the arithmetic expression 136 used in this example is:

AC(100)=3 * 6 *[AK(1)+4].

The logical expression 138 used in this example is:

DC(100) IF DI(100) OR DI(101).

The tokens used in the construction of program statements, expressions or other syntactic groupings may differ somewhat from language to language. For example, the operator "GT" in FORTRAN is roughly synonymous to the operator ">" in BASIC. Furthermore, while certain classes of symbols, particularly operators, are fairly common to all computer languages, some languages may have special purpose operators or special purpose functions, procedures or subroutines which are not commonly found in most general purpose computer languages. By way of example, operators which are fairly common to most computer languages include the arithmetic operators, which cause the computer to perform the basic arithmetic operations of addition, subtraction, multiplication and division; the comparison operators, which cause the computer compare two arithmetic variables or constants; and the assignment operators, which set the value of a variable equal to an arithmetic or logical expression. Table I sets forth the naming convention which will be used in the following description to represent some of these commonly used operators. Table I also sets forth the naming convention used to describe variables and constants herein.

Recall that the operands characterize one-dimensional data arrays, each array comprising a number of different individual elements. The present process control display program supports special purpose symbols, such as Delay Timer, Deviation, Termination and Simulation, which are not found in general purpose computer languages. These are special purpose operators and functions which may be useful in process control computer languages and are described later.

TABLE I

| Operands | |
|---|---|
| variable data classifications | |
| AC | [analog calculated] |
| DC | [digital calculated] |
| AI | [analog input] |
| DI | [digital input] |
| AO | [analog output] |
| DO | [digital output] |
| constant data classifications | |
| AK | [analog constant] |
| Operators | |
| arithmetic | |
| + | [addition] |
| − | [subtraction] |
| * | [multiplication] |
| / | [division] |
| logical | |
| # | [Boolean NOT] |
| AND | [Boolean AND] |
| OR | [Boolean OR] |

TABLE I-continued

| XOR | [Boolean exclusive OR] |
|---|---|
| comparison | |
| GT | [greater than) |
| GE | [greater than or equal to] |
| LT | [less than] |
| LE | [less than or equal to] |
| EQ | [equal to] |
| NE | [not equal to] |
| complex (e.g. functions, subroutines) | |
| log | [logarithm function] |
| cos | [cosine function] |
| sin | [sine function] |
| tan | [tangent function] |
| integ | [integration subroutine] |

The Nature of Dynamically Changing Processes

The process control display program of the invention provides a way of depicting conventional alphanumeric program statements or expressions using dynamically changing graphical icons. That is, the process control display program of the invention allows the values or states of selected lexical units to be displayed, as they change in real time, by changing a visual quality of the graphical icons and the lines or "pipes" which interconnect the icons. The visual quality is dynamically changed in real time as the value or state of the lexical units change. This allows a human operator to readily comprehend not only the arithmetic or logical relationship among the lexical units of a program statement or expression but also the physical value or state being represented at any given moment in time and why the expression is in that state.

Many process control operations in chemical processing and manufacturing applications involve logical expressions (such as the logical expression 138 of FIG. 3). To illustrate how the states of lexical units may vary in real time, the logical expression 138 can be considered. The digital variable DC(100) is dependent upon the digital input value DI(100), or alternatively upon the digital input DI(101). Specifically, digital variable DC(100) is assigned the value FALSE if both digital inputs DI(100) and DI(101) are FALSE. Digital variable DC(100) is TRUE if either digital input DI(100) or DI(101) is TRUE. The Table II below sets forth all four possible states of digital variable DC(100) and digital inputs DI(100) and DI(101), the state of each lexical unit being given immediately beneath each lexical unit.

TABLE II

| (1) | DC(100) | IF | DI(100) | OR | DI(101) |
|---|---|---|---|---|---|
| | false | | false | | false |
| (2) | DC(100) | IF | DI(100) | OR | DI(101) |
| | true | | true | | false |
| (3) | DC(100) | IF | DI(100) | OR | DI(101) |
| | true | | false | | true |
| (4) | DC(100) | IF | DI(100) | OR | DI(101) |
| | true | | true | | true |

In the above Table II example the logical expression corresponding to logical expression 138 of FIG. 3 is shown in the FALSE state at line (1) and in the TRUE state at lines (2)–(4). To see how these expressions might relate to a physical process, the digital input DI(100) might be responsive to a microswitch which changes state from TRUE to FALSE when a moving part reaches a predefined position. Similarly, the digital input DI(101) might be responsive to an optical level sensor which signals when a tank is full. The digital variable DC(100) might be a stored value which is used in a later logical expression for determining whether an alarm should be activated.

Figure 4:
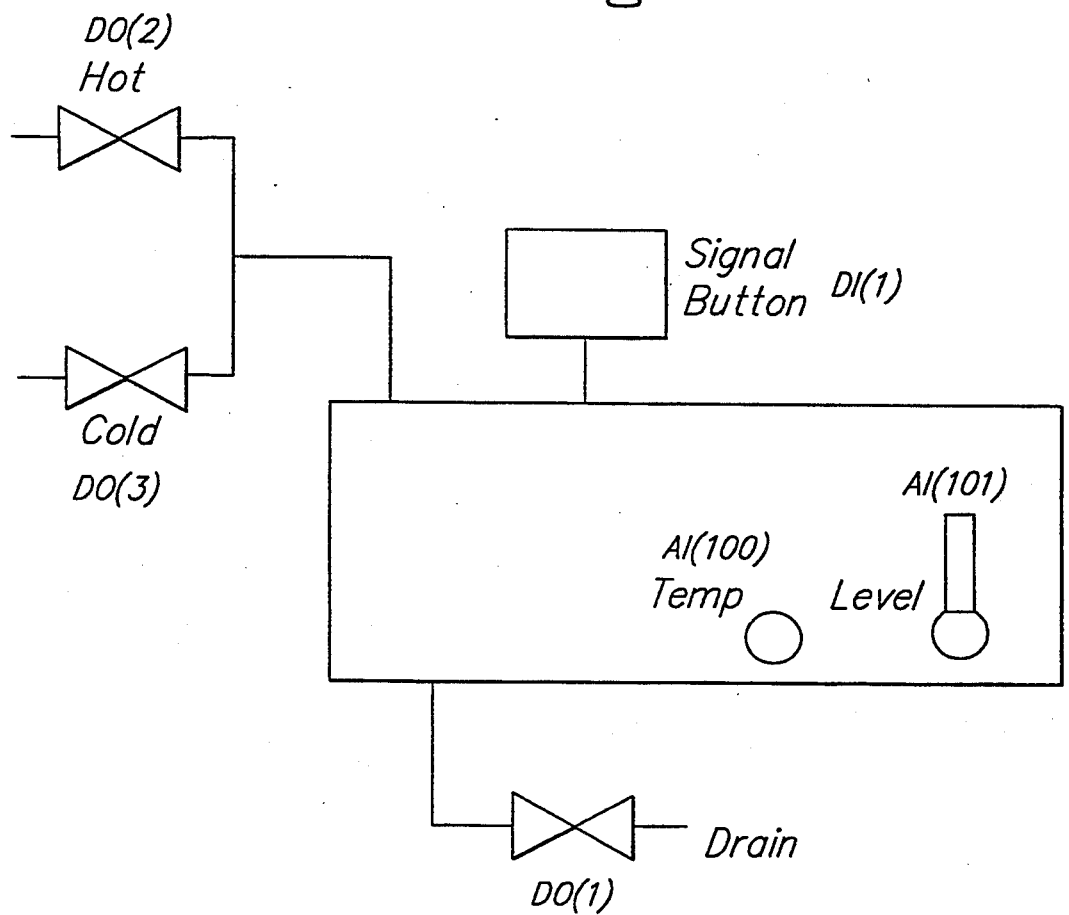
FIG. 4 is a diagram illustrating the process of filling a bathtub, useful in understanding the program listing of Table III.

While the logical expression of Table II is relatively simple to understand, and might be readily comprehended by a busy plant technician, not all expressions are this simple. As an example, Table III below sets forth a program listing, comprising a plurality of program statements or expressions, which might be used by a process control computer to perform the seemingly simple task of filling a bathtub. See FIG. 4 in conjunction with Table III.

TABLE III

| List of Operands and operators Used | |
|---|---|
| DO(1) | Is the drain valve signal: TRUE to open and FALSE to close |
| DO(2) | Is the hot water valve signal: TRUE to open and FALSE to close |
| DO(3) | Is the cold water valve signal: TRUE to open and FALSE to close |
| AI(100) | Is the temperature measurement |
| AI(101) | Is the level measurement |
| AK(1000) | Is the setpoint temperature for the bathwater |
| AK(1001) | Is the setpoint level for the bathwater |
| AK(1002) | Is the setpoint Low Level for the Bathtub to Define "Nearly Empty" |
| DI(1) | Is a button which sends a value of TRUE into the computer when pushed; when released, it sends a value of FALSE |
| DT(1,120,1) | Are individual timers which start |
| DT(2,5,1) | running when the preceding statement |
| DT(3,10,1) | is TRUE and make the resultant |
| DT(4,5,1) | variable TRUE when they have run for the time indicated. If the preceding statement goes FALSE after a timer has started, the timer counts backwards toward zero |

| Predefined Meanings of Steps and Initial Value Assignments | |
|---|---|
| STEP(1) | Tub is empty |
| STEP(2) | Tub is filling |
| STEP(3) | Tub is full |
| STEP(4) | Tub is emptying |
| AK(1000) | 100° F. on a scale of 200 |
| AK(1001) | 60% on a scale of 100% |
| AK(1002) | 3% on a scale of 100% |
| Comment: | The system will be in only one STEP at a time and will remain in that STEP until another STEP is specifically selected. The system will begin in STEP(1) after booting. When a STEP is selected, the value of that STEP variable is TRUE |

| Actual Program Code | | |
|---|---|---|
| STEP(1) | IF | STEP(4) AND AI(101,100) LT AK(1002,3,100) FOR DT(1,120,1) |
| STEP(2) | IF | STEP(1) AND DI(1) FOR DT(2,5,1) |
| STEP(3) | IF | STEP(2) AND AI(101) GT AK(1001,60,100) FOR DT(3,10,1) |
| STEP(4) | IF | STEP(3) AND DI(1) FOR DT(4,5,1) |
| Comment: | | A valve will only be open when the conditions for being open are TRUE; otherwise, the valve will be closed. The status of a valve will change after the evaluation term which calculates the status has completed (see latch in DO(2)) |
| AC(1,200) | = | AK(1000,100,200) + AK(1003,5,200) |
| AC(2,100) | = | AK(1001) + AK(1004,10,100) |
| DO(1) | IF | STEP(4) OR STEP(1) OR (AI(101) GT AC(2)) |
| DO(3) | IF | STEP(2) AND # DO(2) AND AI(101) LT AK(1001) |
| DO(2) | IF | [STEP(2) AND AI(101) GT AK(1005,20,100) AND AI(100) LT AK(1000)] OR [DO(2) AND AI(100) LT |

TABLE III-continued

| |
|---|
| AC(1)] AND AI(101) LT AK(1001)] |

From the example of Table III it will be more readily appreciated why conventionally expressed alphanumeric program statements are not readily comprehended and why a better way of dynamically expressing a real time process is needed. The present process control display program fills this need by representing the lexical units of a program statement or expression by a predefined set of graphical icons. The icons are arranged on the screen to reflect the syntactic relationship among the units.

Some Useful Special Purpose Tokens

The Delay Timer

In addition to the above operands and operators, computer languages used for process control also need a mechanism for monitoring the passage of time. Most computer systems provide one or more periodic clock signals which can be used to measure time. Commonly, the periodic clock signal is used to change the state of a counting routine, causing the counting routine to count up or down either from a predetermined starting value or to a predetermined ending value. Thus the counting routine measures time by counting increments of the periodic clock signal. Commonly, the comparison operators (such as those listed above in Table I) are used to implement counting loops by which time can be measured.

Because the passage of time is so important to many chemical and manufacturing processes, the process control display program of the invention, in its presently preferred embodiment, is designed to display a special operator called a delay timer. The delay timer may be incorporated into the computer language to give the programmer a shorthand notation for specifying and controlling the timing of events. Thus the delay timer operator may be viewed as a special purpose operator which has been custom designed to meet the needs of a specific application. Most computer languages are extensible enough to permit such special purpose operators to be developed and incorporated into the language, as needed. The use of special operators is a matter of choice for the computer system designer, and the nature of such special operators can be quite diverse. Accordingly, the present description will focus on the delay timer, as one example of a special operator, in order to better illustrate how the process control display program of the invention can be developed and adapted to particular process control needs. Accordingly, the process control display program is not intended to be limited to a requirement that the disclosed delay timer be included in the language. Nevertheless, the disclosed delay timer operator is quite powerful and has a wide range of uses in process control systems.

The presently preferred delay timer implementation may be used in applications where a provision needs to be made for delaying an action or calculation. Some instances where a delay timer may be used include:

1) Allowing for provisions for normal physical delays encountered in alarm monitoring of equipment operation. The delay timer is used to retard the recognition of alarm conditions in operated equipment during the transitions between ON and OFF. For example, if a digital output signal has been sent to open a valve, the programming will normally be written to expect the valve to open. The delay timer allows time for the physical to move before the alarm sounds.

2) Filtering out false triggers. False triggering of equipment can also occur because of electrical noise. Fluctuations in liquid levels because of turbulence may cause a level detector to alternate between FULL and NOT FULL signals to the computer. The delay timer can be used to filter out these false triggers.

3) Measuring processing times. An action needs to take place sometime after an event has completed. An example of this is energizing a valve, or going to another step only when mixing has been completed for 1 minute, for example.

4) Making a digital output true or false or a calculation true or false for a set period of time. An example of such use would be opening a cooling water valve when cooling is required for 10 seconds, every 30 seconds, or calculating the integral of a controller every 30 seconds.

5) Calculating a change in a variable after a set period of time. An example of this would be to calculate a level drop within a tank every 5 minutes.

From the above examples it will be understood that a delay timer may be used to force a preset time delay before a digital event (ON/OFF) is permitted to occur. The presently preferred delay timer has independent means for providing an ON time delay and an OFF time delay. In other words, the delay timer operator is capable of delaying the change from OFF to ON by one predetermined time and delaying the change from ON to OFF by a different predetermined time. Since the ON time delay and the OFF time delay are independent of one another, either can be independently set to 0, to defeat the delay feature. The syntax used for the delay timer is shown in the figure below.

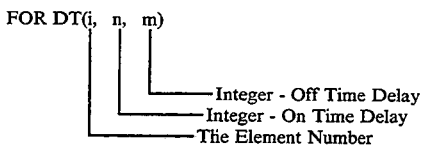

By convention adopted in this description, in a program statement or expression the word "FOR" precedes the delay timer DT operator. For example:

DO(111) IF [DC(2) AND DO(101) FOR DT(15,10,25)] AND #ALM(187)

In the above example the delay timer is assigned the unique element number 15. The ON time delay is 10. The OFF time delay is 25. The ALM(187) refers to a specific "alarm" designated by the unique element number 187. The alarm may be treated as a software flag, which may be used to cause a hardware alarm to annunciate.

The STEP Token

In the above example of filling a bathtub (Table III) the program was written to correspond to several predefined states or "steps." In the example, STEPS 1–4 corresponded respectively to (1) Tub is Empty; (2) Tub is Filling; (3) Tub is Full; and (4) Tub is Emptying. Often manufacturing operations and processes can be defined in terms of logical steps such as these. It is sometimes helpful for a process control computer language to have a special operator which is used to keep track of what predefined state or step the process is in at any given point in time. To illustrate this concept, the present description will employ a special operator STEP, which the programmer can use as a software flag or variable to keep track of the state or stage in which the process is. In a simple embodiment, the STEP operator may function like a digital variable or flag which is set when the process achieves a state and cleared when the process leaves that state. In the example of Table III each step has associated with it a program statement which, if true, causes the corresponding step to be valid (flag set). For example, STEP 3 (Tub is Full) occurs if STEP 2 (Tub is Filling) and AI(101) is greater than AK(1001) for 10 seconds. In the examples given here, it is assumed that only one step can be valid at a time. Thus when STEP 3 is TRUE (Tub is Full), all other steps (Tub is Empty; Tub is Filling; Tub is Emptying) are FALSE. This assumption is usually invoked where the process being controlled can be described as a sequence of separately occurring steps. Of course, it is also possible to have processes in which multiple sequences occur in parallel, e.g. more than one step being valid at a given time. By treating the step as a software flag the present invention places no restriction on whether steps must occur sequentially or whether they may also occur in parallel.

It should also be understood that the STEP operator is used to form a relationship between physical processes and the process control program statements being used to control those processes. In this regard, the STEP operator should not be confused with a program step. The STEP operator is associated with a state or condition of the physical process. Although the computer program controlling the process may perform a number of computational or data processing steps, there is not necessarily a one to one correspondence between a logical process STEP and a data processing step. By way of example, the STEP of declaring the bathtub to be full (STEP 3) may involve a number of numerical data processing steps in order to determine whether the AI(101) is greater than the AK(1001). Generally speaking, the data processing steps which the computer executes in order to implement the greater than operator have no direct relationship to the bathtub's state of being full (STEP 3). Hereinafter throughout this description, at times reference will be made to physical process STEPS and at other times reference will be made to the data processing steps needed to perform an algorithm. To assist the reader in distinguishing these two concepts, the physical process STEP and the STEP operator are written in all capital letters. Data processing steps are not written in all capital letters.

The Deviation Function

Another useful special operator is the deviation operator written DEV, for comparing the difference between two values and a third value. Such an operator might be used, for example, to sound an alarm if an analog input value deviates from a setpoint analog constant value by more than a certain amount. The deviation operator might be provided in a process control computer language to calculate the difference between two analog values, convert that difference into an absolute value, and then compare the absolute value against a third analog value by subtraction. Based on the result of that calculation a digital resultant (TRUE/FALSE) would be generated. Although the procedure for performing the deviation comparison is fairly straightforward, creating a special DEV operator to perform this function is of great convenience to the process control system programmer.

The Termination Function

It is sometimes convenient to be able to force the termination of a given step and thereby allow the program to move on to the next step, in numerical order. The termination function TERM may be provided for this purpose.

The Simulation Functions

At times it may be useful for the programmer to simulate a digital or analog input variable under certain conditions. A number of different simulation algorithms may be used, depending on the requirements of an application. Sometimes, it is helpful to control or track certain variables, in order to allow "problem conditions" to be generated for program testing and evaluation, by manually intervening with the outputs related to certain simulation statements and to permit the simulation to respond to manual intervention as it would in an actual process.

The present invention is configured to handle simulations of this type. Generally speaking, the process control display program is capable of displaying any program statement or expression which is valid in the language. In this description the terminology AISIM and DISIM is used to denote simulated analog and digital input variables, respectively.

The Graphical User Interface

The presently preferred implementation of the process control display program uses a graphical user interface (GUI). The presently preferred embodiment runs under the X Windows environment, available under VAX/VMS Version V5.3 or later (available from the Digital Equipment Corporation). Suitable terminals include a VAXstation running DECwindows or an X terminal in the DECwindows mode. Suitable X terminals include the VT1300 from Digital Equipment Corporation and the Tektronix XP29 with optional TDEnet ROM. A color monitor with minimum resolution of 1024 pixels horizontal by 678 pixels vertical is preferred.

The Menu Bar

Figure 5:
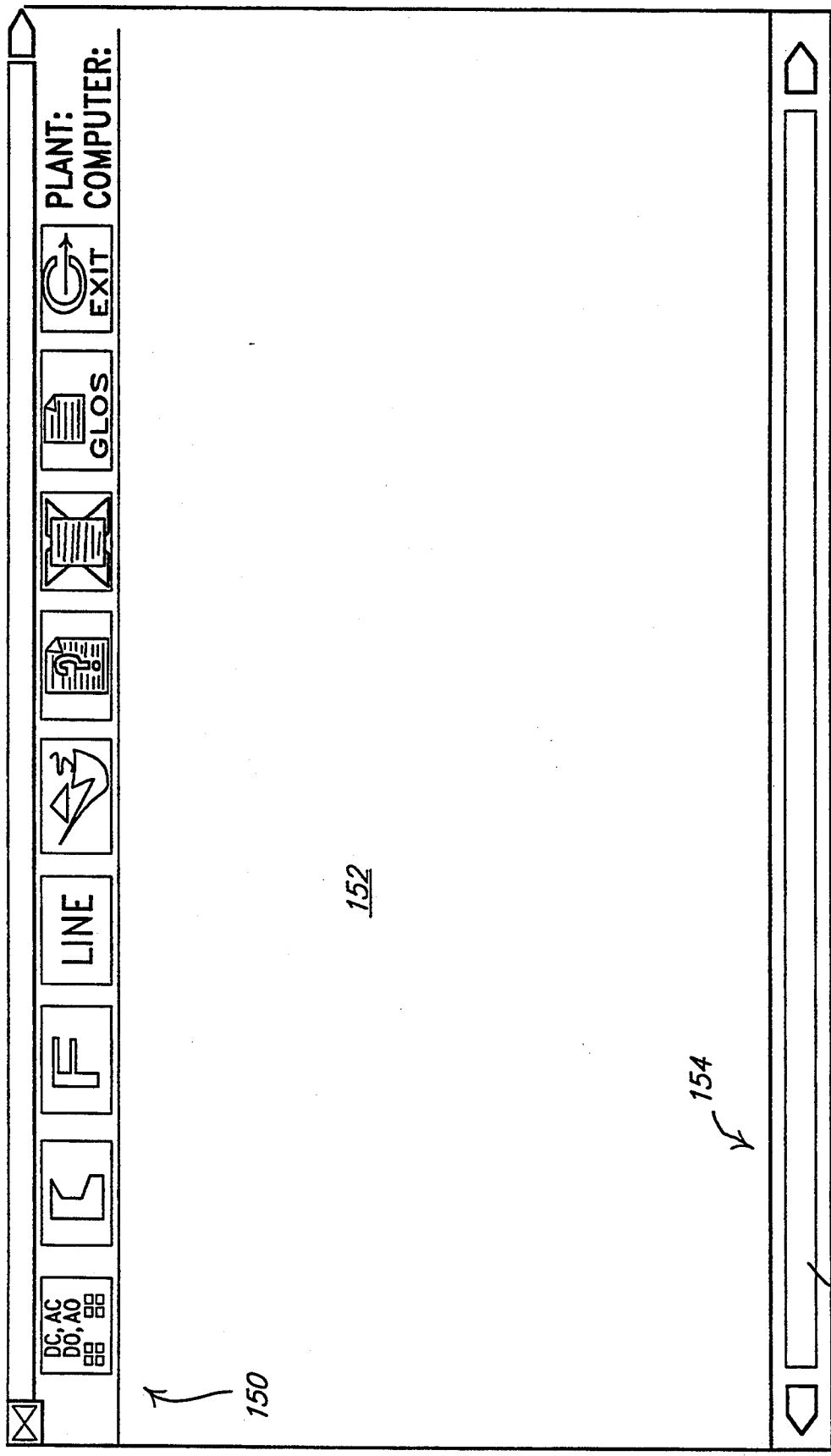
FIG. 5 depicts the presently preferred graphical user interface (GUI) of the process control display program.

FIG. 5 illustrates the presently preferred graphical window which appears on the user's screen (i.e., on display device 116) when the program is operated in the X Windows environment. Those familiar with the X Windows environment will understand that the window or screen depicted in FIG. 4 includes a menu bar 150 along the top horizontal edge of the screen. The menu bar includes an arrangement of buttons which may be selected using the pointing device (e.g., mouse 119) to invoke the desired functions. Below the menu bar 150 is the active window display area 152 in which the process control display program paints the dynamically changing graphical icons. This same display area is also used by the program to present alphanumeric textual messages.

Along the horizontal bottom edge of the screen is a message area 154 in which additional alphanumeric textual messages are presented. Beneath the message area 154 is a scroll bar 156, used to horizontally reposition or scroll the image depicted in the display area 152. The scroll bar is a normally provided feature of X Windows. Scrolling is not normally required when the process control display program is in operation, because the program includes an algorithm to ensure that the displayed image does not extend beyond the bounds of the window or screen. This algorithm is called the "hidden pipe algorithm" and is described in detail below.

The Dynamically Changing Icons

The process control display program employs a predefined set of graphical icons for representing the lexical units or symbols which are defined by the computer language. More specifically, the process control display program has predefined graphical icons for representing each of the tokens and any special purpose symbols which are employed to make up the program statements or expressions used in a process control program. The presently preferred embodiment has predefined graphical icons for most of the more commonly used tokens and special purpose symbols (e.g., STEP, Delay Timer, etc.). These icons have been devised to present an intuitive, symbolic understanding of the corresponding operand, operator or the status of a subroutine or function.

In general, the icons collectively should define a theme which will be understood by the human technicians responsible for overseeing the process. By way of example, in a chemical processing plant, pipes and valves are commonly employed. Thus when adapting the process control display program to a chemical processing application, graphical symbols representing pipes and valves would be preferred. Of course, if the process control display program is to be used to monitor support systems on an aircraft, other graphical symbols might be chosen.

The use of pipes and valves, as symbols for representing computer logic, should not be confused with physical pipes and valves which might be used in a plant. In general there is no one-to-one correspondence between the graphical icon "pipes" and "valves" used in the invention and the physical pipes and valves which may exist in a plant.

Figure 6:
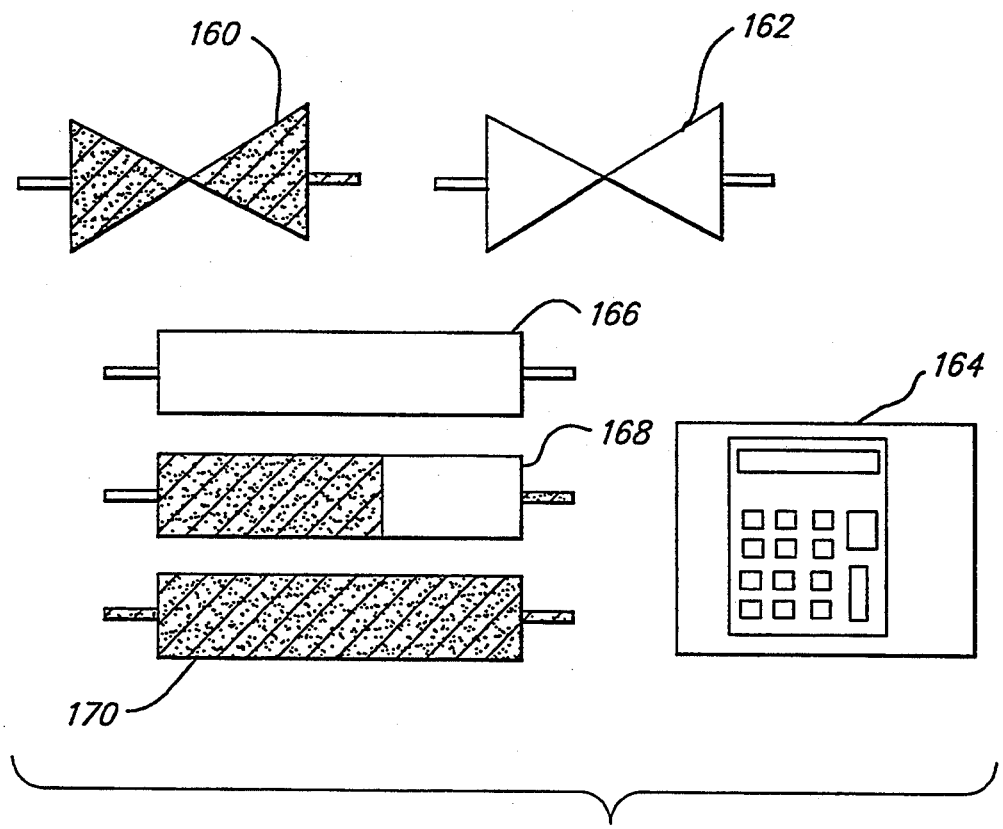
FIG. 6 illustrates the presently preferred graphical icons for representing various analog and digital values and expressions.

In keeping with the chemical processing plant theme, the presently preferred graphical icon for a digital variable or operand (such as DI, DC, DO, DK) is that of an on/off valve, depicted using a "bow tie" symbol (160 and 162) shown in FIG. 6. According to another aspect of the invention, the graphical icon, and its incoming and outgoing connecting lines or "pipes," are made to change visual quality (e.g., color) to distinguish different conditions or states of the operator or operand. Thus in FIG. 6, the digital operand 160 is shown in a first state of visual quality while digital operand 162 is shown in a second state of visual quality.

The presently preferred embodiment uses specific colors to distinguish conditions or states. The color BLUE is used to denote the state or condition of TRUE or ON, while the color ORANGE is used to denote the state or condition of FALSE or OFF. The visual quality or color of the various graphical icons are made to change, preferably in real time, in order to provide the human operator with a symbolic, nonverbal understanding of the logical relationships among the lexical units or symbols comprising the program statement or expression, including the real time or instantaneous conditions or states of those lexical units or symbols.

The colors BLUE and ORANGE are presently preferred because studies have shown that these colors are readily discriminated by most human technicians, even those suffering from color blindness.

In addition to the BLUE and ORANGE colors, the color GREY is also used in a color system to denote indeterminate states, which are neither TRUE nor FALSE. Such indeterminate states might occur, for example, when the system has detected a faulty communication line from which it can be inferred that data at the port connected to that communication line cannot be reliably treated as either TRUE or FALSE.

Although the presently preferred visual quality is color, other visual attributes such as texture and shading could also be used. Furthermore, in systems which do not have color displays, different shades of grey can be used to denote TRUE and FALSE and white (no shading) can be used to denote the indeterminate state. To illustrate this, the Figures of this specification show TRUE as light grey, FALSE as dark grey and the indeterminate state as white.

Arithmetic expressions are depicted by a "pocket calculator" icon 164 also shown in FIG. 6. Although the pocket calculator icon does not itself convey the actual numerical value, the value can be displayed in the message area 154, or next to the icon itself, when the icon is clicked on or selected by the mouse.

Often, knowing the precise value or condition of an analog operand is not as important as knowing how that value or condition compares to another value or condition. As described above, the deviation function DEV is used to compare the difference between analog values. The presently preferred graphical icon for such a comparison is the bar graph icon shown in FIG. 6 at 166, 168 and 170. As illustrated, the bar graph can change from fully BLUE, as at 166, to fully ORANGE, as at 170, as well as assume any intermediate condition, as at 168. The relative values displayed automatically take the scale factor of both analog values into account. The DEV function is itself a logical operator which returns a Boolean (TRUE/FALSE) value.

The graphical icon symbols are connected to one another via horizontal and vertical lines resembling pipes which also change color between BLUE and ORANGE depending on the state of the associated icon. The graphical icons are connected together strictly in accordance with the program statement or expression being depicted. In this way the logical relationship of the lexical units making up the expression is graphically depicted. Moreover, as the colors change from ORANGE to BLUE and from BLUE to ORANGE, in real time, the abstract concept of logic flow through the program statement or expression is readily comprehended.

Figure 7B:
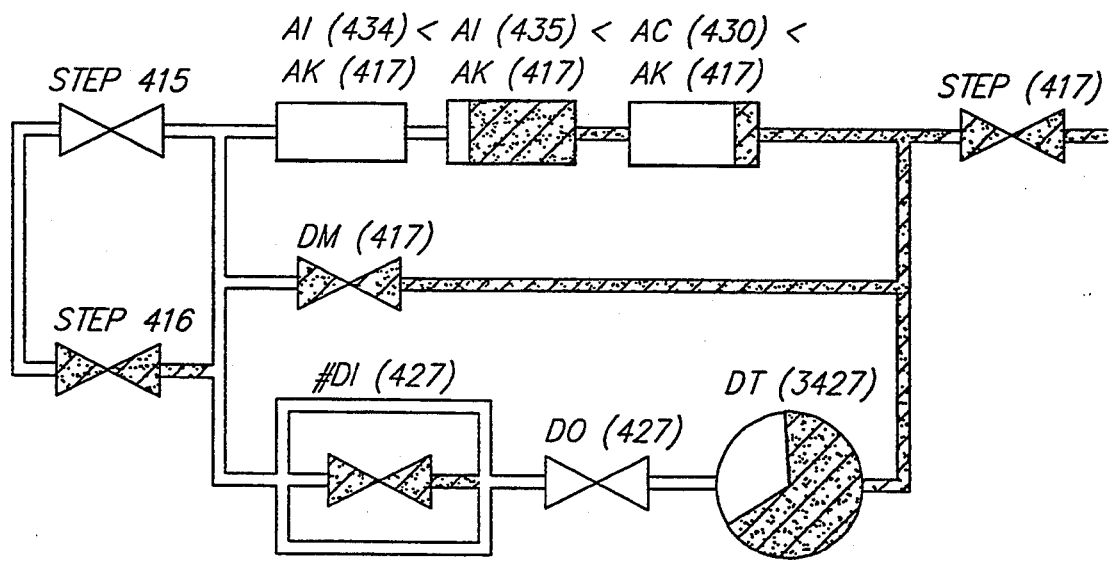
FIG. 7b illustrates another example of the representation of a process control statement using dynamic graphical icons.
Figure 7A:
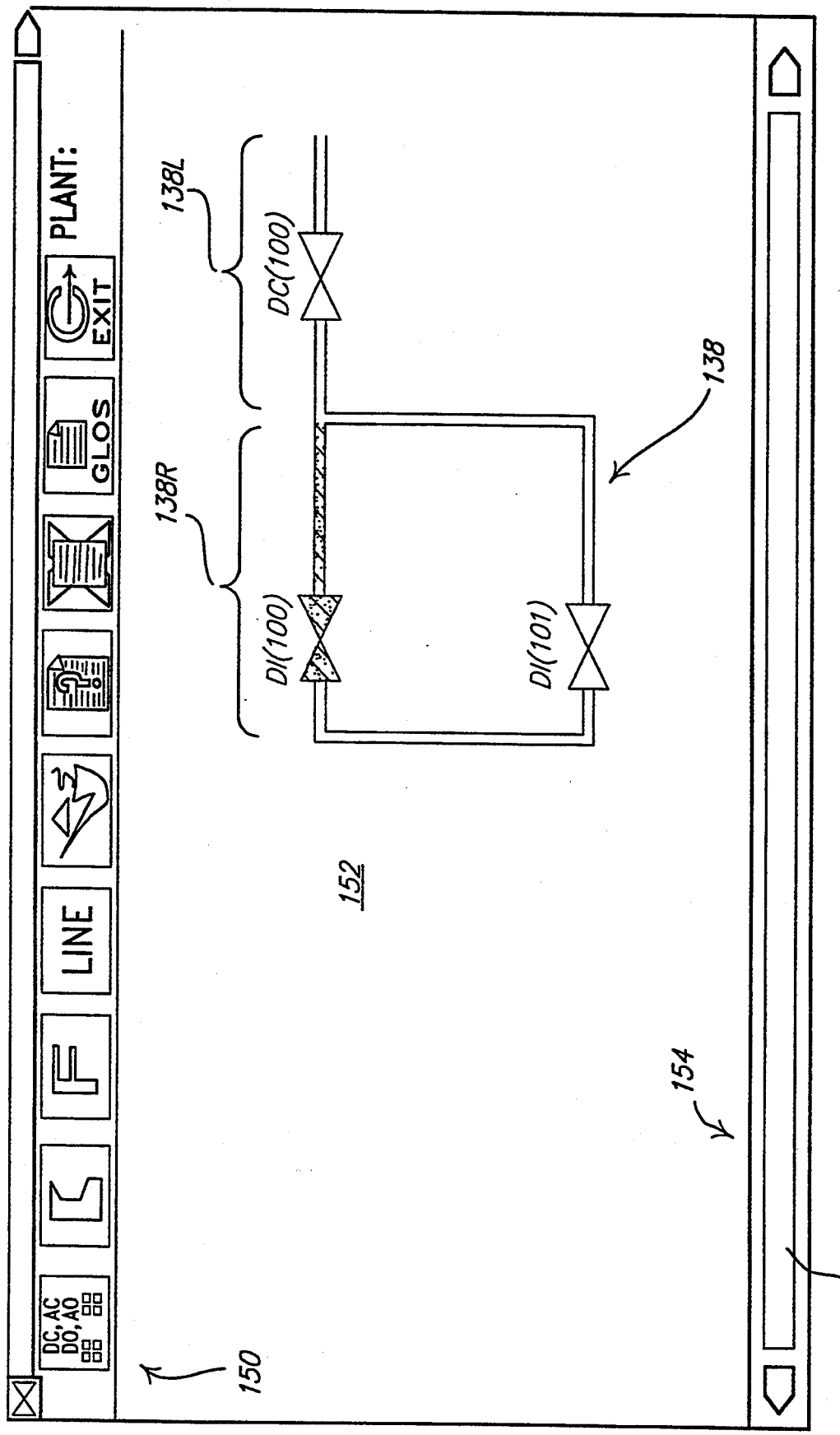
FIG. 7a illustrates an exemplary process control statement in graphical icon representation within the window of the presently preferred graphical user interface of FIG. 5.

With reference to FIG. 7a, the logical expression 138 (previously shown and described in FIG. 3) is now shown in the display area of the screen as an arrangement of graphical icons in a spatial relationship corresponding to the logical relationship of the lexical units. The graphical display is read from left to right. It is thus readily comprehended from the illustration of FIG. 7a that the resultant DC(100) is TRUE if either operand DI(100) or DI(101) is TRUE. This would appear quite intuitively to a chemical plant technician, who would understand that flow would proceed from left to right and that the resultant DC(100) would be "filled" with the TRUE state if either valve DI(100) or valve DI(101) is open (through which the TRUE condition may flow).

A comparison of the illustration of FIG. 7a with that of FIG. 3 shows that the operators DI(100) and DI(101) make up the right-hand side 138R of the program statement while DC(100) makes up the left-hand or resultant side 138L. By way of continued illustration, the resultant DC(100) is depicted as TRUE, which can be seen to logically flow as a result of input DI(101) being TRUE. In this example, input DI(100) is shown as FALSE, but in accordance with Boolean logic that does not affect the outcome that resultant DC(100) is TRUE.

Implicit in the above illustration of FIG. 7a is the OR relationship which defines the relationship among the operands and the resultant. In the presently preferred embodiment, operands (variables, constants, etc.) which are related by the Boolean OR operator are aligned and connected vertically. Operands related by the Boolean AND operator or aligned and connected horizontally. FIGS. 8-12 depict the presently preferred manner of depicting the physical layout relationship of icons utilizing the Boolean AND, OR and XOR operators, as well as the NOT operator and the nesting feature. Later, in FIG. 7b, a more detailed example will be presented which shows the layout of these operators in use.

Figure 8:
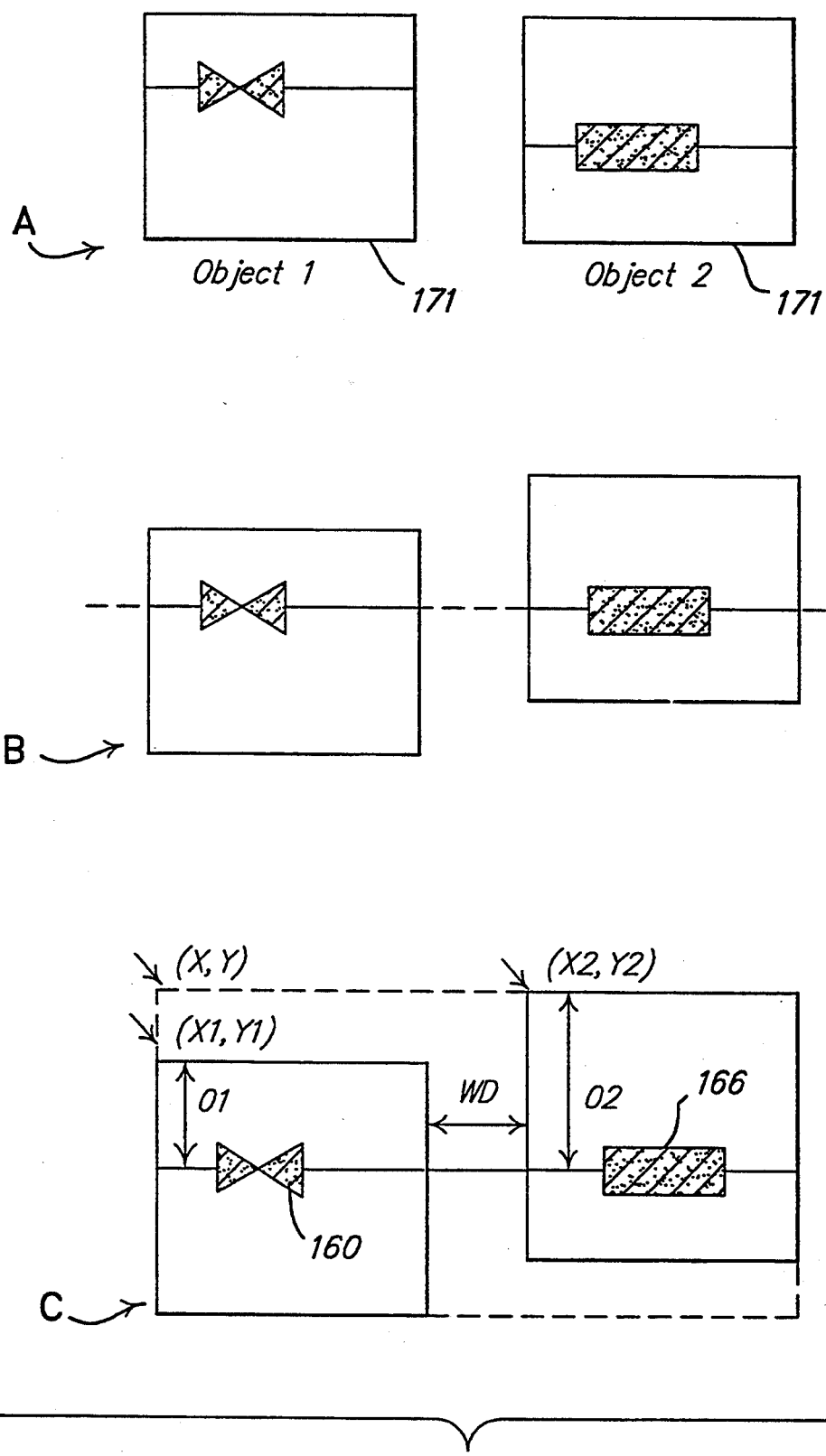
FIG. 8 illustrates the manner in which the AND relationship is graphically depicted.

FIG. 8 shows the manner in which two graphical icons or objects are spatially arranged when related by the AND operator. As illustrated, each object has an associated boundary box 171 which completely surrounds the icon, including the icon's incoming and outgoing lines or "pipes." Accordingly, two such boundary boxes are illustrated at A in FIG. 8. Note that the incoming and outgoing connection lines for the respective object 1 and object 2 icons do not line up when the respective boundary boxes are aligned, as shown at A.

The preferred embodiment aligns objects which are related by the AND operator so that the incoming and outgoing connecting lines of the objects being joined are horizontally aligned. This is shown at B of FIG. 8. Thus the respective boundary box positions may be adjusted by an offset needed to align the interconnecting lines horizontally. This is implemented by assigning a predetermined offset for each graphical icon type. As shown at C in FIG. 8 the bow tie symbol 160 has an offset of 01. The bar graph symbol 166 has an offset of 02. The offset is measured from the horizontal interconnecting line to the upper horizontal edge of the boundary box. Also shown in FIG. 8 at C, the boundary boxes are separated by a distance WD. The position of each boundary box is given by the (X,Y) position of the upper left-hand corner of the box. The position of object 1 is therefore (X1,Y1) and the position of object 2 (X2,Y2) in FIG. 8. Later, in Table V, the formulas for computing the boundary box dimensions and positions of objects grouped by the relational operators (AND, OR, XOR, etc.) will be given. See the later description of "Pass 1 of Display Calculation Module," appearing as one of the subsections of the "Detailed Description of the Software."

Figure 9:
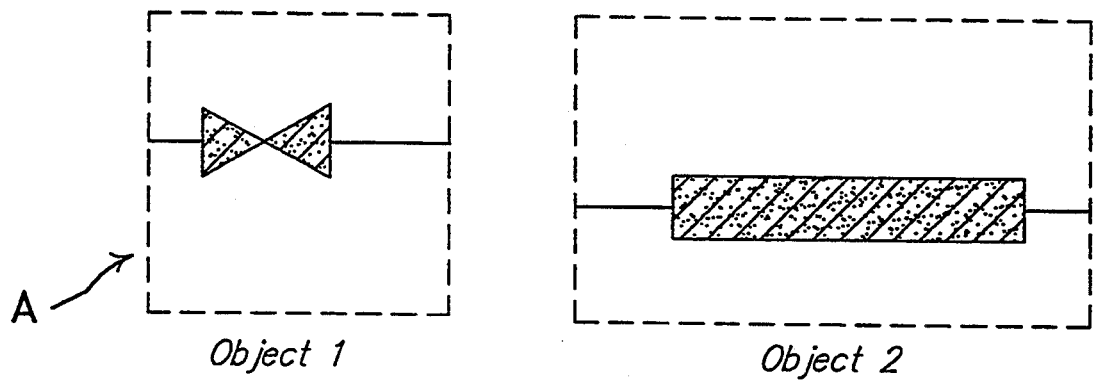
FIG. 9 illustrates the manner in which the OR relationship is graphically depicted.
Figure 9:
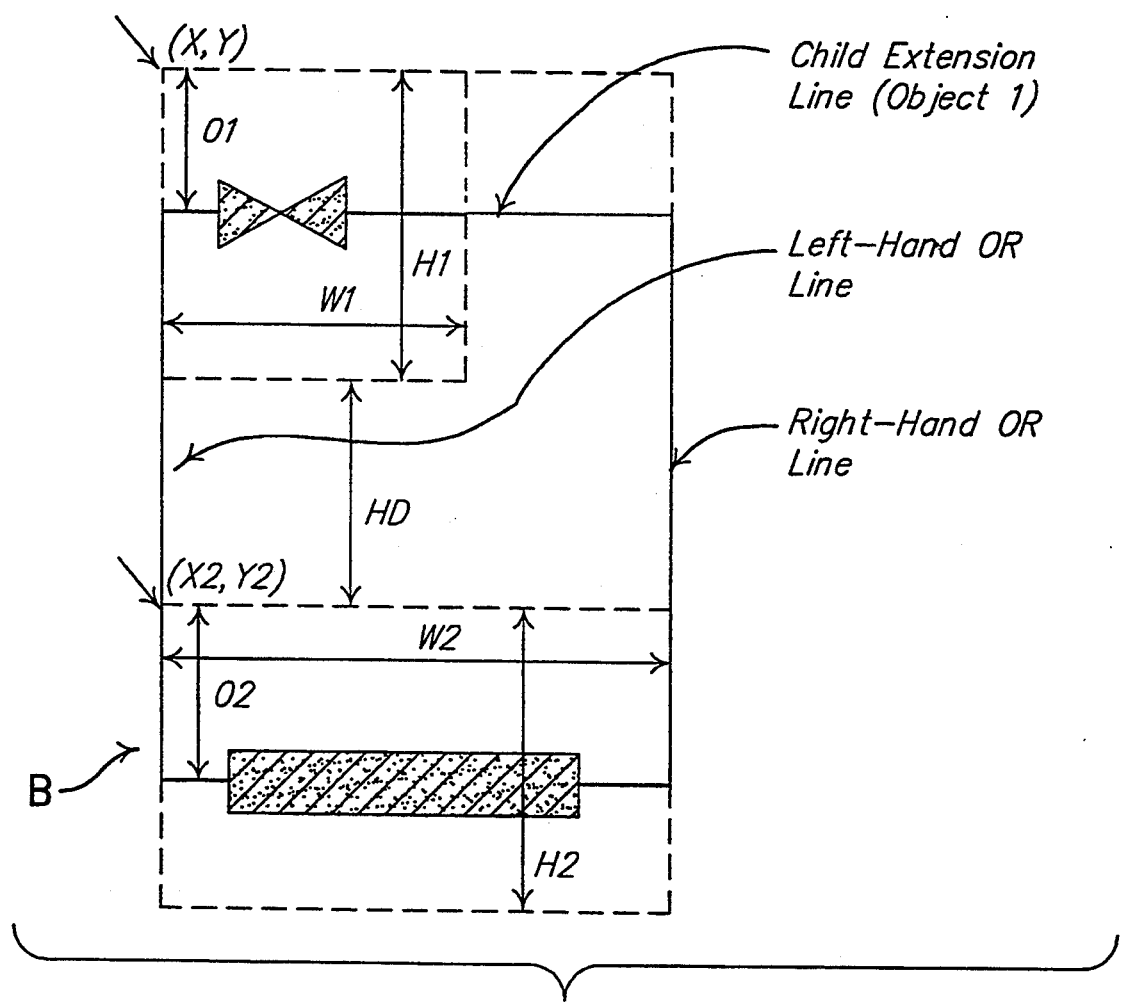

FIG. 9 illustrates how the OR relationship is graphically depicted. In this case, the objects shown at A are aligned vertically as shown at B. The boundary boxes of the respective objects are separated a distance HD. Note that the left-hand OR line is drawn to interconnect the incoming lines of both objects. The boundary boxes of both objects have been vertically aligned along the respective left edges, as illustrated at B. Because object 1 has a smaller width W1 than object 2, a child extension line must be added to the outgoing line from object 1 in order that the resulting outgoing lines of both objects will join with the right-hand OR line, as illustrated.

Figure 10:
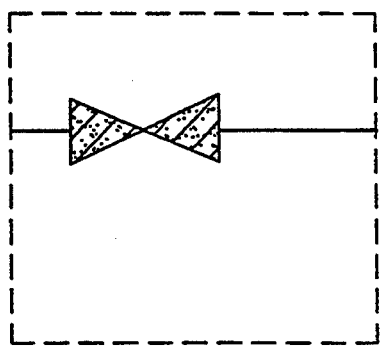
FIG. 10 illustrates the manner in which the XOR relationship is graphically depicted.
Figure 10:
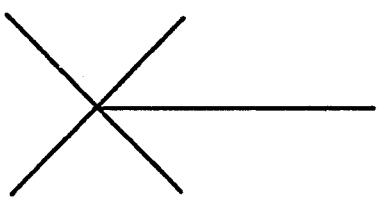
Figure 10:
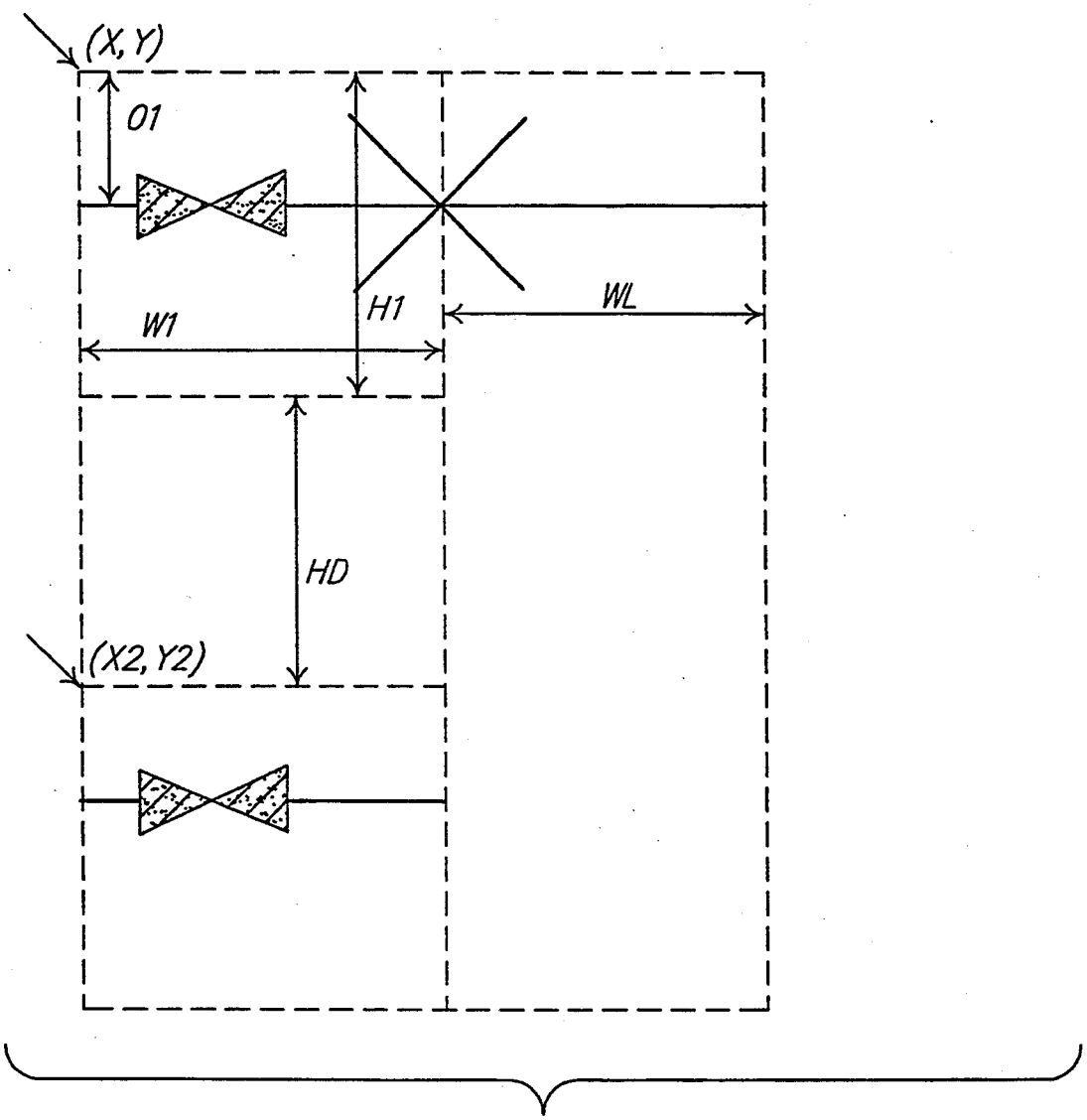

FIG. 10 depicts the XOR object. As illustrated, two objects joined by the XOR operator are aligned vertically, as in the case of the OR operator. In addition, the XOR object is added to the composite drawing. Note that the XOR object is drawn partially inside the boundary box of the object positioned at (X,Y). The XOR object thus results in a horizontal extension of the composite boundary box equal to the dimension WL.

Figure 11:
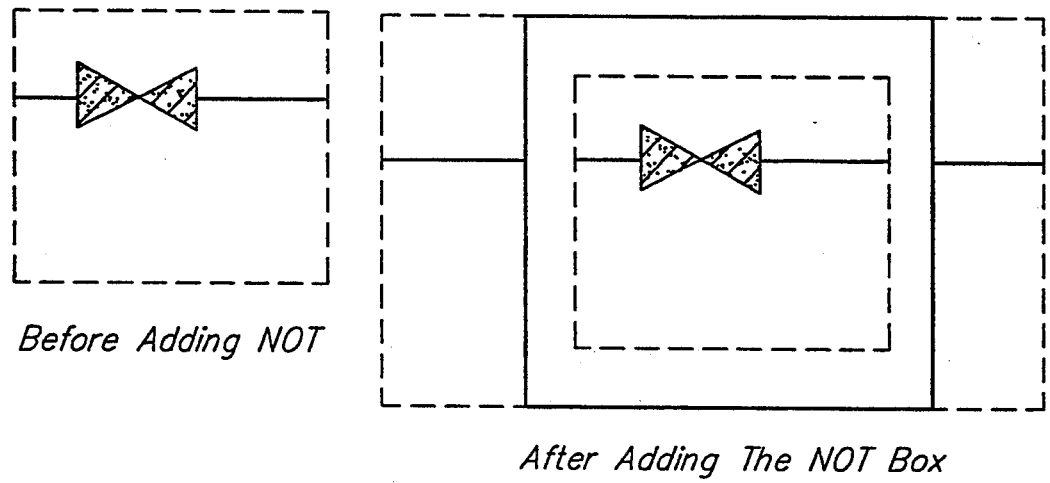
FIG. 11 illustrates the manner in which the NOT relationship is graphically depicted.
Figure 11:
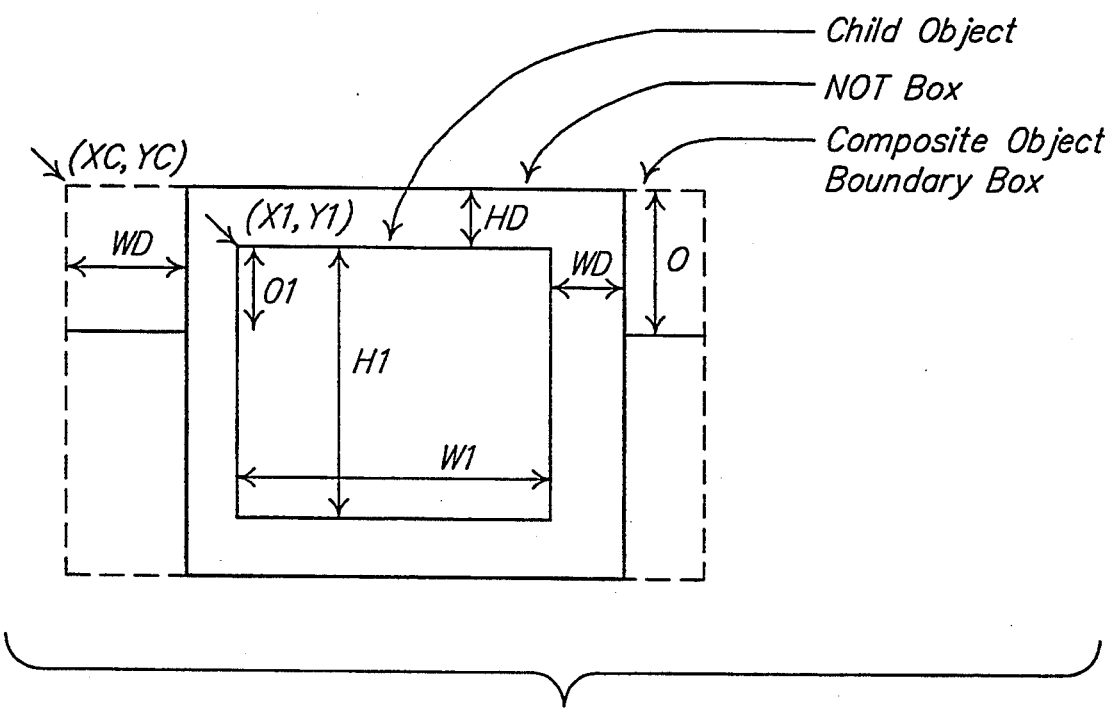

FIG. 11 shows how the NOT operator is depicted. As illustrated, the NOT box is added around the boundary box of the object which it encloses. The NOT box, itself, has incoming and outgoing lines. Thus the boundary box for the composite object (including the child object and the NOT box) is extended in the horizontal dimension to accommodate the length of the incoming and outgoing lines of the NOT box.

Figure 12:
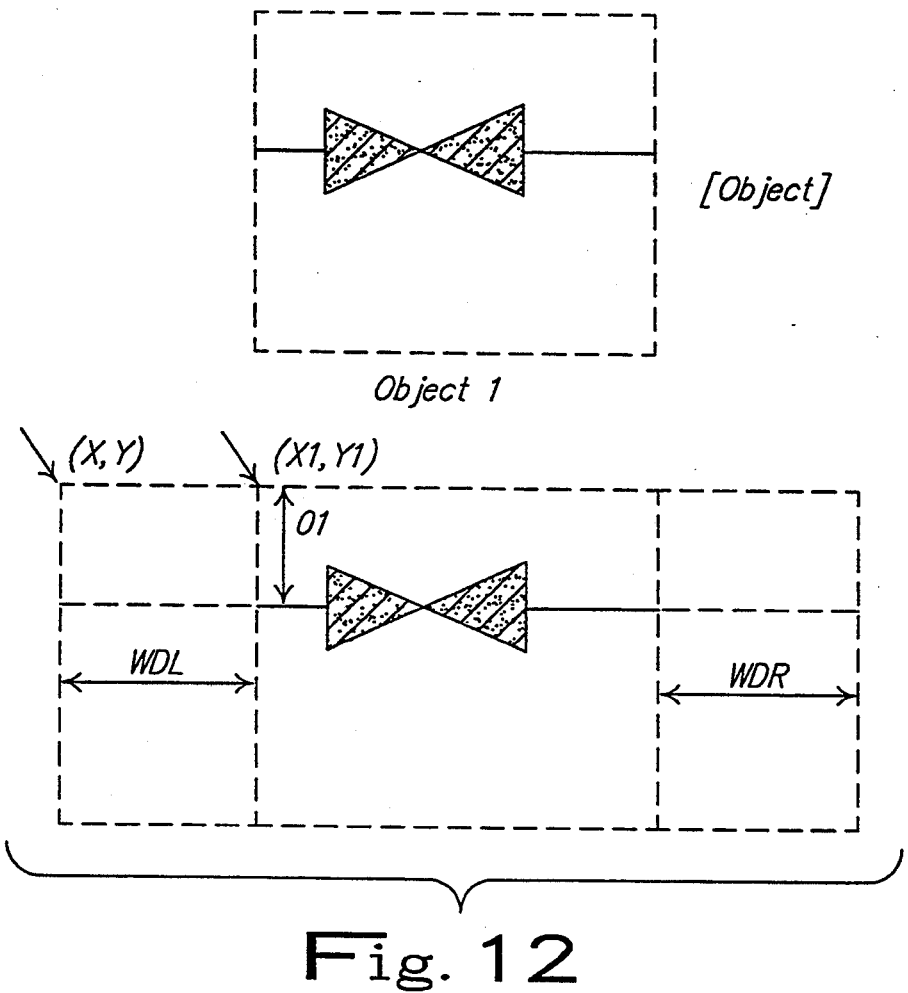
FIG. 12 illustrates the manner in which a nested or bracketed relationship is graphically depicted.

FIG. 12 illustrates the manner in which nested or bracketed relationships are illustrated. Essentially, an object, or group of objects, is positioned within a larger boundary box which is extended in the horizontal dimension by the sum of dimensions WDL and WDR. Although a single object has been shown within the bracketed or nested relationship in FIG. 12, in practice the bracketed or nested relationship is used to group a multiplicity of objects together, in order to control the precedence in which operations are performed as the program statement or expression is executed.

The presently preferred delay timer icon is shown in FIGS. 13a and 13b. In FIG. 13a a series of four delay timer icons is shown to illustrate the sequence by which the OFF time is delayed. Referring to FIG. 13a, the presently preferred delay timer icon comprises a "pie chart" circle 172. The sequence in FIG. 13a begins at the left, designated by the state A. In state A the circle 172 is BLUE (light grey), representing TRUE or ON. In states B and C the circle 172 progressively changes to the ORANGE (dark grey) color. The circle is seen as a pie chart which progressively changes in a clockwise direction until it is fully ORANGE, representing FALSE or OFF. As shown at state D, once the delay timer has timed out, the circle has fully changed to the ORANGE color.

The flow of logic through the delay timer is affected by the color of the circle. In FIG. 13a, states A, B and C, the circle represents the TRUE or ON state. Only at state D does the circle change to the FALSE or OFF state. In terms of the logic flow analogy, the TRUE or ON state will flow through the delay timer of FIG. 8 while the delay timer is at states A, B and C. It is only when state D is achieved that the logic flow is cut off, i.e. switched to the FALSE or OFF state.

FIG. 13b depicts the delay timer in the opposite sequence, going from a FALSE or OFF state to a TRUE or ON state. As illustrated in FIG. 13b, the circle pie chart rotates in the opposite direction (see states B and C). The circle remains indicative of FALSE or OFF until it has fully changed to TRUE (see state D). In other words, the delay timer of FIG. 13b will prevent the flow of logic until the timer has timed out at state D.

The rate at which the circle changes state is determined by the integer values which establish the ON time delay and the OFF time delay of a given delay timer. With reference to FIGS. 13a and 13b, the OFF time delay integer controls the clockwise rotation of the circle pie chart (FIG. 13a); the ON time delay integer controls the counterclockwise rotation of the circle pie chart (FIG. 13b). Because these integers can be different, the delay timer can effect different OFF time and ON time delays.

Figure 14:
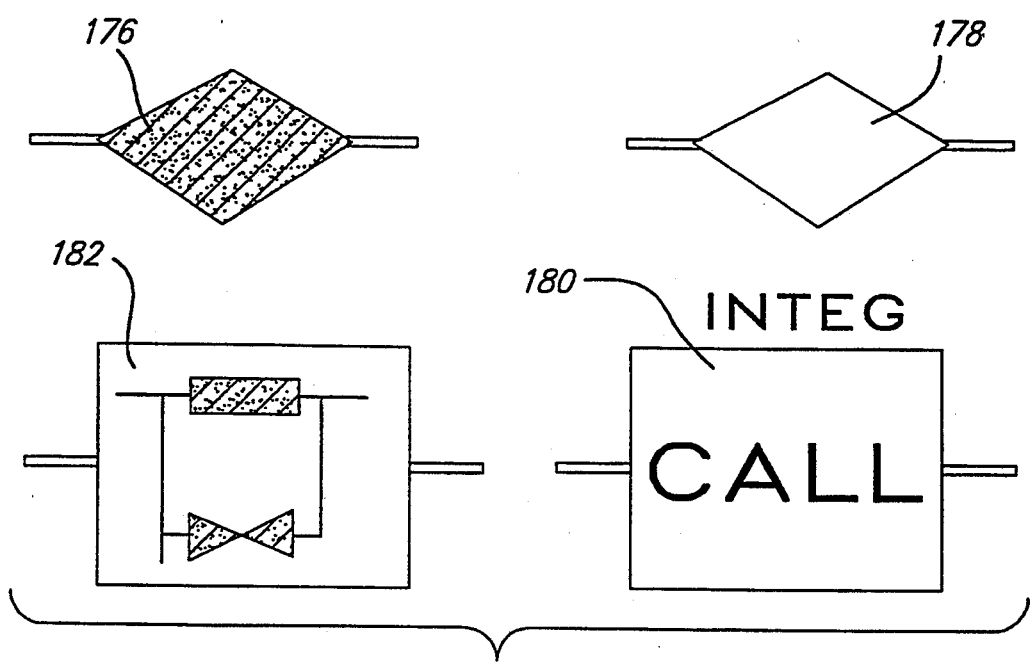
FIG. 14 illustrates additional 180 graphical icons useful in practicing the invention.

FIG. 14 illustrates a few additional graphical icons which are useful in the presently preferred embodiment. The diamond-shaped step icons 176 and 178 show the respective FALSE and TRUE states. It will be recalled that many physical processes are described in terms of physical process "STEPS," e.g. empty tank, clean tank, mix reactants, and so forth. The programmer writes the process control program with this in mind, by defining software states (e.g. setting attributes within a data structure) to represent these "STEPS."

To accommodate instances where there is no predefined graphical icon to represent an operator (e.g. in the case of a rarely used subroutine) the CALL icon 180 is provided. The CALL icon simply denotes that program flow is being directed or routed to a called subroutine or function. The name of the called subroutine or function is written in alphanumeric characters above the CALL icon. In FIG. 14 the alphanumeric name of the integration function, INTEG, has been illustrated.

Another special purpose icon is the hidden pipe icon 182. As described more fully below, the presently preferred embodiment has been written to display, where possible, the entire program statement or expression on the screen, without truncating. In the presently preferred embodiment, the icon size remains fixed, regardless of the complexity of the program statement. Therefore, in some instances, the full display of a complex program statement would cause portions of the display to extend beyond the boundaries of the display window. Rather than require the user to scroll back and forth to see the image, a hidden pipe algorithm is used to reduce the complexity of the displayed image. This is done by replacing a logically related or nested group of icons with a single hidden pipe icon 182. Thus the hidden pipe icon is used as a symbol to represent or hide a more complex relationship beneath. To see the hidden relationship, the user simply clicks on or selects the hidden pipe icon in question and the program then displays the operators for which the hidden icon was substituted.

Layout of Preferred Graphical Display

Using the above-described icons, a wide range of different program statements can be graphically depicted or rendered. As an example, the following program statement is graphically depicted in the display area 152 in FIG. 7b.

```
STEP(417) IF STEP(415) OR STEP(416) AND
[AI(434) LT AK(417,400,1000) AND AI(435) LT
AK(417) AND AC(430) LT AK(417) OR
DM(417) OR [#DI(427) AND DO(427) FOR
DT(3427,5,2)]]
```

For purposes of illustration, assume that STEP(415) is TRUE, STEP(416) is FALSE, that digital variable DM(417) is FALSE and digital variable DO(427) is TRUE. Further assume that digital variable DOT(427) is NOT TRUE and that AI(434) is less than AP(417); AI(435) is NOT less than AP(417); and AC(430) is less than AP(417). With these assumptions, refer to FIG. 7b. From that Figure it is seen that the resultant or LVAL, STEP(417) is FALSE and it can be seen the reason why. Because the analog variable AI(435) is NOT less than the analog variable AP(417), TRUE logic cannot flow through the topmost branch. Because the digital variable DM(417) is FALSE, the flow of TRUE logic cannot proceed through the middle branch. Finally, although TRUE logic is available from digital variable DO(427), the delay timer DT(3427) has not yet timed out. If none of the variables in this example change, eventually the delay timer DT(3427) will time out, permitting the flow of TRUE logic to the resultant STEP(417).

The Menu Bar Buttons

Figure 15A:
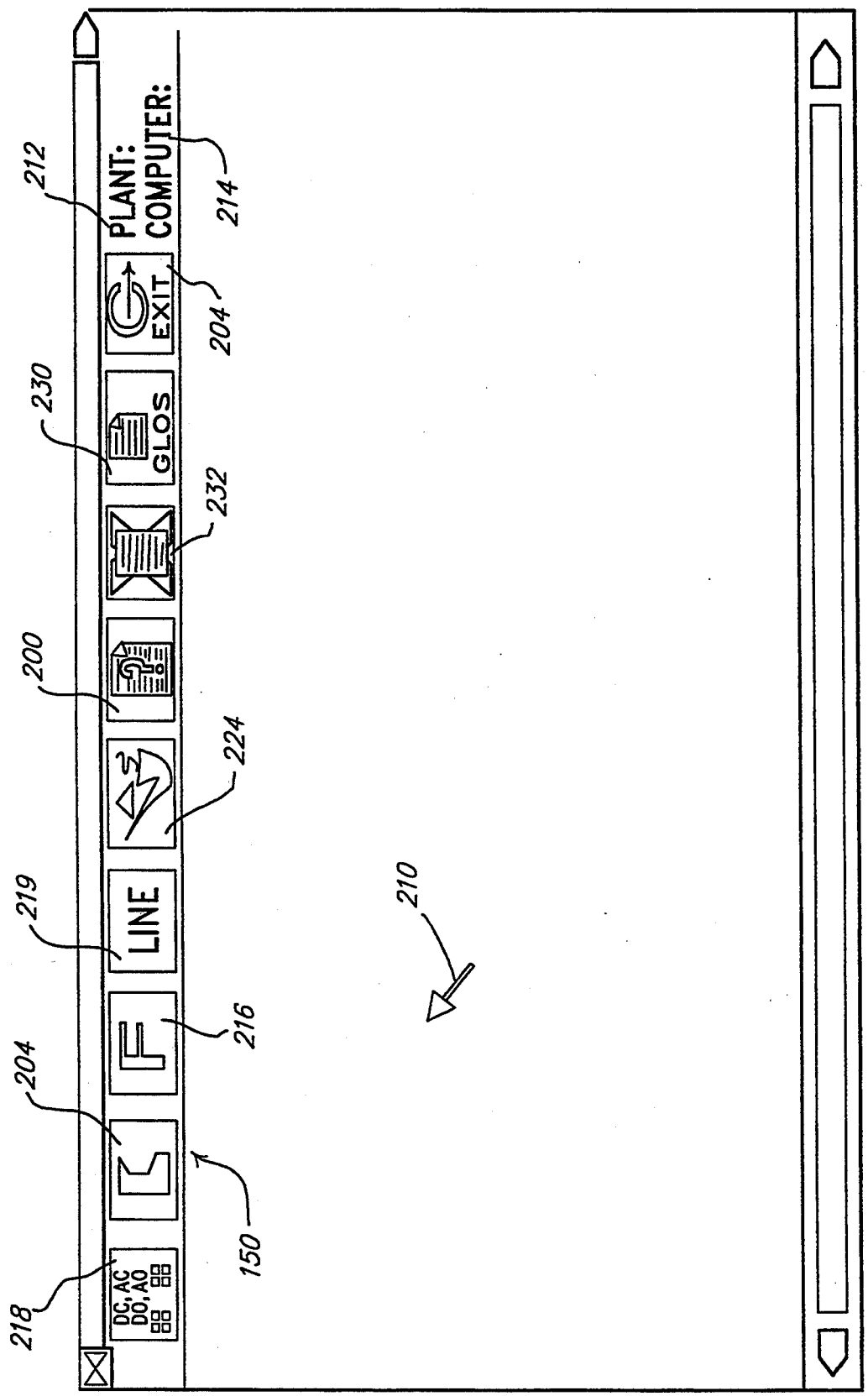
FIG. 15a shows the graphical user interface of FIG. 5, demonstrating use of the menu bar buttons.

Now having a basic understanding of the dynamically changing icon, a more detailed explanation of the menu bar buttons will be presented. Referring to FIG. 15a, the presently preferred menu bar has a number of buttons which can be clicked on or selected to allow the human operator to interact with the process control display program in various ways. This is done by placing the mouse cursor 210 over the selected button and then depressing or "clicking on" the mouse button. Some of the button functions are quite general. For example, the help button 200 may be selected to display on-screen help while running the program. The exit button 202 is used to terminate the process control display program and remove its window from the display device.

Several other buttons are used to allow the user to select the precise program statement he or she wants to display with dynamically changing icons. In large process control systems the human technician may wish to monitor a specific program statements running on a specific process control computer in a specific plant. For example, the system described in FIG. 1 represented a single plant, running a single process, with two process control computers 104 and 106. A larger system might have several plants, possibly at diverse locations, each having many processes and process control computers.

Figure 15B:
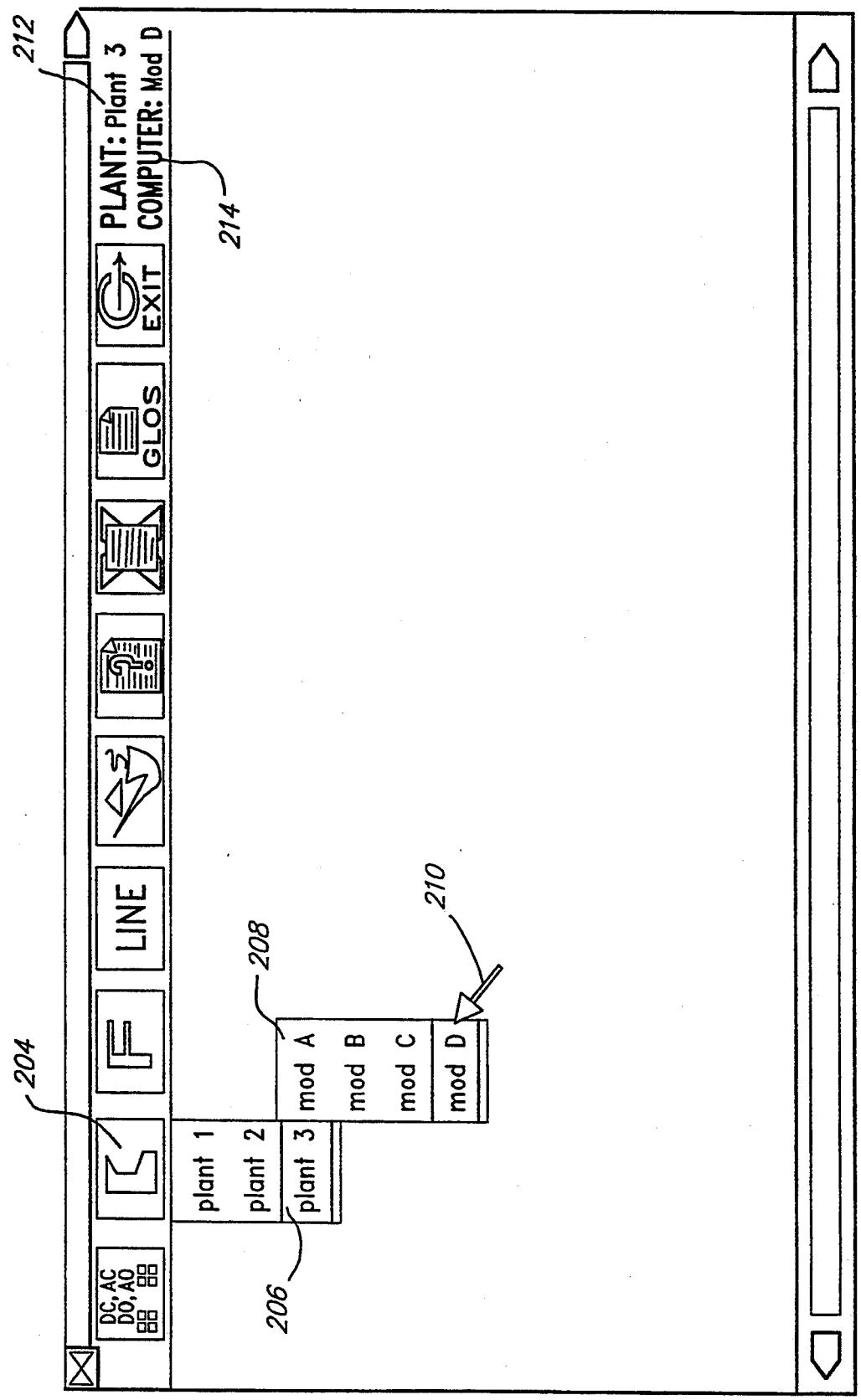
FIG. 15b shows the graphical user interface of FIG. 5, demonstrating the plant and computer selection process.

To allow the human technician to select which plant, and which process control computer within the plant, a computer selection button 204 is provided. Clicking on or selecting this button presents the user with a pull-down menu by which the desired plant and process control computer is selected. This pull-down menu is illustrated in FIG. 15b. In the presently preferred embodiment the pull-down menu is actually a pair of pull-down menus, a plant selection menu 206 and a computer selection menu 208. Thus the computer selection button 204 allows the human technician to select any plant, and any process control computer within that plant, simply by selecting the appropriate choices from the pull-down menus. By way of example, in FIG. 15b, plant 3 has been selected and the user's cursor 210 has selected a process control computer identified as Mod D from menu 108. Once the user clicks on or selects the desired plant and computer selection, the user's choices are displayed in the data fields 212 and 214 in the upper right-hand corner of the screen.

Occasionally, critical processes will be controlled by two or more redundant process control computers. For example, in the previous example the selected computer, named Mod D, might actually comprise two computers operating redundantly (in parallel or tandem). To allow the human technician to select which one of a group of redundant computers should be used for display, a redundant computer selection button 216 is provided as shown in FIG. 15a. Simple names or letters can be used to uniquely identify each of the group of redundant computers, with the currently selected name appearing on the button 216 itself. If only two redundant computers are provided, button 216 can be a simple toggle switch, for alternately selecting either one or the other. If more than two redundant computers are provided, a pull-down selection menu can be invoked by the button 216.

Figure 15C:
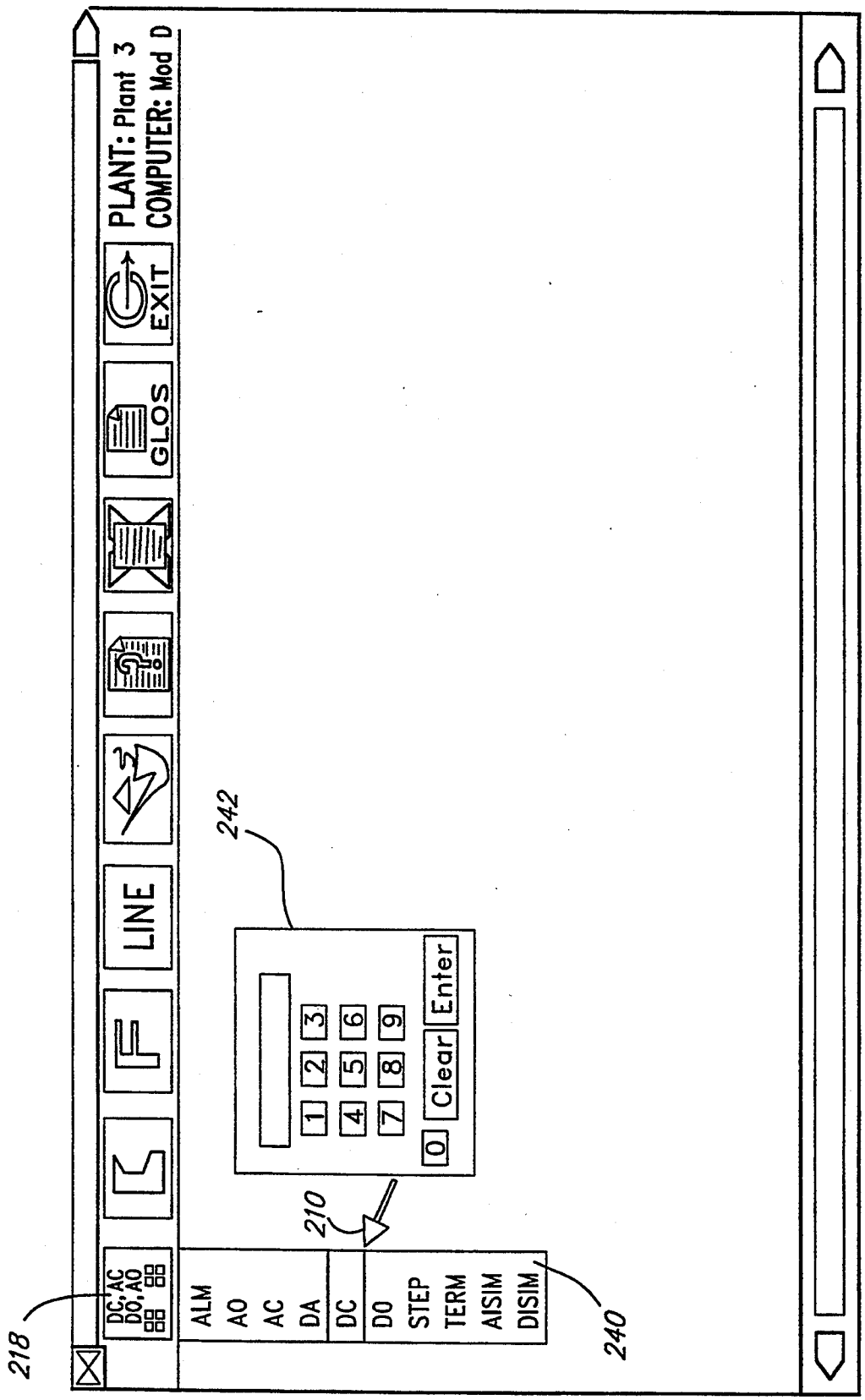
FIG. 15c shows the graphical user interface of FIG. 5, demonstrating the variable selection process.

Having selected the desired plant and computer, and having identified which of a redundant group of computers the user is interested in, the remaining buttons on menu bar 150 are used to give the human technician different ways of selecting a particular program statement or expression to be displayed. By selecting the operand selection button 218 a pull-down menu is provided which lists all of the possible digital and analog operands, including the special purpose operands, alarm, termination and simulation. This is shown in FIG. 15c. The user would first select the generic name of a desired operand, followed by the appropriate numerical values needed to uniquely identify the selection. For example, if the user wanted to select the calculated digital value DC(100), button 218 would be selected to reveal the illustrated pull-down menus. Next the variable name DC would be selected, followed by a selection of the digits 1,0,0, which are entered either by clicking on the keypad icon or by using an actual keypad on the keyboard 118.

Figure 15D:
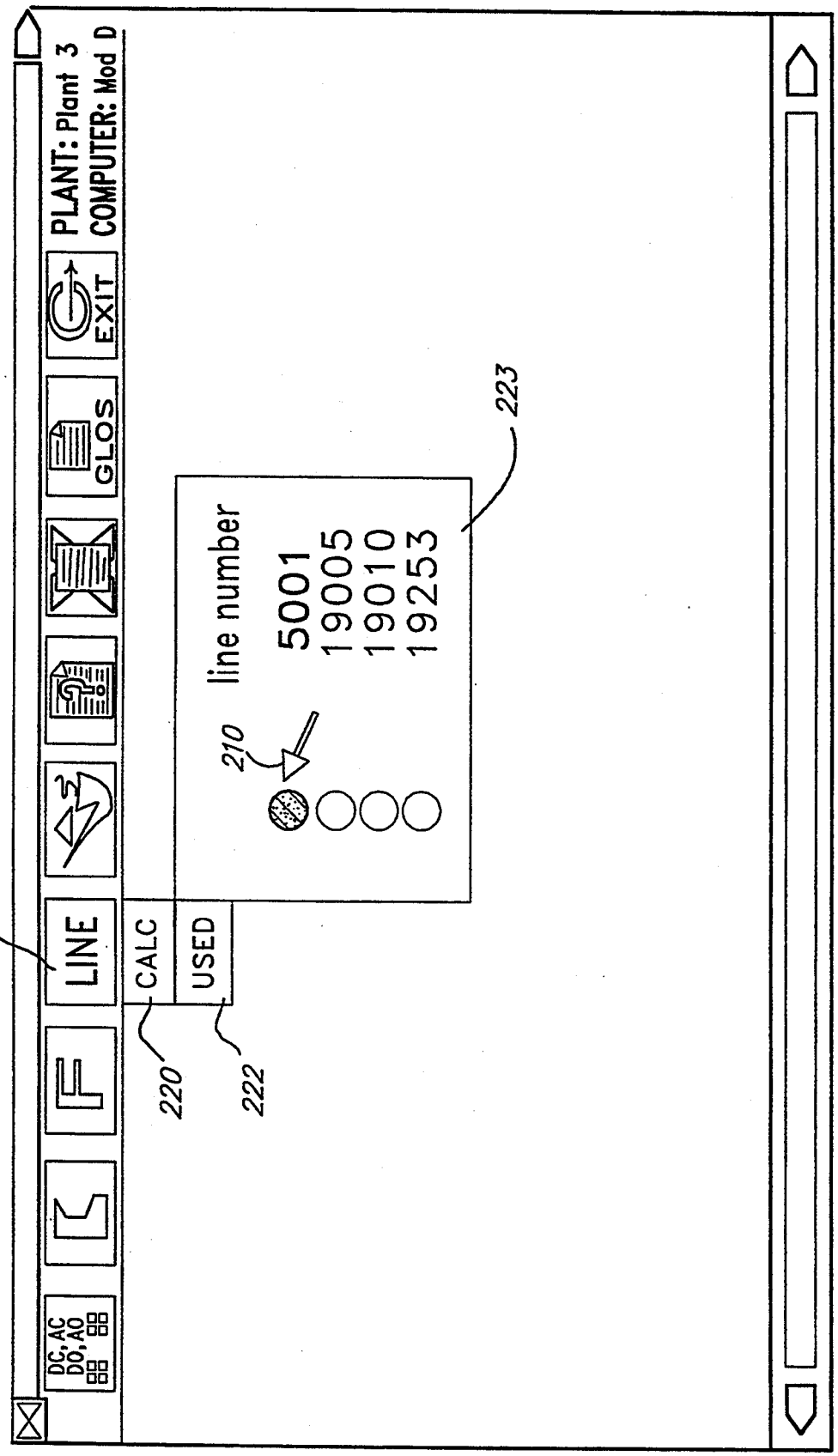
FIG. 15d shows the graphical user interface of FIG. 5, demonstrating the line number selection process.

By default, the program will display the statement in which the selected operand or variable was last calculated, and if not calculated, in which it was first used. The user may change this by using "Lines" button 219 (identified in FIGS. 15a and 15d). Using the Lines button, the user may choose any program statement or expression where a variable is defined or calculated or used. When the "Lines" button is selected from the main menu bar a two item pull-down menu appears, presenting the user with the option of selecting either calculated variables (CALC 220) or used variables (USED 222). When the USED choice is selected a radio button menu appears in which all line numbers where the current variable is used are listed. By selecting one of the line numbers from the radio button menu, the graphical representation of the selected line will be automatically displayed.

When the CALC option 220 is selected, a similar radio button menu appears in which all line numbers where the current variable is calculated are listed. By selecting one of the line numbers in that menu, the graphical representation of the selected line is automatically displayed. In this example the user has selected the statement where the variable was first used via radio button mouse 223.

Once a graphical representation is displayed, the user can click on any object comprising that display and that will cause a new display to appear representing the program statement at which the newly selected object is calculated. When a new display is created, either by using the menu bar to select a variable or by selecting an object in a currently displayed statement, the system automatically defaults to the "last calculated" statement. The radio button menu found under the CALC button 220 indicates this choice by appearing in a color different from the other radio button choices.

The menu bar also includes a pair of buttons, the glossary button 230 and the extended glossary button 232, which may be selected to request the display of alphanumeric text information giving further information about the variables displayed. See FIG. 15a. Often a programmer will include comments or explanatory material about a variable. In the example of Table III, the list of operands included a textual description of each variable and identifying which logic state (TRUE/FALSE) corresponds to which physical condition (e.g., open/closed). This textual information, or other similar information, could be included in a file for access by the human technician. The file would constitute a "Glossary" of the program statement variables.

In some complex systems, there may be a great deal of information which might potentially be displayed on the user's screen. As a means of organizing this information and of making it more readily accessible to the user, an "Extended Glossary" in the form of a hierarchial table or outline may be constructed. In this way, information about the system which might be useful to the human technician is arranged in levels and sublevels (e.g. in outline form). By using an outline form, the human technician can select the level of detail which he or she is interested in. This approach also allows certain information to be restricted or hidden from operators at selected facilities or password levels.

Figure 15E:
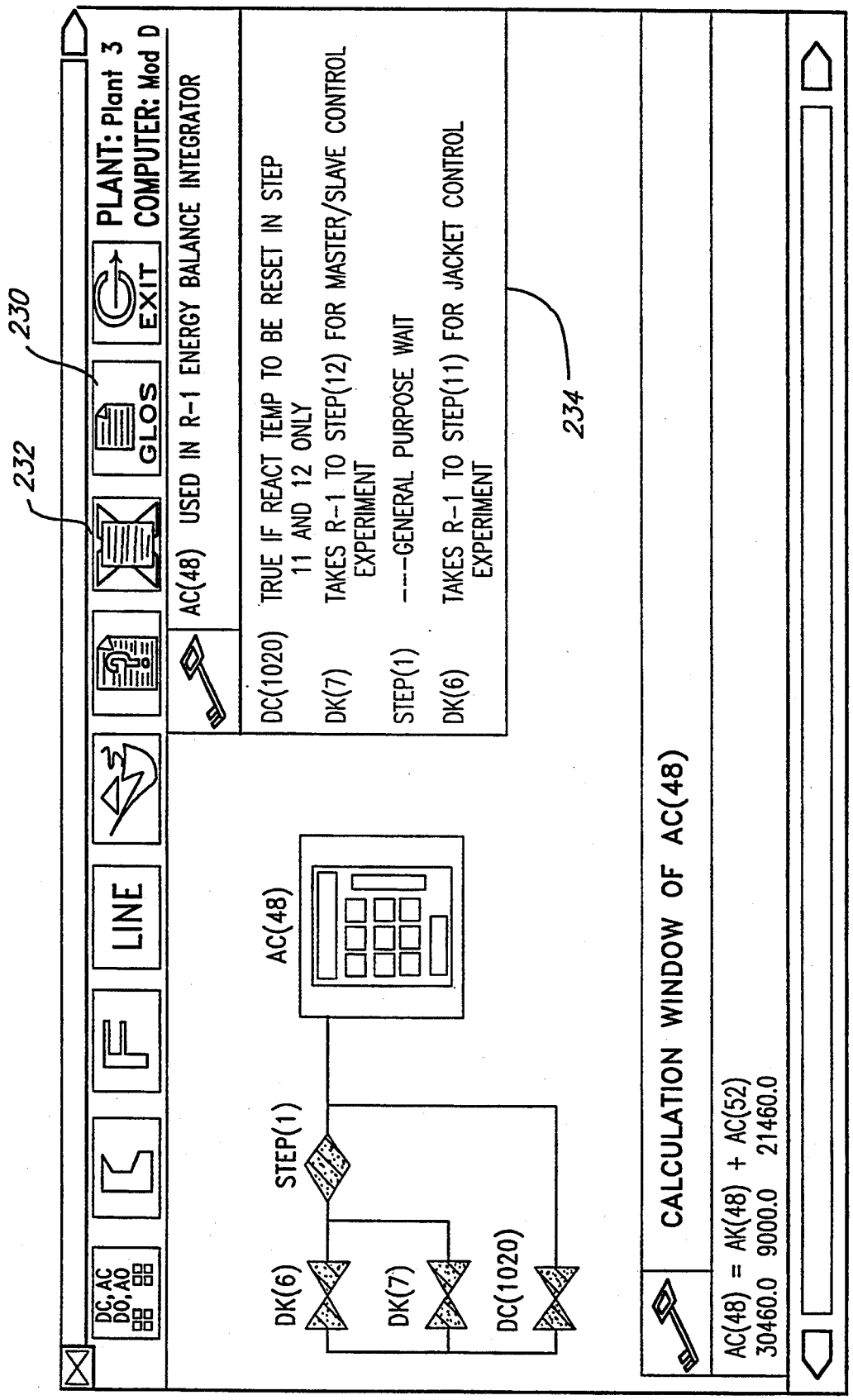
FIG. 15e shows the graphical user interface of FIG. 5, demonstrating use of the Glossary function.

The presently preferred embodiment is adapted to allow access to both Glossary and Extended Glossary information. By selecting the Glossary button, a pop-up window will appear adjacent the names of each variable for the selected program statement. In this way, the user is presented with a table which lists all operands or variables involved beside the corresponding Glossary entry. This is illustrated in FIG. 15e. By using the Glossary, the user can readily determine whether a selected variable is of interest or not. In the presently preferred embodiment the Glossary is displayed in a predefined portion of the window screen identified at 234. The window title line may also display the Glossary text of the variable that is currently being displayed. If desired, the Glossary can be made to automatically appear when the mouse cursor is moved or positioned over an icon for a particular variable of the program statement, or over the variable name in a pop-up menu text string.

Figure 15F:
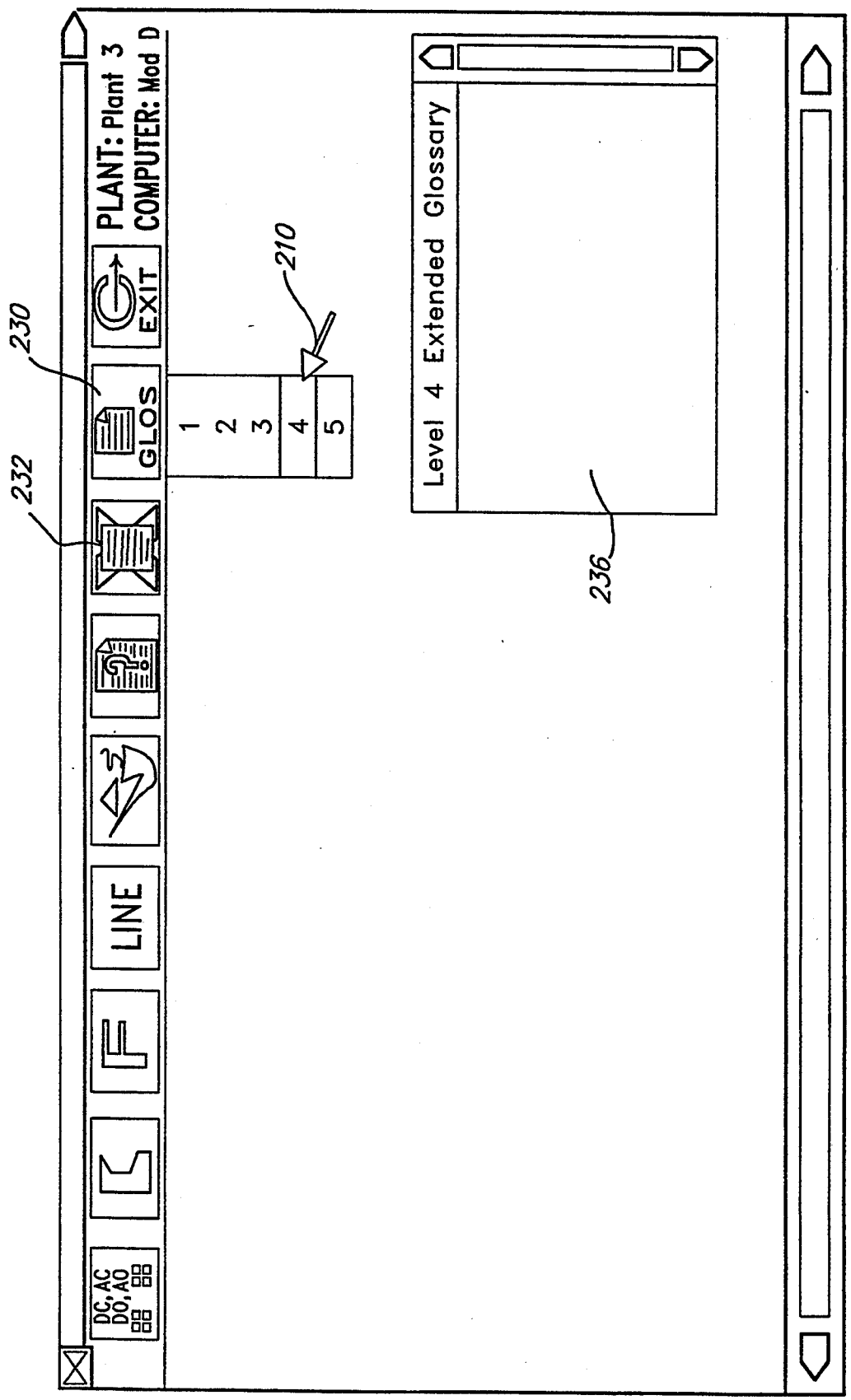
FIG. 15f shows the graphical user interface of FIG. 5, demonstrating use of the Extended Glossary function.

The Extended Glossary button 232 works in a similar fashion. When the Extended Glossary button is selected, the user is first presented with a pull-down numbered list corresponding to each hierarchial level in the Extended Glossary which is available to that user. The user selects the desired Extended Glossary level by clicking on the appropriate number. This then causes an Extended Glossary window to appear adjacent the selected variable. In the preferred embodiment, multiple lines of textual information can be displayed in the Extended Glossary pop-out window. See FIG. 15f. In FIG. 15f, the Extended Glossary pop-out window is designated 236.

Figure 15G:
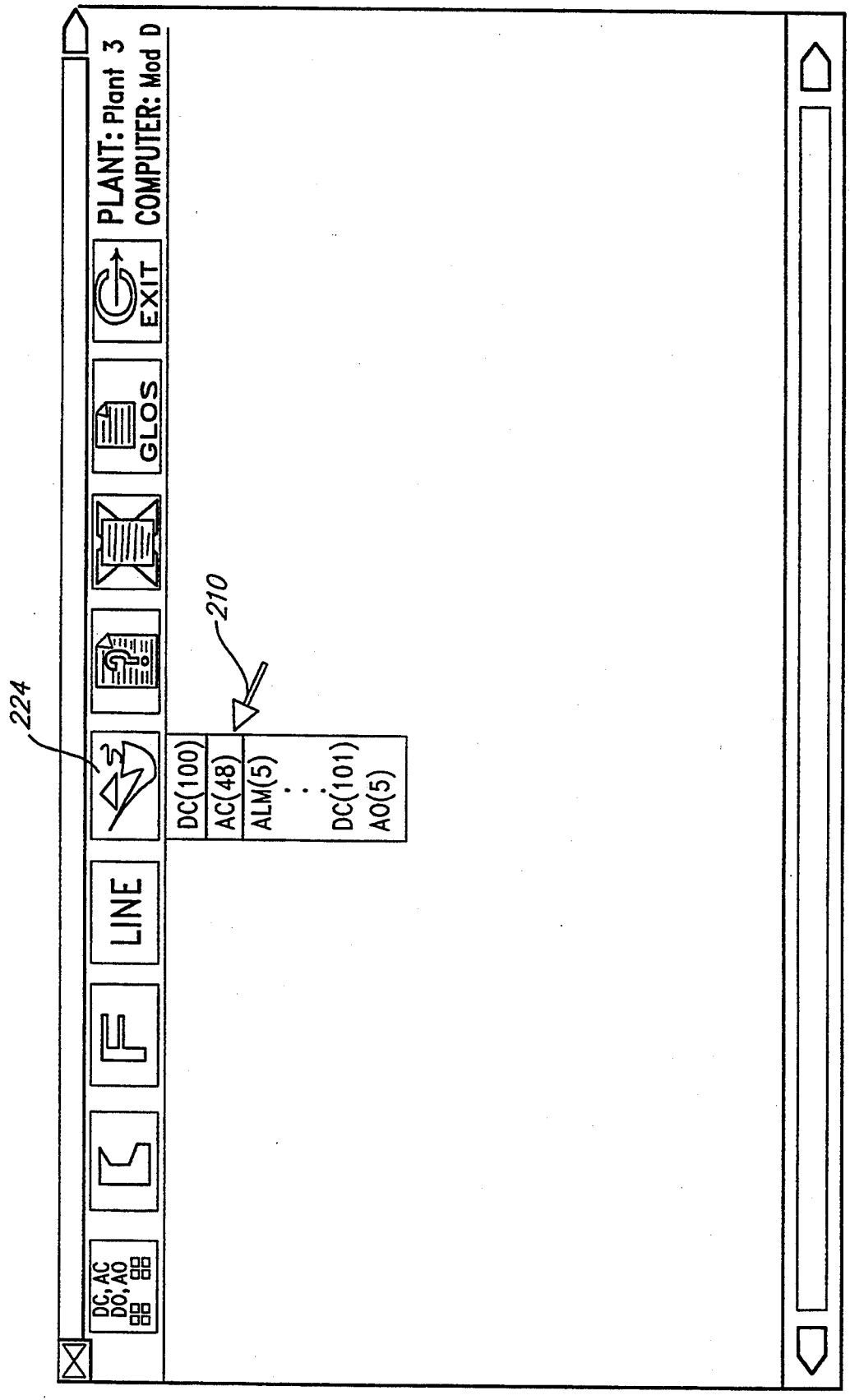
FIG. 15g shows the graphical user interface of FIG. 5, demonstrating use of the Previous Pipe function.

Frequently, the user will want to follow a thread or sequence of displays, backtracking or moving forward through related program statements to locate which program statement is in control of a portion in question of the overall process. This may be conveniently done by selecting the previous pipe button 224 on the main menu bar. See FIG. 15g. Depressing the previous pipe button causes a pull-down menu to appear below the button in which a predetermined number of the variable names last displayed are listed. The previous pipe button is quite handy, since often a user will want to reselect for display a program statement which was recently displayed. The previous pipes list is reset or cleared when a different computer is selected via the computer selection button 204.

Having thus described the basic elements of the presently preferred graphical user interface and menu bar, an example will now be given of how the system might be used to select and display a program statement in the graphical mode made possible by the program of the invention.

Example of Program In Use

In use, the user is first presented with a screen such as has been illustrated in FIG. 15a. The user would first click on the computer selection button 204 which causes pull-down menu 206 to appear. See FIG. 15b. By pulling the mouse cursor down through the selection list 206, the desired plant can be selected. In FIG. 15b Plant 3 has been selected. Upon positioning the cursor over the desired plant, the computer selection side menu 208 appears. The computer selection side menu and the plant selection menu remain on the screen as long as the mouse button remains depressed. While keeping the mouse button depressed, the user drags the mouse cursor to the right and then down to select the desired computer. In the example in FIG. 15b the computer entitled "MOD D" has been selected. By lifting the mouse button after selecting the desired computer, both menus 206 and 208 disappear and the user's choice of plant and computer are made effective. The current selection of plant and computer are displayed in the data fields 212 and 214 in the upper right-hand corner.

Next the user will probably want to select a program statement to be displayed. Commonly, the user will be interested in displaying a program statement associated with a particular variable. This selection is made by selecting the operand select button 218, which causes a pull-down menu of variables to be listed. See FIG. 15c. In addition to the commonly used digital and analog variables, the user can also select other operands such as the alarm operand (ALM), the STEP operand, the termination operand (TERM) as well as the analog and digital simulation operands (AISIM, DISIM). To make the selection explicit, the user must not only select the desired variable, operand or operator from the pull-down menu 240, but also the digits by which the variable, operand or operator is named. This is done by entering the appropriate numbers on the pop-out calculator keypad 242. The calculator keypad includes a key for each of the digits 0–9, as well as a key to clear or enter the selected number.

The desired variable having been selected, the process control display program is now ready to display the graphical representation of a program statement. It is, of course, possible that the selected variable may be used and calculated in a number of different program statements. The presently preferred embodiment defaults to display the program statement in which the variable was last calculated, and if not calculated, in which the variable was first used. To be assured of viewing the proper program statement, the user could select the "Lines" button 219. See FIG. 15d.

If redundant computers are being used, in tandem, for example, the redundant computer selection button 216 (FIG. 15a) can be toggled back and forth to compare the same program statement as it is actually being implemented by the redundant computers. In all of these examples the "F" computer has been selected. Clicking on the computer selection button 216 might change the selection to the "D" computer, for example. Although ordinarily a great number of safeguards would be implemented to ensure that the redundant computers are not out of sync, the ability to quickly toggle between redundant pairs or groups of computers can be a handy tool for troubleshooting. If desired, the process control display program could be implemented so the redundant pairs are simultaneously displayed on the screen.

The Glossary of the currently displayed variable automatically appears in the dedicated Glossary window 234, located in the upper right-hand corner of the screen. See FIG. 15e. Specifically, the Glossary of the currently displayed variable appears in the title line of the window. Four additional lines of Glossary can be displayed within the window. This happens when the user places the mouse on one of the objects comprising the graphically rendered program statement. This also happens when the user places the mouse on a pop-up menu text field which may appear with certain variables, such as analog variables, requiring alphanumeric information in addition to the graphical rendering. Although a four line Glossary window is presently preferred, the size and position of the Glossary window could be modified if desired. Preferably the Glossary window is a scrollable window to allow more than four lines of the information to be selectively displayed, four lines at a time.

The Expanded Glossary appears in the Expanded Glossary window 236, located in the bottom right corner of the screen, when the user selects the Expanded Glossary button 232. See FIG. 15f. As previously explained, pressing the Expanded Glossary button gives the user a pull-down menu by which the required level of Expanded Glossary can be selected.

Detailed Description of The Software

An Overview

Figure 16A:
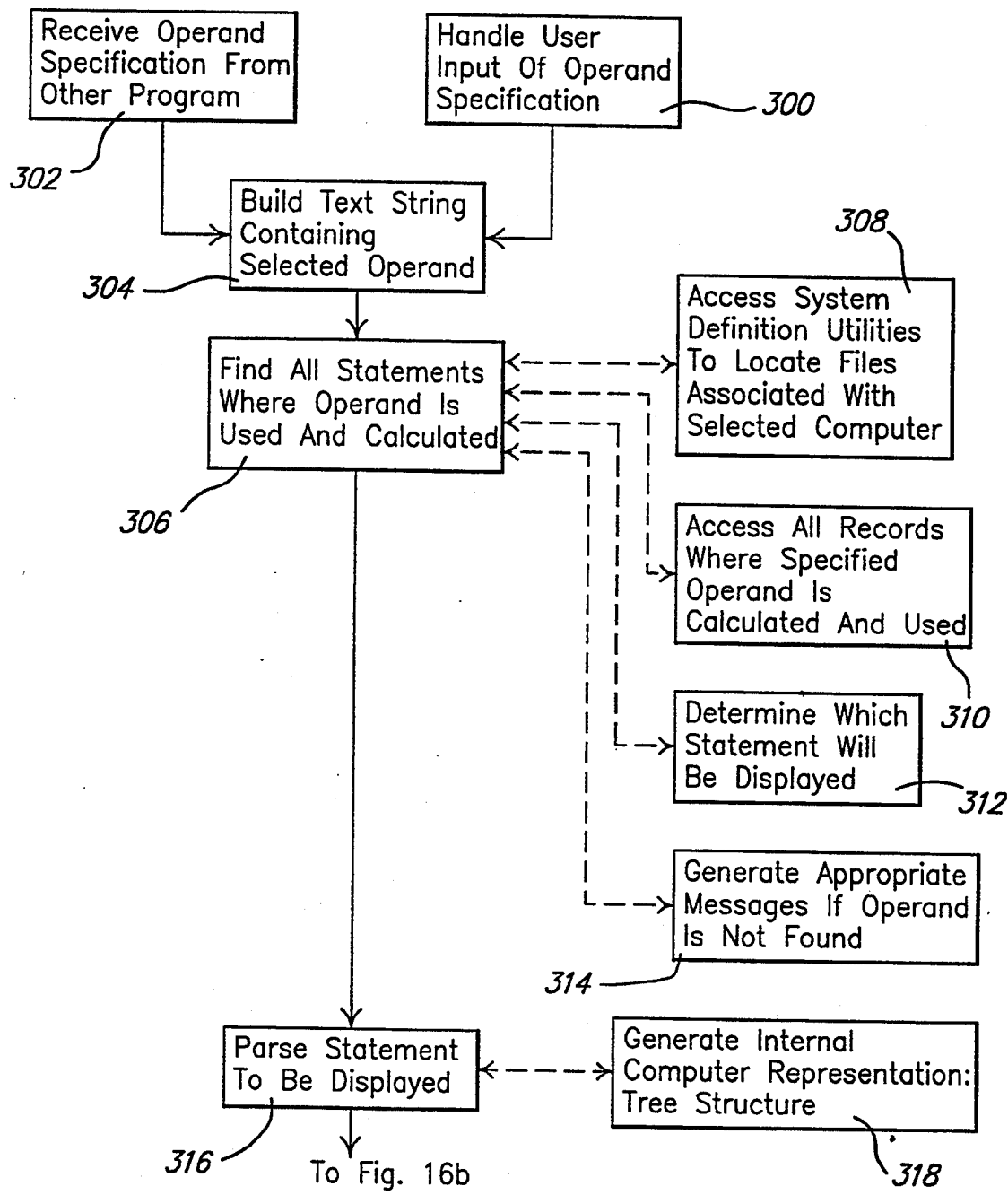
FIGS. 16a and 16b are a flow chart diagram showing the manner in which the process control display program is constructed and operates.
Figure 16B:
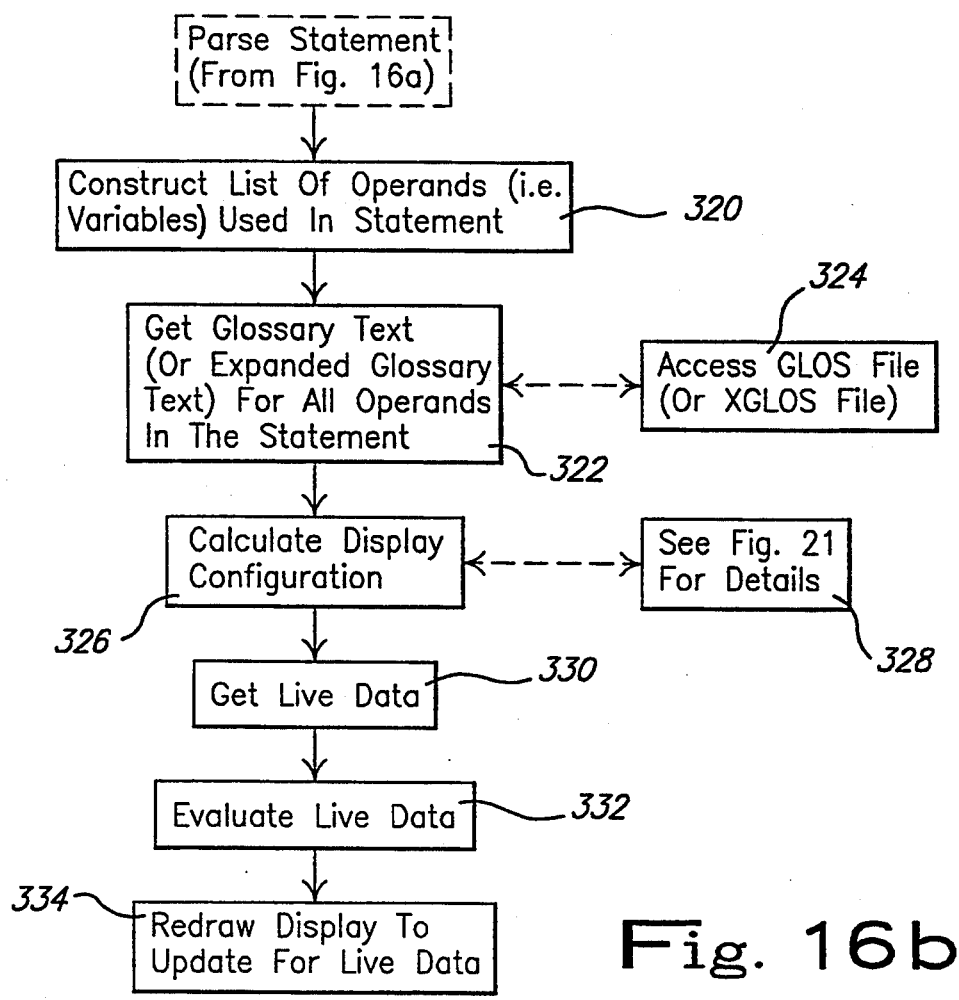

FIGS. 16a and 16b give an overall view of the manner in which the process control display program is constructed. Specifically, FIGS. 16a–16b show the manner in which a program statement or expression is converted into a graphical icon display which is dynamically updated. Beginning at step 300 the program handles the user's input whereby the desired program statement to be displayed is selected. As previously explained, the user selects the desired plant and process control computer, and then selects the operand or variable which he or she wishes to be displayed. If the operand or variable appears in several program statements, the user may select which program statement is to be displayed.

While the presently preferred embodiment fetches the desired program statement based on user input, it is also possible to employ a separate program to specify a statement to be displayed. This is shown at step 302. A separate program could provide the required operand specification by injecting it into the same message stream which handles user input. In that way, an external program can simulate the user input to provide an operand specification. This could be useful in implementing other programs which themselves call or initiate the present process control display program by means of conventional spawn or overlay techniques.

Next a text string is built which contains the selected operand as well as the necessary identity of the plant, computer and path where that operand is located. This step is shown at 304. The text string thus comprises a descriptor or specification of the desired operand or variable. This text string or descriptor constitutes the input to the display generating portion of the process control display program. By way of example, if the user has indicated the desire to display a program statement involving alarm number 335 on redundant computer E, the text string descriptor might appear like: "E: ALM (335)".

Next, the program finds all statements where the selected operand is used and also all statements where the selected operand is calculated. This is depicted at step 306. Step 306 actually involves a series of actions which are illustrated at steps 308, 310, 312 and 314. First, the program will access the operating system or system definition utilities to locate files associated with the selected computer. See step 308. Next, the program accesses all records where the specified operand is calculated and used. See step 310. Next, at step 312, the program determines which statement will be displayed. By default, the program will display the statement in which the variable was last calculated, and if not calculated, in which the variable was first used. Of course, the user can change this default selection by using the menu bar buttons as explained. Finally, if the desired statement is not located, the program generates an appropriate message indicating that the desired operand is not found. See step 314.

Having thus located the statement to be displayed, the program next performs a statement analyzing and parsing sequence, shown generally at step 316. As indicated at step 318, the parsing sequence involves generating an internal computer representation of the statement in the form of a tree structure. Essentially, the tree structure is a data structure in which each of the individual lexical units making up the program statement is independently stored in computer memory. The tree structure retains information concerning the grammatical relationship of the lexical units, to allow the program statement to be reconstructed, if desired. A syntactical analyzer, which forms part of the process control display program, is used to convert the program statement into the parse tree. A more detailed explanation of the syntactical analyzer and the presently preferred parse tree are set forth below in connection with FIG. 17.

Since one of the functions of the process control display program is to change the visual quality or color of the graphical icons and their associated incoming and outgoing lines or "pipes" based on changing live data (or periodically updated data), the program at step 320 constructs a list of operands used in the program statement. This list is stored as a data structure in computer memory. The list is used to store the live data values needed to dynamically update the icons.

To allow glossary textual information to be presented for any selected icon, the program, at step 322, fetches and stores all pertinent glossary text and extended glossary text for each of the operands in the statement. This text is also stored in a data structure in computer memory, so that it will be available for instant access should the user request it. As illustrated at step 324, the glossary and extended glossary information is obtained by accessing the appropriate GLOS and XGLOS files in which the information is stored. These files may be stored on disk.

Having gathered all of the pertinent information, the program next calculates the static display configuration. See step 326. As indicated at 328, the details of the display calculation routine are shown in later FIG. 20. The display calculation routine is essentially responsible for determining which graphical icons need to be displayed, and in what positions. The display calculation routine also includes a hidden pipe algorithm, discussed below, to modify the display if it is too large to fit on the display device screen.

Because the visual quality of the icons and the associated interconnecting lines or pipes is used to convey information about the real time or dynamically changing states of the variables and operators, the program fetches the live data, at step 330, and uses this live data, at step 332, to determine the visual quality or color of each icon and pipe. It will be recalled that this live data is stored in a data structure which was constructed at step 320. The details of the live data algorithm are also discussed below.

Next, the program will redraw the display to update it to take account for the current values of all live data stored. This is illustrated at step 334. As long as the user does not make an alternate selection, the process control display program will continue to display the selected program statement in graphical icon form and will continue to update the visual quality or colors of the icons as the live data changes. In the presently preferred embodiment, the process control display program is configured to interrogate the process control computers once every second. Thus live data is evaluated and redrawn if necessary once each second. It has been found that this frequency of refreshing the data is sufficient for most processes. Of course, the degree of granularity, i.e., the frequency of data refreshing, is a function of the type of process being controlled. Therefore, the presently preferred one second refresh frequency is not a limitation of the scope of the present invention. Other rates of refresh, as well as asynchronous refresh is possible within the scope of the invention.

Parser Basic Concepts

The presently preferred parser is designed to operate with context-free grammar. An example of a context-free grammar is the Backus-Naur form (BNF) which was originally developed for the ALGOL language. The specific embodiment used in this invention employs a single token look-ahead capability. Strictly speaking, the presently preferred parser works with grammars defined as LALR(1).

As previously explained, the lexical units or symbols which make up a language include both terminal symbols, which cannot be subdivided and nonterminal symbols or groupings, which can be subdivided, ultimately into a collection of terminal symbols. Terminal symbols are sometimes called "tokens." Nonterminal symbols are sometimes called "groupings." In terms of grammatical value, all tokens of the same type are considered to be the same. For example, the integer 5 and the integer 3085 are equal in terms of grammatical value; they are both "integers." In terms of semantic value, however, the integers 5 and 3085 are different. The semantic value of an integer is simply the value of that integer. The semantic value of a more complex symbol such as a grouping might be a tree structure, for example.

For more information about parsers see *Compilers Principles, Techniques, And Tools,* Alfred V. Aho, Ravi Sethi and Jeffrey D. Ullman, published by Addison-Wesley.

The Lexical Analyzer and Parser Module

The presently preferred statement analyzer uses a predefined set of grammar rules by which tokens may be arranged and classified. The statement analyzer may be viewed as a syntax-driven interpreter which performs first a lexical analysis and then a syntactic analysis. The lexical analysis is performed by a lexical analyzer or scanner which groups individual characters into tokens to build a symbol table. The syntactic analyzer or parser groups the tokens into grammatical phrases in order to build a parse tree. The statement analyzer has a priori knowledge of an exclusive and exhaustive mathematical definition by which the source language is described. All valid program statements and expressions conform to that mathematical description. To illustrate, the presently preferred parser is able to parse program statements having a form or mathematical description exemplified by the forms set forth in the Table IV below. The parser takes a program statement and matches it to one of these parseable forms.

TABLE IV

Figure 17:
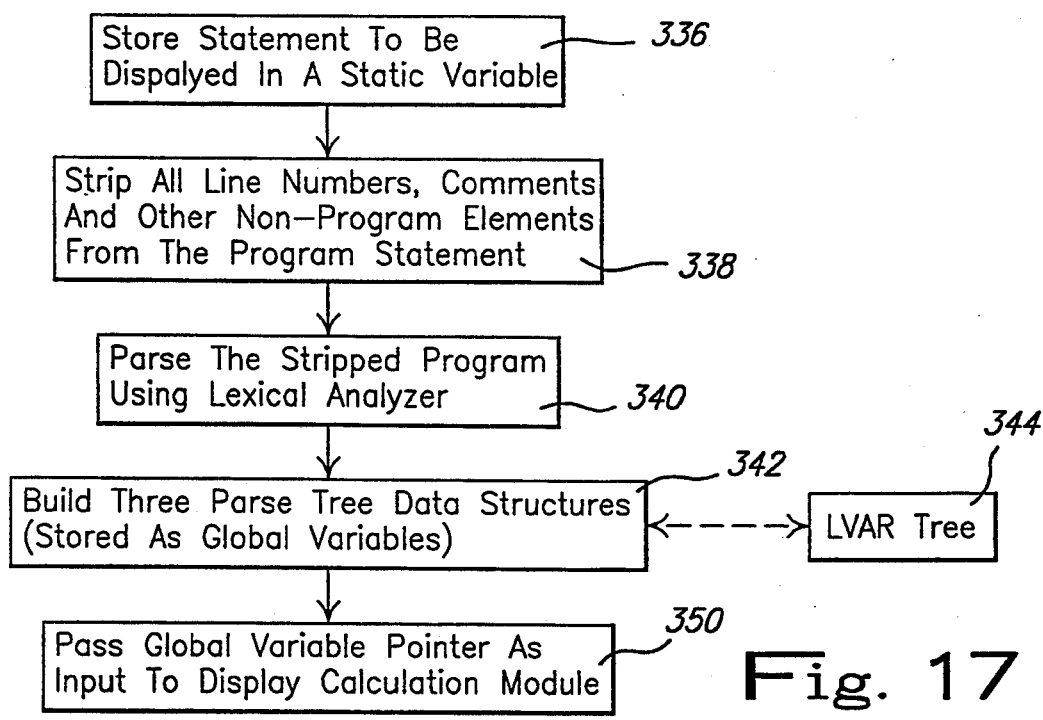
FIG. 17 is a detailed flow chart diagram useful in understanding the lexical analyzer and parser modules of the program.

Form of Parseable Program Statements
variable IF expression=expression
variable IF expression
variable=expression
CALL subroutine IF expression
subroutine IF expression
CALL subroutine
subroutine In essence, the parser is a recursive program which processes the input text stream (i.e., program statement) to determine whether it matches one of the parseable program statement forms in the Table IV above. If it does, a parse tree is constructed for use by the display calculation module. If the statement does not match one of the above parseable program statement forms, an appropriate error message can be generated. As will be more fully explained, the parse tree is a data structure to which the pertinent graphical icon data is attached. Ultimately, this data is used to display the visual icons on the display terminal window. For more information on constructing a suitable statement analyzer, including lexical analyzer and parser, reference may be had to *Compiler Design In C,* Allen I. Holub, published by Prentiss-Hall. FIG. 17 shows the manner in which the presently preferred parser operates. First, at step 336 the program statement to be displayed is stored as a static variable. As stored, the program statement may include nonparseable elements, such as line numbers, programmers comments or column position dependent information (as in Fortran, for example). These nonparseable elements are stripped away, leaving only a parseable set of tokens and/or groupings of tokens. A lexical analyzer is used in step 338 to identify these tokens and feed them one at a time to the parser in step 340.

The parser then recursively analyzes the tokens to build the parse tree data structure. This is illustrated generally at step 342. The presently preferred parser produces a resultant parse tree designated LVAR at 344. Ultimately, the output of the parser is passed as a global variable pointer for use by the display calculation module. See step 350.

Figure 18:
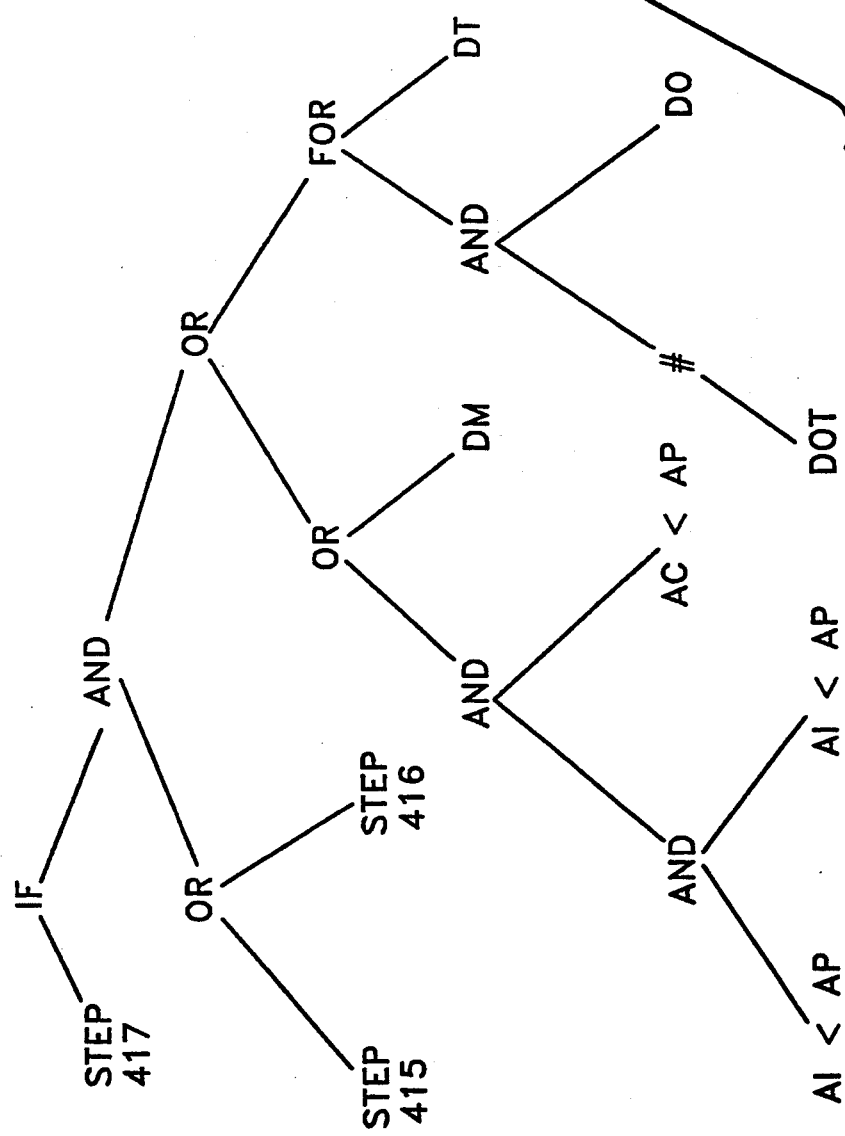
FIG. 18 illustrates an example of a process control display program statement with its corresponding parse tree.

FIG. 18 gives an example of a program statement and its parse tree. The illustrated statement:

```
STEP(417) IF STEP(415) OR STEP(416) AND
 [AI(434) LT AK(417,400,1000) AND AI(435) LT
 AK(417) AND AC(430) LT AK(417) OR
 DM(417) OR [#DI(427) AND DO(427) FOR
 DT(3427,5,2)]]
``` is of the parseable form, "variable IF expression=expression." As illustrated in FIG. 18, the parse tree breaks down the program statement into its individual lexical units as a hierarchial set of nodes. This set of nodes is stored in a data structure to which the pertinent graphical information can be attached by the display calculation module.

Figure 19:
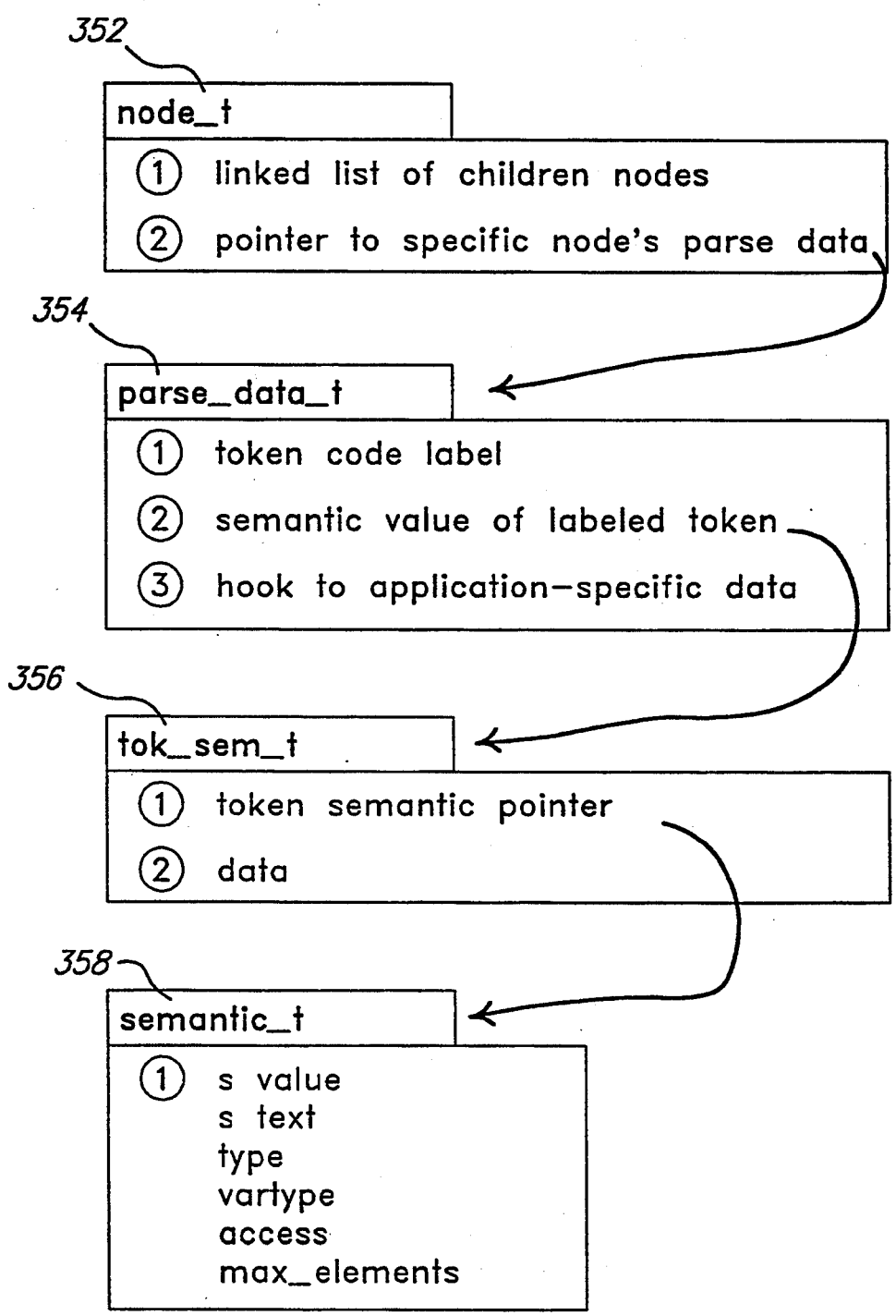
FIG. 19 depicts the presently preferred parse tree data structure.

FIG. 19 illustrates the presently preferred data structure used to store the parse tree data. Actually the data structure used to store the parse tree comprises a series of data structures linked by pointers. From a top level view, the data structure includes a node tree structure 352 designated node_t. This tree structure includes: (1) a linked list of all children nodes and (2) a pointer to the specific node's parse data. Thus the node tree data structure represents the overall configuration of the parse tree, showing the relationship among the lexical units which make up the program statement.

At a more intermediate level, the data structure also includes a parse data tree structure 354 which is pointed to by the node tree structure 352. The parse data tree structure, identified as parse_data_t, is a tree structure which stores (1) the token code label of the given lexical unit, (2) the semantic value of the labeled token and (3) a hook to application-specific data. This application-specific data identifies the graphical icon to be used to represent that particular lexical unit or token.

The parse data tree structure 354 in turn points to a lower level tree structure in which the token semantic information is stored. This token semantic tree structure 356, also identified as tok_sem_t, contains (1) the token semantic pointer to yet another data structure and (2) the specific data applicable to that token.

At a still lower level the data structure comprises a semantic tree structure 358, which is also referred to as semantic_t. This semantic tree structure is used to store the semantic value (S VALUE), the semantic text (S TEXT), the type, the variable type, the access data and the maximum number of elements data. These data are used to store information needed by the display calculation algorithm.

The Display Calculation Modules

The display calculation module receives the parse tree as its input and adds to it a number of data structures used by other modules of the process control display program. Among the primary functions of the display calculation module is the calculation of the dimensions and coordinates (screen position) of every graphical icon used to represent the lexical units of the program statement to be displayed. This calculation includes a decision on whether the hidden pipe algorithm needs to be invoked. The hidden pipe algorithm is called when the entire uncompressed graphical representation of a program statement will not fit in the display area of the window.

The display calculation module is also responsible for creating a Display List used during real time evaluation. In addition to the Display List the display calculation module also builds a Live Data Variables List and a File System Variables List. The Live Data List is used by the live data module, described below, to create the address list which is ultimately passed to the operating system to allow the operating system to obtain the necessary live data. The File System Variables List is used to allow the operating system to supply the glossary strings applicable to the selected variables. In this way, the glossary strings can be addressed via the Display List. In computer programming terms, the Display List and the two Variables Lists and the access functions of these lists constitute the interface of the display calculation module.

Referring back to FIG. 18, the parse tree sets forth how the individual lexical units make up the program statement. Specifically, the program statement comprises terminal symbols, which the display calculation module treats as discrete objects, and nonterminal symbols, which the display calculation module treats as object groups. The discrete objects are each represented by a different node of the parse tree. The display calculation module traverses or walks the parse tree node to node, from top down, attaching to each node the object data needed to position and render the graphical icon on the screen. The specific sequence performed by the display calculation module is illustrated in FIGS. 20-22.

The display calculation module traverses the parse tree in two passes. During the first pass, the module determines the size of the graphical representation of the program statement. During the second pass, the display calculation module determines the coordinates of each icon to be placed in the display window. This process is illustrated in FIG. 20. Beginning at step 360, the parse tree pointer is passed to the display calculation module. It will be recalled that this pointer ultimately supplies access to each of the parse tree nodes as exemplified by the parse tree data structure of FIG. 19. For purposes of explaining the display calculation module, the parse tree of FIG. 18 is reproduced as FIGS. 21 and 22 with additional information added to illustrate pass 1 and pass 2 of the display calculation procedure.

Pass 1 of Display Calculation Module

Figure 20:
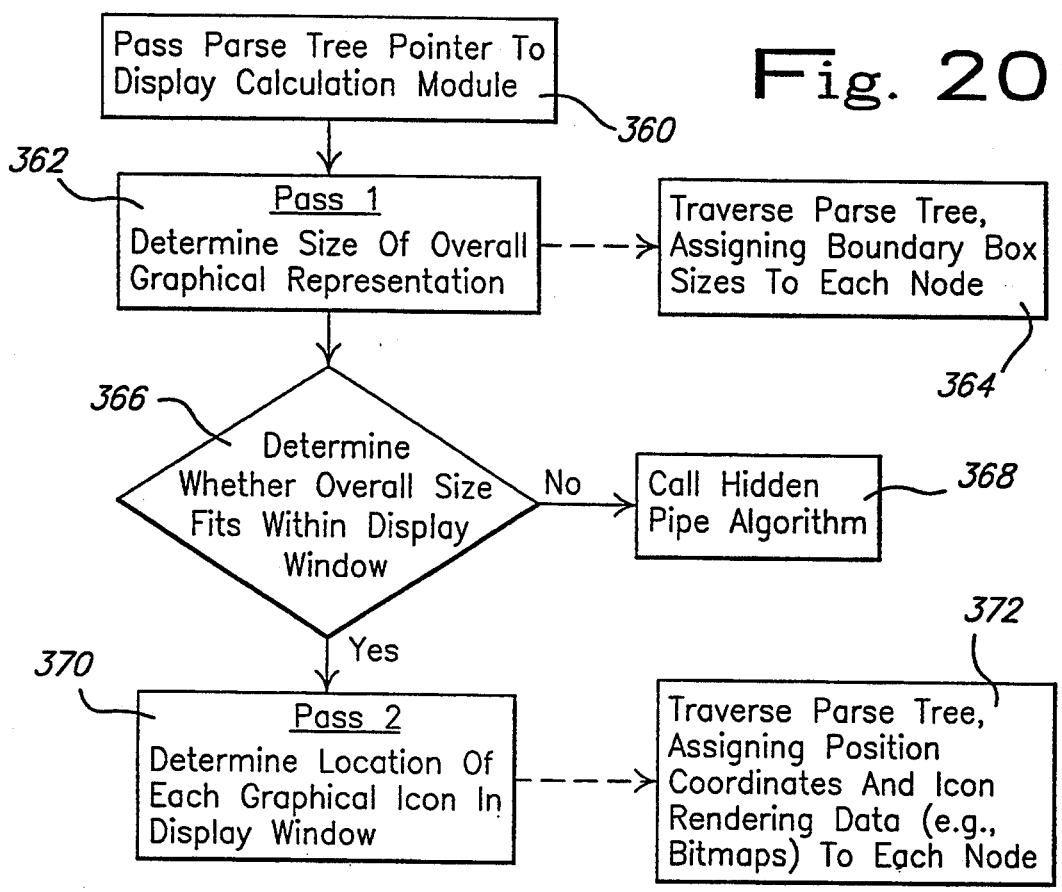
FIG. 20 is a detailed flow chart diagram useful in understanding the display calculation module of the program.
Figure 21A:
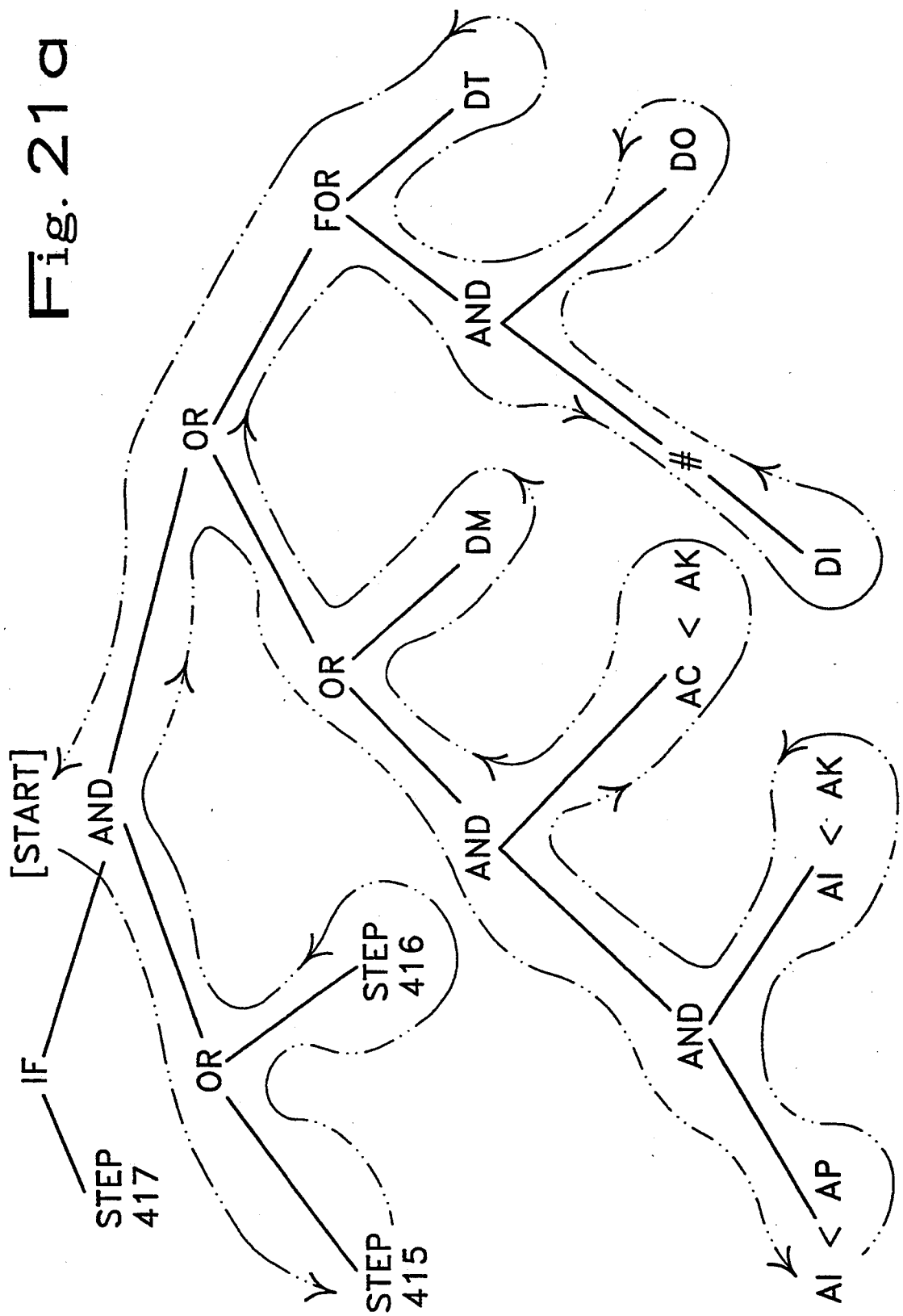
FIGS. 21a and 21b show the parse tree of FIG. 18 demonstrating the first pass of the display calculation module.
Figure 21B:
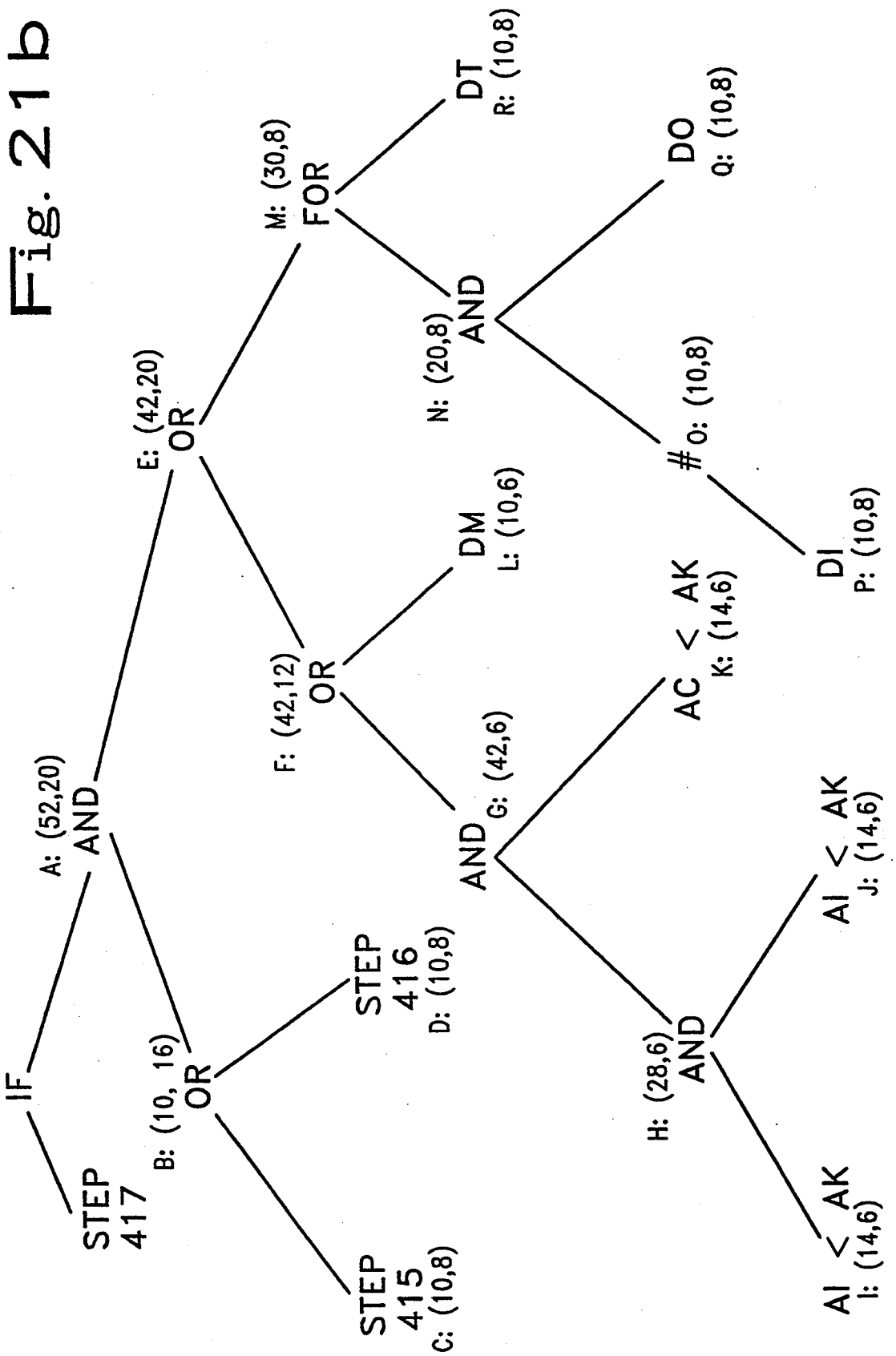
Figure 22:
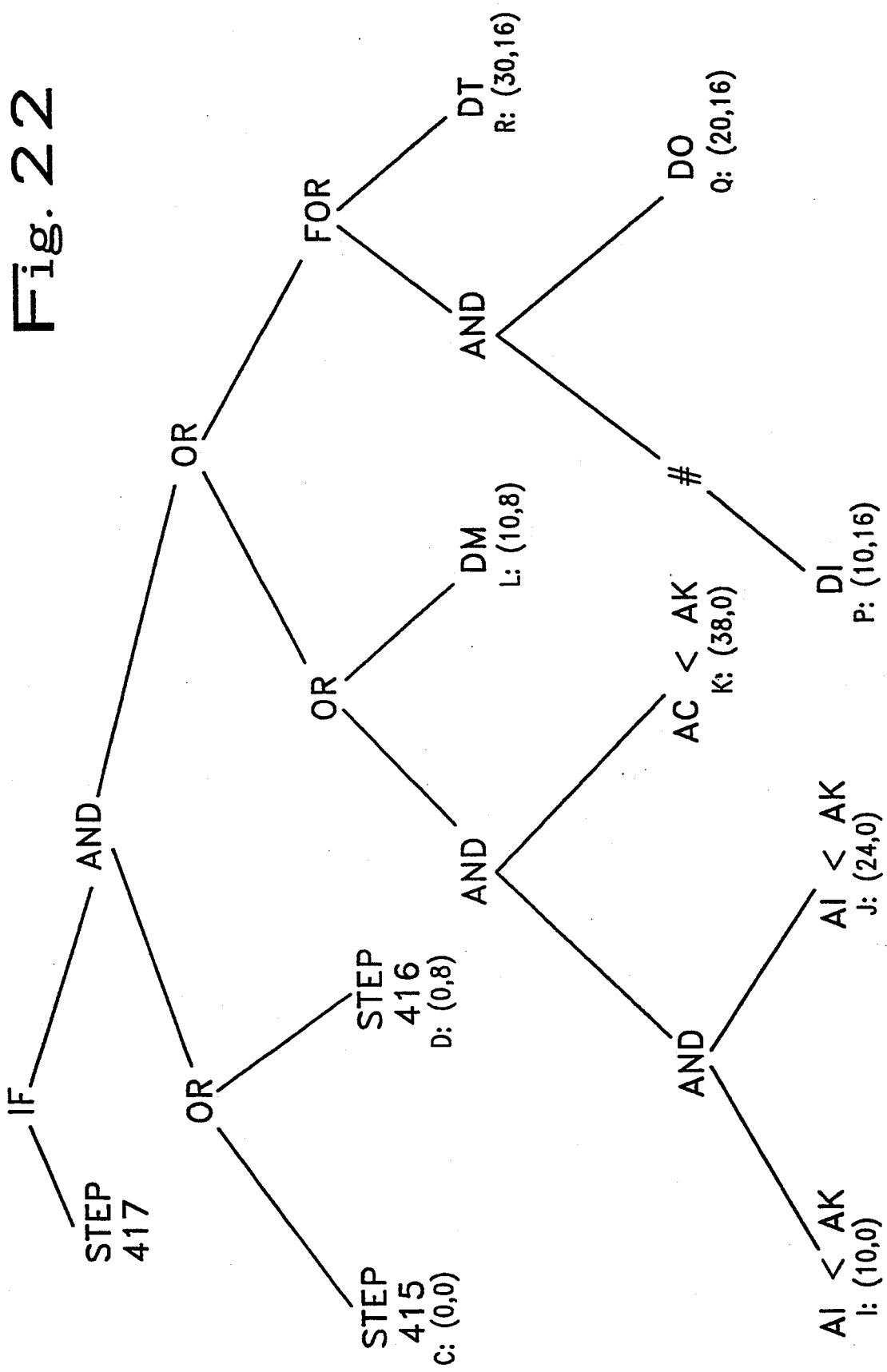
FIG. 22 is the parse tree of FIG. 18 demonstrating the second pass of the display calculation module.

Referring to FIGS. 20, 21a and 21b, at step 362, the display calculation module determines the size of the overall graphical representation of the program statement to be displayed. As further detailed at step 364, this is done by traversing the parse tree from top down and assigning boundary box sizes to each node. As previously explained, each graphical icon has a predetermined size. An imaginary "boundary box" is drawn around each icon, fully enclosing it. The length and width of the imaginary boundary box thus denotes the predetermined size of the corresponding icon.

By way of example, referring to FIGS. 21a and 21b, the parse tree is entered at the top, namely at the AND statement designated at A. The parse tree is then traversed from A to B to C . . . to R, following the arrows illustrated. Each discrete object encountered is assigned an ordered pair (x,y) of numbers representing the horizontal and vertical dimensions of that object's boundary box. In the case of an object which corresponds to a predefined graphical icon (such as variables and special purpose symbols), the boundary box size is predetermined and may thus simply be assigned to that object. Operators such as the relational operators, AND, OR, etc., are not themselves rendered as discrete graphical icons. Rather, they serve to group other objects, hence the boundary box size associated with a relational operator is inherited from the other operators in that group.

By convention adopted in the presently preferred embodiment, the AND operator groups objects by joining them horizontally. (Refer to FIG. 8). The OR operator groups objects by connecting them vertically. (Refer to FIG. 9). The XOR operator groups objects by connecting them vertically, with an additional X-shaped symbol added to distinguish it from the OR operator. (See FIG. 10). The NOT (#) operator surrounds its operand, as illustrated in FIG. 11. Finally, the bracket or nesting operator also surrounds the operand, as shown in FIG. 12. Thus when two objects are joined by the relational AND operator, the resulting boundary box must be large enough in the horizontal dimension to encompass the sum of the horizontal dimensions of the individual objects and must be large enough in the vertical direction to encompass the vertical dimension of the larger of the individual objects. Specifically, the formulas for computing the boundary box dimensions and positions of objects grouped by the relational operators are set forth in Table V below.

TABLE V

The AND relationship (see FIG. 8):
$W = W1 + W2 + WD$
$H = \max[H1\text{-}O1, H2\text{-}O2] + \max(O1, O2)$
$O = \max(O1, O2)$
$X1 = X$
$Y1 = Y + \max[\text{zero}, O2\text{-}O1]$
$X2 = X + W1 + WD$
$Y2 = Y + \max[\text{zero}, O1\text{-}O2]$ The OR relationship (see FIG. 9):
$W = \max[W1, W2]$
$H = H1 + H2 + HD$
$O = O1$
$X1 = X$
$Y1 = Y$
$X2 = X$
$Y2 = Y + H1 + HD$ The XOR relationship (see FIG. 10):
$W = \max[W1, W2] + WL$
$H = H1 + H2 + HD$
$O = O1$
$X1 = X$
$Y1 = Y$
$X2 = X$
$Y2 = Y + H1 + HD$ The NOT relationship (see FIG. 11):
$W = W1 + 2 \times WD + 2 \times WL$
$O = O1 + HD$
$H = H1 + 2 \times HD$
$X1 = XC + WD + WL$
$Y1 = YC + HD$ The bracketed or nested relationship (see FIG. 12):
$W = W1 + WDL + WDR$
$H = H1$
$O = O1$
$X1 = X + WDL$
$Y1 = Y$ Thus, in the parse tree of FIGS. 21a and 21b, each node, designated by a capital letter, A-R, has associated with it a boundary box size specified as an ordered pair of numbers for the horizontal and vertical dimensions of the boundary box. In the presently preferred embodiment the STEP operator has a boundary box dimension of 10 horizontal and 8 vertical units. Thus the ordered pair (10,8) is indicated in the circle adjacent the STEP operators at nodes C and D. The OR operator at node B inherits a boundary box dimension based on the children nodes C and D. Accordingly, the OR node at B has a boundary box size of (10,16)—using the formula of Table V above. In this regard, the boundary box dimensions indicated in FIGS. 21 and 22 have, in some instances, been approximated by omitting the HD dimension, to simplify the arithmetic.

Ultimately, when the entire parse tree has been traversed back to the starting node A, the overall boundary box size will have been determined. For the example of FIG. 21b, this size is (52,20). That value represents the overall size of the right-hand side of the program statement. The presently preferred algorithm enters the parse tree below the equivalents operator IF. The left-hand side, or LVAL side of the program statement, STEP(417) in FIGS. 21a and 21b, always represents a single object of known boundary box size.

Returning to FIG. 20, the display calculation module next determines whether the overall size of the graphical representation will fit within the display window. This is performed at step 366. If the entire display will fit within the display window the display calculation module proceeds to the second pass, step 370, where the location of each graphical icon in the display window is determined. If the entire graphical representation will not fit in the display window, the hidden pipe algorithm is implemented, as indicated at step 368.

The Hidden Pipe Algorithm

Using FIG. 21b as an example, the hidden pipe algorithm will now be explained. As previously noted, the right-hand side of the program statement requires a boundary box of dimensions (52,20). Let us assume that the display window will only permit a boundary box of size (47,20). The hidden pipe algorithm will therefore endeavor to replace a node of a certain size with the hidden pipe icon 182 (FIG. 14) of a smaller size. In the presently preferred embodiment, the hidden pipe icon has a boundary box size of (10,8). Replacing a node of size (20,8) with the hidden pipe icon of size (10,8) will afford a horizontal gain of 10 graphical units. Similarly, replacing a node of size (10,12) with the hidden pipe icon will afford a vertical gain of 4 graphical units. Attempting to replace a node of size (10,8) with the hidden pipe icon would result in no gain, thus such a substitution is not made.

In this example, a horizontal gain of 5 units is required. Since nodes C and D are both equal in size to the hidden pipe icon, replacing either of them with the hidden pipe icon will not produce the desired increase in gain. Thus the hidden pipe algorithm abandons these two nodes. Similarly, node B is inadequate to provide the necessary horizontal gain required in this example.

Moving on to node E, clearly eliminating that node of size (42,20) would provide more than enough gain—a horizontal gain of 32. However, eliminating node E would significantly degrade the usefulness of the resulting display, by eliminating all nodes which are children of node E (i.e., nodes F-R). The hidden pipe algorithm therefore continues to node F, to node G and to node H, each time finding there to be sufficient gain.

Proceeding to the next node I, the resulting horizontal gain would be 4 graphical units. Since this would be insufficient to achieve the desired horizontal gain of 5 units, elimination of node I will not work. Accordingly, the algorithm backtracks to the preceding node H, which is sufficient and then tests node J. Since node J provides insufficient gain, the algorithm once again backtracks to node H. Since there are no other child nodes descending from node H, node H is marked as a hidden pipe. Thus node H and its children nodes I and J will be replaced with the single hidden pipe icon in the final display.

From the foregoing, it will be seen that the hidden pipe algorithm of the presently preferred embodiment will abandon a path if it will not provide sufficient gain. Also, because the parse tree is traversed from left to right, the presently preferred algorithm naturally favors the elimination of nodes more proximate to the LVAL.

This is an advantage, because in most instances the nodes farthest from the LVAL are the more important.

Pass 2 of Display Calculation Module

Having determined the overall size of the graphical representation and having dealt with the hidden pipe issue, as required, the display calculation module proceeds in step 370 (FIG. 20) to determine the location of each graphical icon in the display window. This is done by traversing the parse tree a second time. As indicated at step 372, the parse tree is again traversed to assign position coordinates and icon rendering data (e.g., bitmaps) to each node.

To illustrate this, FIG. 22 shows the same parse tree as FIGS. 19, 21a and 21b, this time illustrating how coordinates are assigned. By traversing the parse tree in the same path as previously illustrated, the first discrete object encountered is at node C. This object is assigned coordinates (0,0). Proceeding on to the next discrete object the coordinates of node D is determined to be (0,8). This is so because node C and node D are grouped as children of the OR operator of node B. As previously discussed, the OR operator joins its objects vertically. Thus, knowing the boundary box size of the object at node D, its position is readily calculated to be in vertical alignment with the object at node C but 8 horizontal units beneath it.

The same procedure is followed for each of the discrete object nodes until the coordinates of each object making up the entire display is known. These coordinates, along with pointers to the appropriate bitmaps for producing the graphical icons are stored in the data structure for use by the operating system windowing facilities in drawing the actual graphical icons on the display screen.

The above procedure causes a graphical icon coordinates and the information about what each icon looks like to be stored by attaching it to the parse tree or a copy of the parse tree. The presently preferred embodiment positions all graphical icons so that their respective incoming and outgoing lines or "pipes" will connect up. To account for the possibility that different graphical symbols may have different sizes, and hence their incoming and outgoing lines may be at different relative positions, the presently preferred display calculation module associates with each graphical icon certain numerical values or "offsets" which may be added or subtracted from the boundary box coordinates, as needed, to ensure that all incoming and outgoing lines match up.

In other words, the coordinates determined by pass 2 of the display calculation module may be used to specify, for example, the upper left-hand corner of the boundary box. The actual on-screen coordinates may need to be adjusted up or down from the upper left-hand corner coordinate position by the amount of the stored offset to ensure that the incoming and outgoing lines of all adjacent and connected icons will properly match up. While the use of stored offset values for this purpose is presently preferred, other comparable techniques may be used instead.

Figure 23:
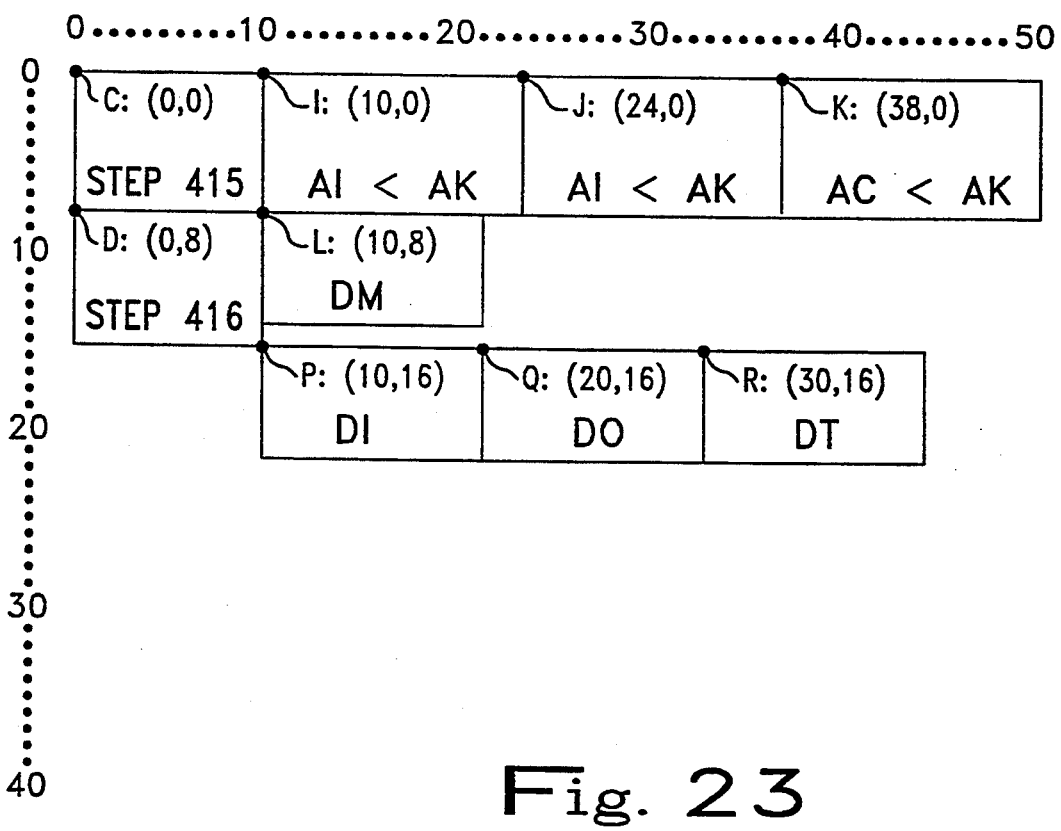
FIG. 23 shows the screen layout of boundary boxes according to the second pass of FIG. 22.

FIG. 23 shows the physical layout of each of the discrete objects corresponding to the parse tree of FIG. 22. For purposes of illustration, each object has been represented by a boundary box with its upper left-hand corner positioned at the assigned coordinates set forth in FIG. 22. Each boundary box has been drawn approximately to scale, based on the (x,y) dimensions taken from FIG. 21b. To simply the illustration, the stored offsets applicable to individual icons have not been illustrated in FIG. 23. For comparison purposes, the graphical icons display of the statement represented by FIGS. 18, 21–23 is shown in FIG. 7b.

The Live Data Module

The live data module is responsible for collection, storage and conversion (formatting) of the real time values of all process control computer variables that are present in the currently displayed program statement. (See Step 330 in FIG. 16b). The parse tree contains the list of all variables which are being displayed. This list is used in making a call to the operating system by which the actual live data being collected by the process control computers (e.g., 104 and 106) and transmitted through the communication interface subsystems (e.g., 108 and 110) to the computer or workstation which is running the process control display program of the invention.

In practice, the live data may be collected by the process control computers in an asynchronous fashion. Thus the live data module of the present program preferably obtains this live data by creating a subprocess which is responsible for requesting the live data synchronously, but in parallel with the process control display program of the invention. The subprocess signals the completion of the live data request so that the main program can be triggered or interrupted asynchronously. In this way, the rest of the process control display program can remain operative, without having to wait for live data to be collected. Once collected, the live data is passed to the real time evaluation module which is responsible for determining the appropriate visual quality to be applied to each of the graphical icons and their interconnecting pipes or lines.

The Real Time Evaluation Module

As previously indicated, a visual quality, preferably color, is used to denote the real time state of each graphical icon in the display window. Assigning the proper visual quality or color to each of the icons themselves is relatively straightforward, based on the live data obtained by the live data module. However, the process control display program does more than simply dynamically apply the appropriate visual quality or color to each icon on a periodic or real time basis. The process control display program of the invention also determines and applies the appropriate visual quality or color to the incoming and outgoing lines or pipes associated with each graphical icon.

For example, in the simple expression shown in FIG. 7a, the lines or pipes incoming variables DI(100) and DI(101) are shaded TRUE. Because the variable DI(100) is currently shaded FALSE, the outgoing lines of that variable is also shaded FALSE. Conversely, because the variable DI(101) is shaded TRUE, its outgoing line or pipe is also shaded TRUE. As illustrated, this same TRUE logic flows through digital variable DC(100). Thus the plant operator can readily determine that the variable DC(100) is TRUE because the variable DI(101) is TRUE.

By shading or coloring the pipes as well as the graphical icons, the operator can quickly trace the logic flow corresponding to a program statement. In FIG. 7a, if the plant operator was expecting the variable DC(100) to be FALSE, but found that it was not, the reason would be immediately clear. By tracing the TRUE (BLUE) color back from variable DC(100) the "source" of this TRUE logic is immediately apparent—variable DI(101).

The real time evaluation module is responsible for producing the proper visual qualities or colors for all of the graphical icons and their interconnecting pipes. The real time evaluation module is called as soon as the live data module has indicated that the last live data request has been successfully completed. In addition to determining the visual quality or color of all icons and pipes, the real time evaluation module must also take hidden pipes into account.

The presently preferred real time evaluation module is set forth in the source code listing in Table VI below which has been written in the C language. The entire source code listing for the real time evaluation module has been provided to allow those skilled in the art of computer programming to fully understand how the presently preferred module is constructed and how it operates. The source code listing of Table VI appears at the end of this specification preceding the appended claims.

Although the dynamic control of visual quality or color of the icons themselves is comparatively straightforward, evaluating the visual quality or color of the incoming (left) and outgoing (right) lines merits some additional discussion. In this discussion the terms "line" and "pipe" are synonymous, unless otherwise indicated. The line coloring algorithm uses two pen colors, a "current" pen color and a "stored" pen color. The stored pen color is retained on a per node basis in the parse tree. In the source code listing the current pen color is identified cur_colour and the stored pen color is identified static_colour. The stored pen color (static_colour) may be allocated as a static variable and is initialized to BLUE when first evaluating the incoming lines (left lines). The current pen color (cur_colour) may be allocated on the stack.

The real time evaluation module (RTEVAL) includes an incoming line evaluation procedure, EVAL_LEFT_LINES() and an outgoing line evaluation procedure, EVAL_RIGHT_LINES(). Arguments to EVAL_LEFT_LINES are to the node pointer NODE_PT of the parse tree to be evaluated. Because the routine is recursive, this will be the subtree associated with a node as the parse tree is descended.

Procedure EVAL_LEFT_LINES first makes a local copy of the SVALUE of the current node. If the current node is an OR and if it represents a hidden pipe, the local SVALUE is made so that the hidden pipe object may be properly handled.

The left line is always colored in the stored pen color (static_colour). The right line is colored according to the relation, static_colour AND cur_colour. That is, the right line is BLUE if and only if the pen color is BLUE and the object is BLUE. The right line is not colored if the current object is an OR or an XOR or an XOR relationships are filled in by the EVAL_RIGHT_LINES procedure.

The XOR operator is a special case because it includes a displayed object, an X-shaped symbol added to the icon. The color of this additional X-shaped symbol must also be handled.

The delay timer, when TRUE, can require the outgoing lines to be TRUE even though the incoming pen color is FALSE. That is so because the delay timer serves to delay the flow of logic which is otherwise proceeding along its pipe.

When evaluating the children of a current node, the pen color is first saved on the stack. If the current node is a NOT, the pen color is set to BLUE (TRUE), because a statement inside a NOT is evaluated separately from the enclosing statement.

The EVAL_LEFT_LINES procedure is called for all children. If the current node is an OR, the pen color is reset to BLUE after each child. The color is set to its previous value when finished with the NOT operator.. When all of the children have been evaluated, the current node is checked to see if it is indeterminate (i.e., bad data) for which the pen color is set to grey. If the parent of the current node is one of the following: the AND operator, a FOR operator or the top node of the parse tree, and if the pen color is BLUE and if the current node is ORANGE, the pen color is set to ORANGE. Note that this is the only way in which the pen color can become ORANGE, unless the pen color is restored from the stack by an OR operation higher in the parse tree.

The presently preferred routines set an update flag to indicate if the line colors have been changed. Thus, although the live data module may poll the process control computers on a periodic basis, the display is only redrawn if it is necessary to change visual quality or colors.

The EVAL_RIGHT_LINES() procedure is specifically designed to evaluate the right-hand lines outgoing from OR nodes. This procedure is required because the OR color can only be evaluated after knowing all of its children, including their children. If a node is an OR or XOR, and its parent is not an OR, the right line outgoing from the OR node will have the same color as its right-hand child. Visually speaking, this OR is the lowest OR in this subexpression, and its right-hand child is the lowest child. The pen color is set to this color.

If the node is an OR and its parent is an OR (i.e., this OR is above another OR on the display) and the pen color is either grey (indeterminate) or BLUE, the right line of this OR is drawn in BLUE. That way, BLUE will "flow up" the OR as required. If the pen color is ORANGE, the right-hand line will be drawn like the bottom level OR (that is, it will inherit the color of its right-hand child).

After coloring the right-hand lines, the program checks to see if the current node is a hidden pipe. If it is, the colors of the hidden pipe object are copied through to the hidden node. If the hidden node is an OR, a special treatment must be performed on the OR on the right-hand line outgoing from the OR symbol.

For a more complete understanding of the real time evaluation module, the reader is invited to study the source code listing of Table VI.

While the process control display program has been illustrated and described in connection with the presently preferred embodiment, it will be understood that the invention is capable of certain modification without departing from the spirit of the invention as set forth in the appended claims.

TABLE VI

Copyright The Dow Chemical Company 1992

```
#include <stdio.h>
#include <stdlib.h>
#include <ctype.h>
#include "d_include:mtree.h"
#include "d_include:list_mngr.h"
#include "d_include:parser.h"
#include "d_dispcalc:graph_calc.h"

#include "d_include:display_str.h"
#include "d_include:livedata.h"
/*#include "d_livedata:ld_private.h"*/
#include "d_include:dispcalc.h"
#include "d_include:message_public.h"
#include "d_dispcalc:dispcalc_private.h"
#include "d_include:rteval.h"

#ifndef MIN
#define MIN(a, b) ( ((a) < (b)) ? (a) : (b) )
#endif

/* Forward declarations */
static GraphicalValue Eval_Subtree(node_pt logictree);

extern double fabs(double x);

static rteval_debug = -1;

#define DEBUG_VERBOSE        1
#define DEBUG_LINES          2
#define DEBUG_RLINES         4
#define DEBUG_NOGREYOUT      8
define DEBUG_NOCOPYHIDDEN   16 ifdef MALLOC_TEST
include "d_include:malloc_test.h"
#else
static void *talloc(unsigned int size)
{
    void *block;
    block = malloc(size);
    if (block == NULL) {
        MSG_Log("Error: Out of memory in build.c\n");
        exit(1);
    }
    return block;
}
endif /*#define DISCR_P(p)          ((discrete_pt)DRAW_OBJ_P((p))->discrete_p)*/ static void
```

```
SwapHidden(node_pt node_p)
{
    draw_object_pt topobject_p;
    draw_object_pt bottomobject_p;

topobject_p = DRAW_OBJ_P(node_p);
    bottomobject_p = topobject_p->hiddenobj_p;

if (bottomobject_p != NULL) {
        topobject_p->hiddenobj_p = bottomobject_p;
        bottomobject_p->hiddenobj_p = topobject_p;
        DRAW_OBJ_P(node_p) = bottomobject_p;
    }
} static void
Eval_GreyoutObject(draw_object_pt drawobject)
{
    struct DisplayBase *BaseObject;

if (drawobject != NULL) {
        BaseObject = drawobject->discrete_p;
        BaseObject->obj[1].Colour = Grey;   /* left hand line
*/
        BaseObject->obj[1].ChangedLiveData_lb = 1;
        BaseObject->obj[2].Colour = Grey;   /* right hand line
*/
        BaseObject->obj[2].ChangedLiveData_lb = 1;
    }
} static node_pt
Eval_GreyoutNode(node_pt node)
{
    draw_object_pt drawobject;

drawobject = DRAW_OBJ_P(node);
    if (drawobject != NULL) {
        Eval_GreyoutObject(drawobject);

if (drawobject->hidden != 0) {
            SwapHidden(node);
            drawobject = DRAW_OBJ_P(node);
            SwapHidden(node);
            Eval_GreyoutObject(drawobject);
        }
    }
    return node;
} static void
Eval_Greyout(node_pt logictree)
{
    int aap = -1;
    if (rteval_debug & DEBUG_NOGREYOUT)
        return;
```

```
        MT_walk_bottom_up(logictree, Eval_GreyoutNode, &aap);
} static GraphicalValue
Eval_compose(node_pt node_p)
{
    Obj_Type type;
    GraphicalValue colour;
    draw_object_pt child1;
    draw_object_pt child2;

#define CHILD_COLOUR(x) \
    (((struct DisplayBase *)((x)->discrete_p))->obj[0].Colour)
    child1   =   DRAW_OBJ_P((node_pt)Lm_DATA_1_P(node_p-
>children_list));

if ((CHILD_COLOUR(child1) < Grey) || (CHILD_COLOUR(child1)
> Blue))
        MSG_Log("Invalid colour %d!\n", CHILD_COLOUR(child1));

if (CHILD_COLOUR(child1) == Grey)
        return Grey;

/* Process unary parse nodes */
    switch ( SEM_P(node_p)->svalue )
    {
    case '#' :
        colour = (CHILD_COLOUR(child1) == Orange)
            ? Blue : Orange;
        return colour;
    case '[' :
        colour = CHILD_COLOUR(child1);
        return colour;
    }

/* If we came here, we must have a binary parse node */
    child2   =   DRAW_OBJ_P((node_pt)Lm_DATA_2_P(node_p-
>children_list));
    if (CHILD_COLOUR(child2) == Grey)
        return Grey;

switch ( SEM_P(node_p)->svalue )
    {
    case _for :
        colour = (CHILD_COLOUR(child2) == Blue)
            ? Blue : Orange;
        break;
    case _and :
        colour = ((CHILD_COLOUR(child1) == Blue) &&
            (CHILD_COLOUR(child2) == Blue))
            ? Blue : Orange;
        break;
    case _or :
        colour = ((CHILD_COLOUR(child1) == Blue) ||
            (CHILD_COLOUR(child2) == Blue))
```

```
                ? Blue : Orange;
            break;
        case _xor :
            colour = ((CHILD_COLOUR(child1) == Blue) ^
                (CHILD_COLOUR(child2) == Blue))
                ? Blue : Orange;
            break;
        default :
            MSG_Log("RTEVAL->Eval_compose: Invalid svalue %d\n",
            SEM_P(node_p)->svalue);
    }
    return colour;
} static GraphicalValue
compare(float a, float b, char *operator, float *pct_blue)
{

GraphicalValue retval;

retval = Grey;
    switch(operator[0])
    {
    case 'E':
        if (strcmp(operator, "EQ") == 0) {
            retval = (a == b) ? Blue : Orange;
            *pct_blue = (a == b) ? 1.0 : 0.0;
        }
        break;
    case 'G':
        if (strcmp(operator, "GT") == 0) {
            retval = (a > b) ? Blue : Orange;
            *pct_blue = MIN(1.0, (1.0 - ((b - a) / 2.0)));
        }
        else if (strcmp(operator, "GE") == 0) {
            retval = (a >= b) ? Blue : Orange;
            *pct_blue = MIN(1.0, (1.0 - ((b - a) / 2.0)));
        }
        break;
    case 'L':
        if (strcmp(operator, "LT") == 0) {
            retval = (a < b) ? Blue : Orange;
            *pct_blue = MIN(1.0, (1.0 - ((a - b) / 2.0)));
        }
        else if (strcmp(operator, "LE") == 0) {
            retval = (a <= b) ? Blue : Orange;
            *pct_blue = MIN(1.0, (1.0 - ((a - b) / 2.0)));
        }
        break;
    case 'N':
        if (strcmp(operator, "NE") == 0) {
            retval = (a != b) ? Blue : Orange;
            *pct_blue = (a != b) ? 1.0 : 0.0;
        }
        break;
    }

/* percent blue less than zero can only happen for variables
with
```

```
     * a scale value smaller than the actual value. If so,
the colour
     * will be grey.
     */
    if (*pct_blue < 0.0)
        retval = Grey;

if (retval == Grey)
        *pct_blue = -1.0;
    return retval;
} static GraphicalValue
Eval_discrete_object(node_pt node_p, struct ObjectInfo_ds *oi)
{
    GraphicalValue colour;
    float temp_f, temp1_f, temp2_f, temp3_f;

/* Test for bad data. Deviations have three values: */
    if (DRAW_OBJ_P(node_p)->type == DIG_FUNC_obj &&
            (node_p->children_list == NULL ||
            Lm_ITEM_CNT(node_p->children_list) != 3 ||
            LD_IsBad(oi->Modvar2->Value_f) ||
            LD_IsBad(oi->Modvar3->Value_f))) {
                oi->PercentBlue_fl = -1.0;
                return Grey;
    }

/* A comparison has two values: */
    if (DRAW_OBJ_P(node_p)->type == COMPARE_obj &&
        LD_IsBad(oi->Modvar2->Value_f))
                return Grey;

/* But all objects have a first value: */
    if (LD_IsBad(oi->Modvar1->Value_f))
                return Grey;

/* If we come here, we have valid live data */ switch ( DRAW_OBJ_P(node_p)->type )
    {
    case DIG_VAR_obj:
    case DIG_VAR_HATCHED_obj:
    case STEP_obj:
        if (oi->Modvar1->Value_f == 0.0)
        colour = Orange;
        else
            colour = Blue;
        break;

case DT_obj:
        if (oi->Modvar1->Scale_f == 0.0)
            colour = Orange;
        else
            colour = Blue;

oi->PercentBlue_fl = (oi->Modvar1->Value_f);
        break;
```

```
case DIG_FUNC_obj:
    if ( (node_p->children_list != NULL) &&
         SEM_P(node_p)->svalue == _dev &&
         Lm_ITEM_CNT(node_p->children_list) == 3 )
    { if (oi->Modvar1->Scale_f == 0.0 ||
                oi->Modvar2->Scale_f == 0.0 ||
                oi->Modvar3->Scale_f == 0.0) {
            temp1_f = temp2_f = temp3_f = 0.0;
            oi->PercentBlue_fl = -1.0;
            colour = Grey;
            break;
        }
        temp1_f = oi->Modvar1->Value_f / oi->Modvar1->Scale_f;
        temp2_f = oi->Modvar2->Value_f / oi->Modvar2->Scale_f;
        temp3_f = oi->Modvar3->Value_f / oi->Modvar3->Scale_f;
        if (fabs(temp1_f - temp2_f) > temp3_f)
            colour = Blue;
        else
            colour = Orange;
        if (temp3_f != 0.0) {
            temp_f = fabs(temp1_f - temp2_f) / fabs(temp3_f);
            if (temp_f > 1.0)
                temp_f = 1.0;
            if (temp_f != oi->PercentBlue_fl) {
                oi->PercentBlue_fl = temp_f;
                oi->ChangedLiveData_lb = 1;
            }
        } else {
            oi->PercentBlue_fl = -1.0;
            colour = Grey;
        }
    }
    break;

case COMPARE_obj:
    if (oi->Modvar1->Scale_f == 0.0 ||
            oi->Modvar2->Scale_f == 0.0) {
        temp1_f = temp2_f = 0.0;
        colour = Grey;
        break;
    }
    temp1_f = oi->Modvar1->Value_f / oi->Modvar1->Scale_f;
    temp2_f = oi->Modvar2->Value_f / oi->Modvar2->Scale_f;
    colour = compare(temp1_f, temp2_f, oi->Modvar3->Name_c, &temp_f);
    if (temp_f != oi->PercentBlue_fl) {
        oi->PercentBlue_fl = temp_f;
        oi->ChangedLiveData_lb = 1;
    }
    break;

default:
```

```c
            MSG_Log("RTEVAL->Eval_discrete: Invalid object type
(sv: %d\n",
                SEM_P(node_p)->svalue);
    }
    return colour;
} static node_pt
Eval_object (node_pt node_p)
{
    int i;
    struct DisplayBase *newobj;
    struct ObjectInfo_ds *cur, *leftline, *rightline;
    Obj_Type type;
    GraphicalValue colour;

if (node_p == NULL) {
        MSG_Log("NULL node_p in eval_object\n");
        return;
    } if (DRAW_OBJ_P(node_p) == NULL)         /* No drawobject
means    */
        return node_p;                      /* no action        */
    newobj = DRAW_OBJ_P(node_p)->discrete_p;
    cur = &newobj->obj[0];                  /* The object itself   */
    leftline = &newobj->obj[1];             /* The left hand linepart*/
    rightline = &newobj->obj[2];            /* The right hand linepart*/ switch ( DRAW_OBJ_P(node_p)->type )
    {
    case DIG_VAR_obj:
    case DIG_VAR_HATCHED_obj:
    case STEP_obj:
    case DT_obj:
    case DIG_FUNC_obj:
    case COMPARE_obj:
        colour = Eval_discrete_object(node_p, cur);
        break;

case HIDDEN_obj:
        colour = Eval_Subtree(node_p);
        break;

case COMPOSE_obj:
        colour = Eval_compose (node_p);
        break;

default:
        MSG_Log("RTEVAL->Eval_object: Invalid object type (sv:
%d)\n",

SEM_P(node_p)->svalue);
    } if (cur->Colour != colour) {
        cur->Colour = colour;
        cur->ChangedLiveData_lb = 1;
```

```
        }
        return node_p;
} static GraphicalValue
Eval_lvar (node_pt node_p, GraphicalValue statement_colour)
{
        int i;
        float temp_f;
        struct DisplayBase *newobj;
        struct dispcalc_lvar *lvar_object;
        struct ObjectInfo_ds *cur, *leftline;
        Obj_Type type;
        GraphicalValue colour, left_colour;
        if (node_p == NULL) {
                MSG_Log("NULL node_p in eval_lvar\n");
                return;
        } if    (PARSE_P(node_p)->tok_svalue.tok_sem_p->vartype   !=
digital)
                return;         /* We only colour digital variables */ lvar_object = (struct dispcalc_lvar *) DRAW_OBJ_P(node_p);
        newobj = lvar_object->lvarbase;
        cur = &newobj->obj[0];          /* The object itself */
        leftline = &newobj->obj[1];     /* The left hand linepart */ if (LD_IsBad(cur->Modvar1->Value_f)) {
                colour = Grey;
        } else {
                if (cur->Modvar1->Value_f == 0.0)
                        colour = Orange;
                else
                        colour = Blue;
        } if (colour != cur->Colour) {
                cur->Colour = colour;
                cur->ChangedLiveData_lb = 1;
        } if (statement_colour == cur->Colour)
                left_colour = cur->Colour;
        else left_colour = Grey;

if (left_colour != leftline->Colour) {
                leftline->Colour = colour;
                leftline->ChangedLiveData_lb = 1;
        } return colour;
} static char *
describe_node(int svalue, char *name)
```

```
{
    static char buf[100];
    if (name[0] == '<' && svalue > 32 && svalue < 128)
        sprintf(buf, "%d ('%c')", svalue, svalue);
    else
        sprintf(buf, "%d (%s)", svalue, name);
    return buf;
} static GraphicalValue
Eval_left_lines(node_pt node_p, int parent_svalue)
{
    int i;
    int svalue;
    static int depth = 0;
    static GraphicalValue static_colour;
    /*auto*/ GraphicalValue cur_colour;
    /*auto*/ GraphicalValue old_left_colour, old_right_colour;
    struct DisplayBase *newobj;
    struct ObjectInfo_ds *cur, *leftline, *rightline;

/* Call Eval_lines(node_p, -500) to init static_colour. We need a better */
    /*    mechanism for this.                                                */
    if (parent_svalue == -500) {
        static_colour = Blue;
    } if (DRAW_OBJ_P(node_p) == NULL)          /* We ignore non-drawing objects */
        return;

svalue = SEM_P(node_p)->svalue;
    if (svalue == _or && DRAW_OBJ_P(node_p)->hidden != 0)
        svalue = 0;     /* treat hidden as discrete object */ newobj = DRAW_OBJ_P(node_p)->discrete_p;
    cur = &newobj->obj[0];     /* The object itself */
    leftline = &newobj->obj[1];   /* The left hand linepart */
    rightline = &newobj->obj[2];  /* The right hand linepart */ if (rteval_debug & DEBUG_LINES)
        MSG_Log("%*s Pre: Object %s colour %s pen %s left %s right %s\n",
            2*depth+1, " ",
            describe_node(svalue, cur->Modvar1->Name_c),
            format_colour(cur->Colour),
            format_colour(static_colour),
            format_colour(leftline->Colour),
            format_colour(rightline->Colour));

/* pre action */
    old_left_colour = leftline->Colour;    /* remember the colours */
    old_right_colour = rightline->Colour;  /* on the stack*/ leftline->Colour = static_colour;
    if (svalue != _or && svalue != _xor) {
```

```c
            rightline->Colour = leftline->Colour;
        if (cur->Colour == Orange && leftline->Colour == Blue)
            rightline->Colour = Orange;
        if (cur->Colour == Grey)
            rightline->Colour = Grey;
    } if (svalue == _xor && static_colour == Orange &&
                cur->Colour == Blue) {
        cur->Colour = Orange;
        cur->ChangedLiveData_lb = 1;
    } if (svalue == _dt && static_colour != Grey) {
        static_colour = cur->Colour;
        rightline->Colour = static_colour;
    }
    cur_colour = static_colour;         /* Save the value on the stack */
    if (svalue == '#') {
#ifdef NotDef
        if (static_colour != Grey)
            static_colour = Blue;
        else
            cur->Static_colour = Grey;
#else
        static_colour = Blue;
#endif
    } if ((node_p->children_list != NULL) &&
            (!Lm_LIST_EMPTY(node_p->children_list)) ) {
        Lm_GotoItem(node_p->children_list, FIRST) ;
        for (i = 1; i <= Lm_ITEM_CNT(node_p->children_list); i++) { depth++;
            (void)    Eval_left_lines(Lm_DATA_P(node_p->children_list), svalue);
            depth--;
            if (svalue == _or)
                static_colour = cur_colour;
            Lm_NextItem (node_p->children_list);
        }
    }
        /* post action */
#ifdef NotDef
    if ((svalue == '#') && (cur_colour == Orange))
        static_colour = Orange;
#else
    if ((svalue == '#') && (static_colour != Grey) &&
(cur_colour != Grey))
        static_colour = cur_colour;
endif if (cur->Colour == Grey)
        static_colour = Grey;
```

```
    if (rteval_debug & DEBUG_LINES)
        MSG_Log("%*s Post: Object %s colour %s pen %s left %s
right %s\n",
            2*depth+1, " ",
            describe_node(svalue, cur->Modvar1->Name_c),
            format_colour(cur->Colour),
            format_colour(static_colour),
            format_colour(leftline->Colour),
            format_colour(rightline->Colour));

if ((parent_svalue == _and || parent_svalue == _for ||
                    parent_svalue == -500)
            && cur->Colour == Orange && static_colour == Blue)
        static_colour = Orange;

if (old_left_colour != leftline->Colour)
        leftline->ChangedLiveData_lb = 1;
    if (old_right_colour != rightline->Colour)
        rightline->ChangedLiveData_lb = 1;

return static_colour;
} static void
copy_hidden_colours(node_pt node)
{
    node_pt rightchild;
    struct DisplayBase *subtree_obj, *hidden_obj, *child_obj;
    struct ObjectInfo_ds *childrightline;

if (rteval_debug & DEBUG_NOCOPYHIDDEN)
        return;

hidden_obj = DRAW_OBJ_P(node)->discrete_p;
    SwapHidden(node);
    subtree_obj = DRAW_OBJ_P(node)->discrete_p;
    SwapHidden(node);

if (DRAW_OBJ_P(node)->type != HIDDEN_obj)
        MSG_Log("\007copy_hidden_colours: no hidden item at top
of tree!\n");
    if (subtree_obj->obj[1].Colour != hidden_obj->obj[1].Colour)
    {
        subtree_obj->obj[1].ChangedLiveData_lb = 1;
        subtree_obj->obj[1].Colour = hidden_obj->obj[1].Colour;
    }
    if (subtree_obj->obj[2].Colour != hidden_obj->obj[2].Colour)
    {
        subtree_obj->obj[2].ChangedLiveData_lb = 1;
        subtree_obj->obj[2].Colour    =    hidden_obj->obj[2].Colour;
    }

/* We then correct the colour of a hidden OR node (this
gets */
        /* ugly!)  We have to do this after copying the colours
to the    */
```

```
                    /* discrete object because the line has to represent
the   */
                    /* (OR-node && pen-colour) in the case of the hidden
pipe */
                    /* object, in which case it must be true when the OR
is true,  */
                    /* whereas it must have the special OR line treatment
      */
                    /* viewing that same line as part of a hidden OR.
      */
        if (SEM_P(node)->svalue == _or) {
            rightchild = (node_pt)Lm_DATA_2_P(node->children_list);
            child_obj = DRAW_OBJ_P(rightchild)->discrete_p;
            childrightline = &child_obj->obj[2];
            if (subtree_obj->obj[2].Colour == Blue &&
                            childrightline->Colour == Orange)
{
                subtree_obj->obj[2].Colour = Orange;
                subtree_obj->obj[2].ChangedLiveData_lb = 1;
            }
        }
    }
} static GraphicalValue
Eval_right_lines(node_pt node_p, int parent_svalue)

{
    int i;
    int svalue;
    static void do_DumpBase(struct DisplayBase *obj);
    static GraphicalValue static_colour;
    /*auto*/ GraphicalValue old_right_colour;
    struct DisplayBase *newobj, *childobj;
    struct   ObjectInfo_ds   *cur,    *leftline,   *rightline,
*childrightline;
    node_pt rightchild;
    static int depth = 0;

if (DRAW_OBJ_P(node_p) == NULL)           /* We ignore non-
drawing objects */
        return Grey;

svalue = SEM_P(node_p)->svalue;
    if (svalue == _or && DRAW_OBJ_P(node_p)->hidden != 0)
        svalue = 0;      /* treat hidden as discrete object */ newobj = DRAW_OBJ_P(node_p)->discrete_p;
    cur = &newobj->obj[0];     /* The object itself */
    leftline = &newobj->obj[1];    /* The left hand linepart */
    rightline = &newobj->obj[2];   /* The right hand linepart */ if (rteval_debug  &  DEBUG_RLINES  &&  (!(rteval_debug  &
DEBUG_LINES)))
        MSG_Log("%*s Right pre: Object %d (%s) static_colour
%s left %s right %s\n",
            2*depth+1, " ",
```

```c
                        svalue,    cur->Modvar1->Name_c,
  mat_colour(static_colour),
                        format_colour(leftline->Colour),
format_colour(rightline->Colour));

/* pre action */
    old_right_colour = rightline->Colour;   /* remember  the
colour    */
    if (svalue == _or && parent_svalue == _or &&
                (static_colour == Grey || static_colour ==
Blue)) {
        rightline->Colour = static_colour;
    } else if (svalue == _or || svalue == _xor) {
        rightchild    =    (node_pt)Lm_DATA_2_P(node_p-
>children_list);
        childobj = DRAW_OBJ_P(rightchild)->discrete_p;
#ifdef MORE_DEBUGGING
                MSG_Log("Dump van or node:\n");
                do_DumpBase(newobj);
                MSG_Log("Dump van rightchild:\n");
                do_DumpBase(childobj);

#endif
        childrightline = &childobj->obj[2];
            /*if (childrightline->Colour == Blue)*/
        rightline->Colour = childrightline->Colour;
    }
    static_colour = rightline->Colour;

if ((node_p->children_list != NULL) &&
            (!Lm_ListEmpty(node_p->children_list))) {
        Lm_GotoItem(node_p->children_list, FIRST) ;
        for (i = 1; i <= Lm_ItemCount(node_p->children_list);
i++) {
            depth++;
            Eval_right_lines(Lm_DATA_P(node_p->children_list),
svalue);
            depth--;
            Lm_NextItem(node_p->children_list);
        }
    }
    /* post action */
    if (old_right_colour != rightline->Colour)
        rightline->ChangedLiveData_lb = 1;

/* Copy the colours through to the discrete hidden
object */
    if (DRAW_OBJ_P(node_p)->hidden != 0)
        copy_hidden_colours(node_p);

if (rteval_debug & DEBUG_RLINES)
        MSG_Log("%*s right post: Object %s colour %s pen %s
left %s right %s\n",
                2*depth+1, " ",
                describe_node(svalue, cur->Modvar1->Name_c),
                format_colour(cur->Colour),
                format_colour(static_colour),
```

```
                format_colour(leftline->Colour),
                format_colour(rightline->Colour));
    return static_colour;
} static GraphicalValue
Eval_Subtree(node_pt logictree)
{
    int tree_depth = -1;
    GraphicalValue left, right;
    struct DisplayBase *subtree_obj, *hidden_obj;
    hidden_obj = DRAW_OBJ_P(logictree)->discrete_p;
    SwapHidden(logictree);
    if ((rteval_debug & DEBUG_VERBOSE) &&
                DRAW_OBJ_P(logictree)->type != COMPOSE_obj)

MSG_Log("Eval_Subtree: discrete item at top of
tree!\n");
    MT_walk_bottom_up (logictree, Eval_object, &tree_depth);
    subtree_obj = DRAW_OBJ_P(logictree)->discrete_p;
    SwapHidden(logictree);
    return subtree_obj->obj[0].Colour;
} static void
Eval_expression(PARSER_statement_pt parsetree)
{
    list_pt eval_list;
    long *fakelistpointer;
    struct dispcalc_lvar *lvar_object;
    int labeltoken;

labeltoken = PARSE_P(parsetree->left_var_p)->label_token;
    if (labeltoken == T_SUBR || parsetree->ana_expr_tree_p !=
NULL) {
        lvar_object = (struct dispcalc_lvar *)
                DRAW_OBJ_P(parsetree->left_var_p);
        if (lvar_object->expression_list != NULL)
            RTEVAL_EvaluateExpression(lvar_object-
=ssion_list);
    }
} void
RTEVAL_EvaluateColours(PARSER_statement_pt parsetree)
{
    node_pt logictree;
    GraphicalValue statement_colour, lvar_colour;

if (rteval_debug == -1)
        rteval_debug = get_debug_flag("RTEVAL_DEBUG");

Eval_expression(parsetree);

logictree = parsetree->log_expr_tree_p;
    if (logictree == NULL) {
        if (rteval_debug & DEBUG_VERBOSE)
```

```c
            MSG_Log("RTEVAL_EvaluateColors:   NULL    logic
tree!\n");
            return;
    }

(void) Eval_Subtree(logictree);
    statement_colour = Eval_left_lines(logictree, -500);
    (void) Eval_right_lines(logictree, -499);
    lvar_colour    =    Eval_lvar(parsetree->left_var_p,
statement_colour);

if (PARSE_P(parsetree->left_var_p)->tok_svalue.tok_sem_p-
>vartype == digital &&
                lvar_colour != Grey &&
                statement_colour != Grey &&
                lvar_colour != statement_colour) {
         MSG_Log("Statement   is   inconsistent   with   selected
variable!\n");
         Eval_Greyout(logictree);
    }
} static void DumpDrawObject(node_pt node_p)
{
    if (node_p == NULL) {
        MSG_Log("\t\tDDO: Null parse tree node %x\n", node_p);
        return;
    }
    if ( DRAW_OBJ_P(node_p) == NULL ) {
        MSG_Log("\t\tDDO: Null tree item %x\n", node_p);
        return;
    }

MSG_Log("%x T:%s H:%d X:%04d Y:%04d C:%d W:%02d H:%02d\n",
        node_p,
        format_objecttype(DRAW_OBJ_P(node_p)->type),
        DRAW_OBJ_P(node_p)->hidden,
        DRAW_OBJ_P(node_p)->col,
        DRAW_OBJ_P(node_p)->line,
        DRAW_OBJ_P(node_p)->conn_offset,
        DRAW_OBJ_P(node_p)->width,
        DRAW_OBJ_P(node_p)->height);
} static void
do_DumpModvar(struct DisplayModvar_ds *mv)
{
    MSG_Log("Modvar %-10.10s V:%-10.10s F:%-3.3s S:%-10.10s\n",
          mv->Name_c, mv->Value_c, mv->Flags_c, mv->Scale_c);
} static void
do_DumpObjectinfo(struct ObjectInfo_ds *oi)
{
    if (oi->Type == Obj_Pipe) MSG_Log(
         "Objectinfo  T:%-9.9s  C:%-6.6s  X:%03d-%03d  Y:%03d-
%03d\n",
```

```
                format_objtype(oi->Type),
                format_colour(oi->Colour), oi->X_il, oi->Width_il, oi-
>Y_il,
                oi->Height_il);
        else
                MSG_Log( "Objectinfo T:%-9.9s C:%-6.6s X:%03d Y:%03d W:%03d
H:%03d B:%5f\n",
                        format_objtype(oi->Type),
                        format_colour(oi->Colour), oi->X_il, oi->Y_il, oi-
>Width_il,
                        oi->Height_il, oi->PercentBlue_fl);
} static void
do_DumpDisplayItem(struct ObjectInfo_ds *oi)
{
        do_DumpObjectinfo(oi);
        if  (oi->Modvar1->Name_c[0]    !=   '<')    do_DumpModvar(oi-
>Modvar1);
        if  (oi->Modvar2->Name_c[0]    !=   '<')    do_DumpModvar(oi-
>Modvar2);
        if  (oi->Modvar3->Name_c[0]    !=   '<')    do_DumpModvar(oi-
>Modvar3);
} static void
 do_DumpBase(struct DisplayBase *obj)
{
        int i;
        if (obj == NULL) {
                MSG_Log("Base display item is NULL\n");
                return;
        }
        for (i = 0; i < 3; i++)
                do_DumpObjectinfo(&obj->obj[i]);
        for (i = 0; i < 3; i++)
                do_DumpModvar(&obj->modvar[i]);
}
```

What is claimed is:

1. A computer-implemented process control display system for producing a graphical display of alphanumeric process control statements corresponding to a process being controlled, the process control statements comprising a set of lexical units grouped in a syntactic relationship defined by a predetermined grammar with at least a subset of the lexical units being capable of representing data, the process control display system comprising:

means for supplying a process control statement to be displayed;

statement analyzer means for generating a parse tree corresponding to the process control statement to be displayed;

means for producing a graphical display window;

means for establishing a predefined set of graphical icons for representing at least a portion of said lexical units;

display generation means in communication with said parse tree for placing selected ones of said predefined set of graphical icons in said display window in a spatial relationship corresponding to the syntactic relationship of said lexica units which make up said process control statement to be displayed;

means for supplying data from the process being controlled, said data corresponding to at least one of said lexical units of said process control statement to be displayed;

evaluation means responsive to the syntactic relationship defined by said process control statement to be displayed, for establishing visual quality of said selected graphical icons in said display window based on said supplied data, whereby at least a first condition may be visually distinguished from a second condition on the basis of its visual quality.

2. The process control display system of claim 1 wherein said display generation means places selected ones of said predefined set of graphical icons in said display window in an interconnected network.

3. The process control display system of claim 1 wherein said supplied data is dynamically changing data.

4. The process control display system of claim 1 wherein said visual quality is color.

5. The process control display system of claim 1 wherein said visual quality is color, in which a first color is used to represent a first condition and a second color is used to represent a second condition.

6. The process control display system of claim 5 wherein said First color is blue and said second color is orange.

7. The process control display system of claim 1 wherein said graphical icons include interconnection means for joining with one another to define said spatial relationship.

8. The process control display system of claim 2 wherein said graphical icons include interconnection means for joining with one another to define said interconnected network.

9. The process control display system of claim 1 wherein said graphical icons include interconnection means for joining with one another to define said spatial relationship and wherein said evaluation means establishes the visual quality of said interconnection means.

10. The process control display system of claim 1 wherein said display window defines a predetermined display area and wherein said process control program further comprises means for determining the boundary defined by said graphical icons placed in said display window and for altering at least a portion of said graphical icons placed in said display window to cause said boundary to fit within said predetermined display area.

11. The process control display system of claim 1 further comprising means for initiating a request to update said data supplied by said means for supplying data.

12. The process control display system of claim 1 wherein said process control statements are synchronized to a clock and wherein said evaluation means is synchronized to said clock.

13. A computer-implemented process control display system for displaying a program expression of the type capable of representing a change in datalogical quality, comprising:
means for parsing the expression into lexical units;
recursive means for creating a structure for storing the lexical units and the syntactic relationship among the lexical units;
means for drawing symbols corresponding to the lexical units and spatially arranged in a network reflecting the syntactic relationship;
means communicating with said drawing means for displaying the change of datalogical quality.

14. The system of claim 13 wherein said means for displaying change in datalogical quality comprises means for selectively altering the visual quality of at least some of said symbols.

15. The system of claim 13 wherein said means for displaying change in datalogical quality comprises means for selectively altering the color of at least some of said symbols.

16. The system of claim 13 wherein said syntactic relationship is based on a mathematical description of a grammar in which said program expression is written.

17. The system of claim 13 further comprising means for receiving data corresponding to at least some of said lexical units and means for updating said visual display based on said data.

18. The system of claim 13 further comprising means for displaying the change of datalogical quality by providing an interconnected network of changing visual quality representing logic flow.

19. A method for displaying a program expression of the type capable of representing a change in datalogical quality, comprising:
parsing the expression into lexical units;
recursively creating a structure for storing said lexical units and the syntactic relationship among said lexical units;
creating a visual display of symbols corresponding to said lexical units in a pattern corresponding to said syntactic relationship;
updating said visual display to show the change of datalogical quality by altering the visual quality of said symbols.

20. The method of claim 19 wherein said visual display is updated by selectively altering the visual quality of at least some of said symbols.

21. The method of claim 19 wherein said visual display is updated by selectively altering the color of at least some of said symbols.

22. The method of claim 19 wherein said syntactic relationship is based on a mathematical description of a grammar in which said program expression is written.

23. The method of claim 19 further comprising receiving data corresponding to at least some of said lexical units and updating said visual display based on said data.

24. The method of claim 19 further comprising displaying the change of datalogical quality by providing an interconnected network of changing visual quality representing logic flow.

25. A completer-implemented process control display system for displaying process control information expressed in the form of a program expression of the type capable of representing a change in datalogical quality, the process control information corresponding to a process being controlled by computer executing said program expression, comprising:
means for parsing the expression into lexical units:
recursive means for creating a structure for storing the lexical units and the syntactic relationship among the lexical units;
means for drawing symbols corresponding to the lexical units and spatially arranged in a network reflecting the syntactic relationship;
means communicating with said drawing means and said process being controlled for displaying the change of datalogical quality corresponding to a state of the process being controlled.

26. The system of claim 25 wherein said means for displaying change in datalogical quality comprises means for selectively altering the visual quality of at least some of said symbols.

27. The system of claim 25 wherein said means for displaying change in datalogical quality comprises means for selectively altering the color of at least some of said symbols.

28. The system of claim 25 wherein said syntactic relationship is based on a mathematical description of a grammar in which said program expression is written.

29. The system of claim 25 further comprising means for receiving data corresponding to at least some of said lexical units and means for updating said visual display based on said data.

30. The system of claim 25 further comprising means for displaying tile change of datalogical quality by providing an interconnected network of changing visual quality representing logic flow.

31. A method for displaying process control information expressed in the form of a program expression of the type capable of representing a change in datalogical quality, the process control information corresponding to a process being control led by computer executing said program expression, comprising:

parsing the expression into lexical units;
  recursively creating a structure for storing said lexical units and the syntactic relationship among said lexical units;
  creating a visual display of symbols corresponding to said lexical units in a pattern corresponding to said syntactic relationship;
  updating said visual display to show the change of datalogical quality, corresponding to a state of the process being controlled, by altering the visual quality of said symbols.

32. The method of claim 31 wherein said visual display is updated by selectively altering the visual quality of at least some of said symbols.

33. The method of claim 31 wherein said visual display is updated by selectively altering the color of at least some of said symbols.

34. The method of claim 31 wherein said syntactic relationship is based on a mathematical description of a grammar in which said program expression is written.

35. The method of claim 31 further comprising receiving data corresponding to at least some of said lexical units and updating said visual display based on said data.

36. The method of claim 31 further comprising displaying the change of datalogical quality by providing an interconnected network of changing visual quality representing logic flow.

* * * * *